(12) United States Patent
Furuichi

(10) Patent No.: US 11,930,372 B2
(45) Date of Patent: Mar. 12, 2024

(54) COMMUNICATION CONTROL APPARATUS, COMMUNICATION APPARATUS, AND COMMUNICATION CONTROL METHOD

(71) Applicant: SONY GROUP CORPORATION, Tokyo (JP)

(72) Inventor: Sho Furuichi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 210 days.

(21) Appl. No.: 17/289,145

(22) PCT Filed: Sep. 10, 2019

(86) PCT No.: PCT/JP2019/035429
§ 371 (c)(1),
(2) Date: Apr. 27, 2021

(87) PCT Pub. No.: WO2020/095532
PCT Pub. Date: May 14, 2020

(65) Prior Publication Data
US 2021/0385662 A1  Dec. 9, 2021

(30) Foreign Application Priority Data
Nov. 7, 2018 (JP) ................. 2018-210022

(51) Int. Cl.
*H04W 16/14* (2009.01)
*H04W 72/23* (2023.01)
*H04W 72/541* (2023.01)

(52) U.S. Cl.
CPC .......... *H04W 16/14* (2013.01); *H04W 72/23* (2023.01); *H04W 72/541* (2023.01)

(58) Field of Classification Search
CPC ... H04W 16/14; H04W 72/23; H04W 72/541; H04W 24/02
See application file for complete search history.

(56) References Cited

U.S. PATENT DOCUMENTS

2007/0281710 A1  12/2007  Bai et al.
2012/0094681 A1   4/2012  Freda et al.
(Continued)

FOREIGN PATENT DOCUMENTS

CN   101083825 A   12/2007
CN   102036252 A    4/2011
(Continued)

OTHER PUBLICATIONS

Wireless innovation forum: "SignalingProtocols and Procedures for Citizens Broadband Radio Service (CBRS): Spectrum Access System (SAS)—Citizens Broadband Radio Service Device (CBSD) InterfaceTechnical Specification", WINNF-fS-0016, XP055650977, Jan. 3, 2018, 60 pages.

(Continued)

*Primary Examiner* — John D Blanton
(74) *Attorney, Agent, or Firm* — CHIP LAW GROUP

(57) ABSTRACT

A communication control apparatus (40) acquires, from a second wireless system that performs wireless communication by using a radio wave of a frequency band used by a first wireless system or from a proxy system that acts on behalf of the second wireless system, a request for the second wireless system to start or continue radio wave transmission. Then, the communication control apparatus (40) determines a transmission interval of the request to be transmitted from a predetermined second wireless system out of a plurality of the second wireless systems or a predetermined proxy system out of a plurality of the proxy systems. Then, the communication control apparatus (40) notifies the predetermined second wireless system or the predetermined proxy system of the determined transmission interval.

18 Claims, 22 Drawing Sheets

(56) References Cited

U.S. PATENT DOCUMENTS

| | | | |
|---|---|---|---|
| 2017/0105242 | A1 | 4/2017 | Nakagawa |
| 2018/0132240 | A1 | 5/2018 | Yang |
| 2019/0141713 | A1 | 5/2019 | Cimpu et al. |
| 2019/0373615 | A1* | 12/2019 | Cimpu ................ H04W 72/541 |
| 2021/0211880 | A1* | 7/2021 | Khawer ................ H04W 60/06 |

FOREIGN PATENT DOCUMENTS

| | | | |
|---|---|---|---|
| CN | 103238361 | A | 8/2013 |
| CN | 105163339 | A | 12/2015 |
| CN | 108476412 | A | 8/2018 |
| CN | 110495201 | A | 11/2019 |
| EP | 1863303 | A1 | 12/2007 |
| EP | 3217717 | A1 | 9/2017 |
| EP | 3583795 | A1 | 12/2019 |
| JP | 2007-325260 | A | 12/2007 |
| JP | 2013-545365 | A | 12/2013 |
| JP | 2017063313 | A | 3/2017 |
| JP | 2020-509675 | A | 3/2020 |
| JP | 6796724 | B2 | 12/2020 |
| KR | 10-2019-0117649 | A | 10/2019 |
| NO | 2018/150303 | A1 | 8/2018 |
| WO | 2012/051303 | A1 | 4/2012 |
| WO | WO-2018020799 | A1 | 2/2018 |
| WO | WO-2018172367 | A1 | 9/2018 |

OTHER PUBLICATIONS

Marko Palola et al., "Field Trial of the 3.5 GHz Citizens Broadband Radio Service Governed by a Spectrum Access System (SAS)", 2017 IEEE International Symposium on Dynamic Spectrum Access Networks (Dyspan), YDOKKKfi/\I71 DOI: 10.1109/DySPAN.2017. 7920760 ISBN: 978-1-5090-2830-6, Mar. 1, 2017, 10 pages.

Extended European Search Report of EP Application No. 19882147. 2, dated Dec. 9, 2021, 10 pages.

International Search Report and Written Opinion of PCT Application No. PCT/JP2019/035429, dated Oct. 21, 2019, 11 pages of ISRWO.

"Signaling Protocols and Procedures for Citizens Broadband Radio Service (CBRS): Spectrum Access System (SAS)—Citizens Broadband Radio Service Device (CBSD) Interface Technical Specification", Wireless Innovation Forum, WINNF-TS-0016, version V1.2. 1, Jan. 3, 2018, 60 pages.

"CBRS Certified Professional Installer Accreditation Technical Specification", Wireless Innovation Forum, WINNF-TS-0247-V1.0.0, Oct. 16, 2017, 18 pages.

"Technical and operational requirements for the operation of white space devices under geo-location approach," ECC Report 186 Jan. 2013, 181 pages.

White Space Database Provider (WSDB), 125 pages.

"Test and Certification for Citizens Broadband Radio Service (CBRS); Conformance and Performance Test Technical Specification SAS as Unit Under Test (UUT)", Wireless Innovation Forum, WINNF-TS-0061-V1.2.0, Jun. 2018, 190 pages.

"Coexistence Methods for Geo-location Capable Devices Operating under General Authorization", IEEE Std 802.19.1aTM-2017, 3 pages.

Spectrum Sharing Committee Policy and Procedure Coordinated Periodic Activities Policy, Wireless Innovation Forum, WINNF-SSC-0008-V1.0.0, 2 pages.

"Signaling Protocols and Procedures for Citizens Broadband Radio Service (CBRS): Spectrum Access System (SAS)—SAS Interface Technical Specification", Wireless Innovation Forum, WINNF-TS-0096-V1.2.0, Oct. 20, 2017, 42 pages.

"Requirements for Commercial Operation in the U.S. 3550-3700 MHz Citizens Broadband Radio Service Band", Wireless Innovation Forum, WINNF-TS-0112-V1.4.1, Jan. 16, 2018, 77 pages.

CBRS WInnForum Standards, Signaling Protocols and Procedures for Citizens Broadband Radio Service (CBRS): Spectrum Access System (SAS)—Citizens Broadband Radio Service Device (CBSD) Interface Technical Specification , WINNF-TS-0016 Version 1.2.3, Oct. 31, 2018.

Ericsson, Candidate spectrum for NR unlicensed operation, 3GPP TSG RAN WG1 #92 R1-1802773, Athens, Greece, Feb. 2018.

Motorola, "Incorporation of ETSI shared channel concepts in 3GPP documentation", R2-99002, 3GPP tsg_ran\WG2_RL2,TSGR2_01, Feb. 18, 1999.

* cited by examiner

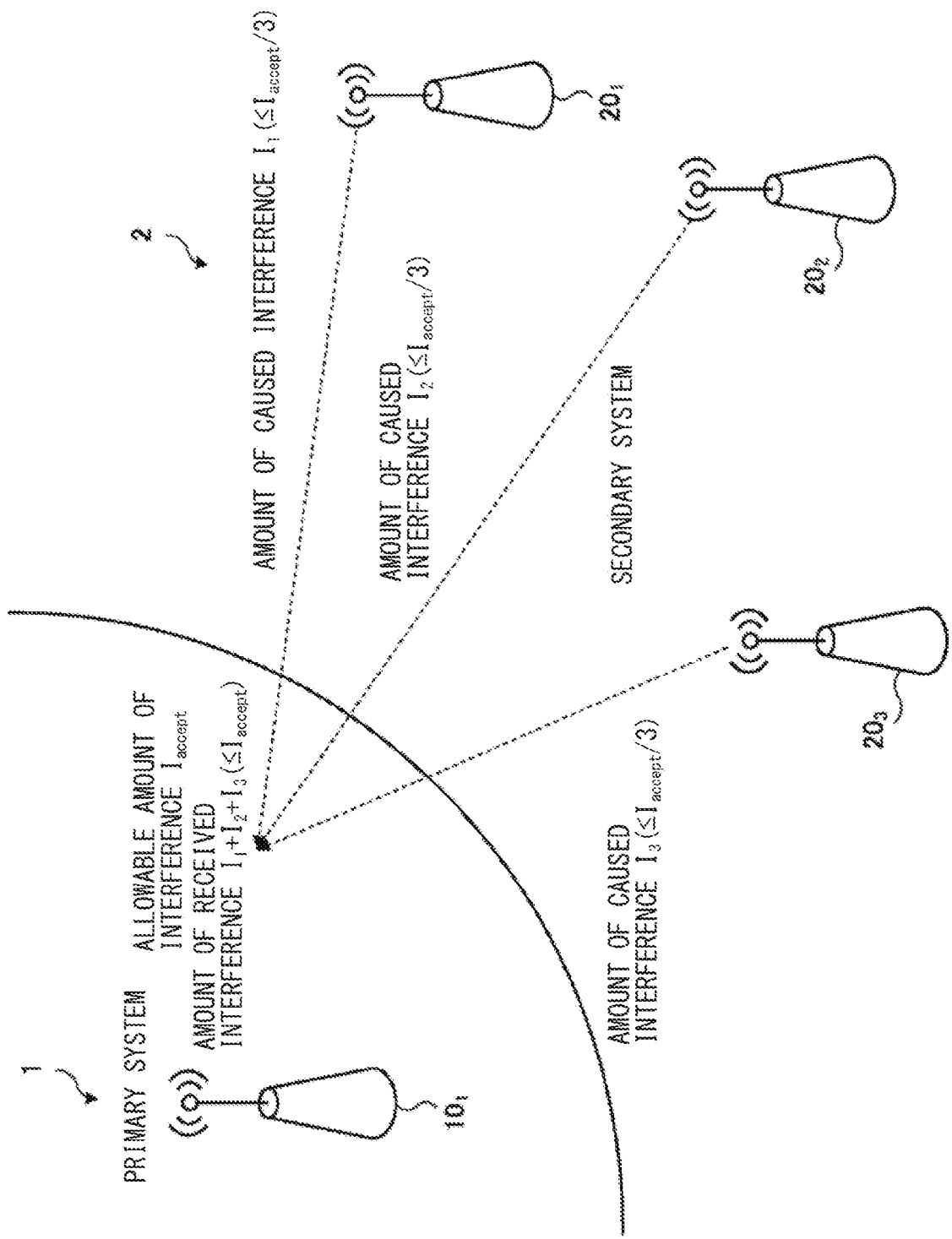
[FIG. 1]

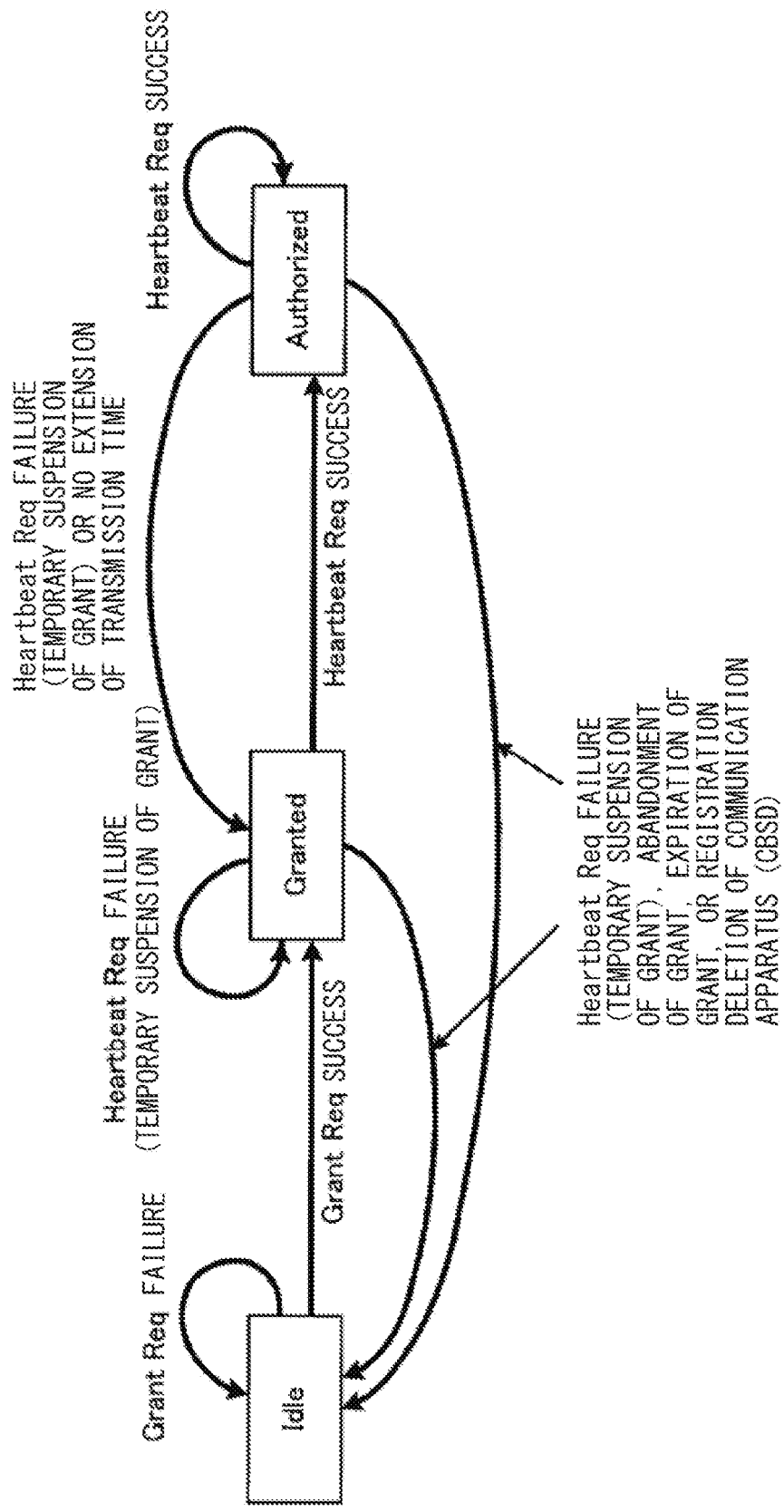
[FIG. 2]

[FIG. 3]
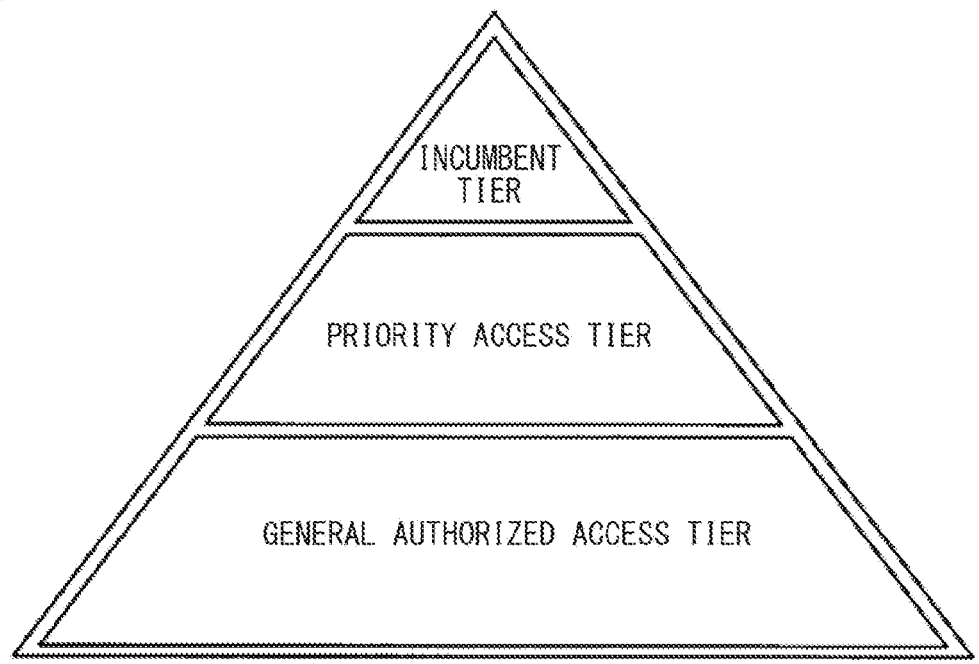
[FIG. 4]
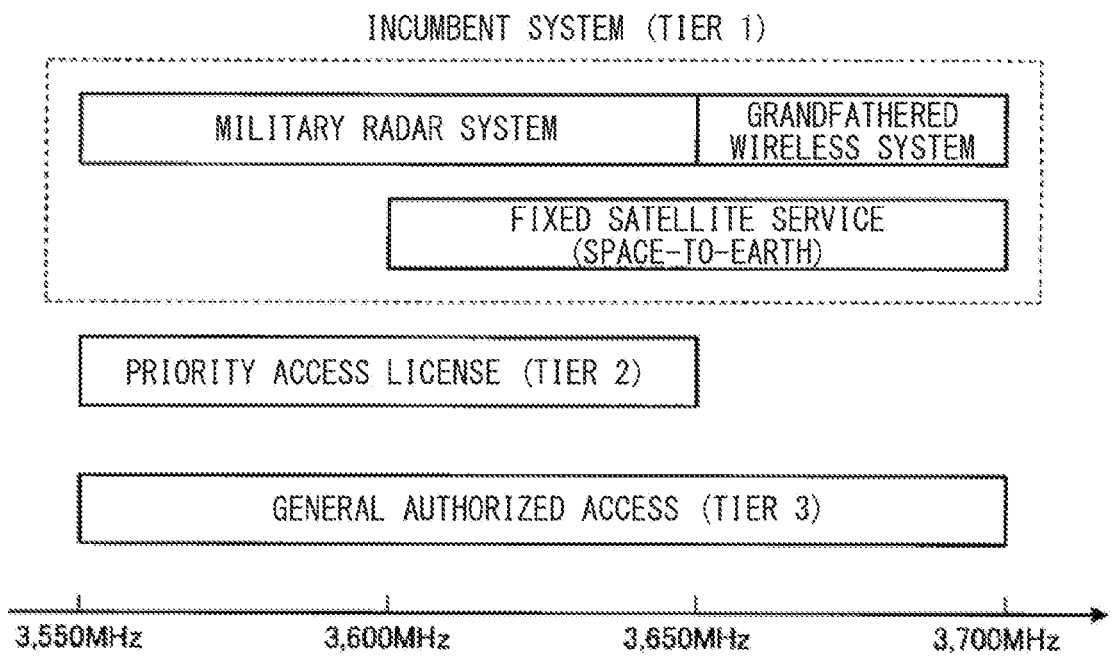

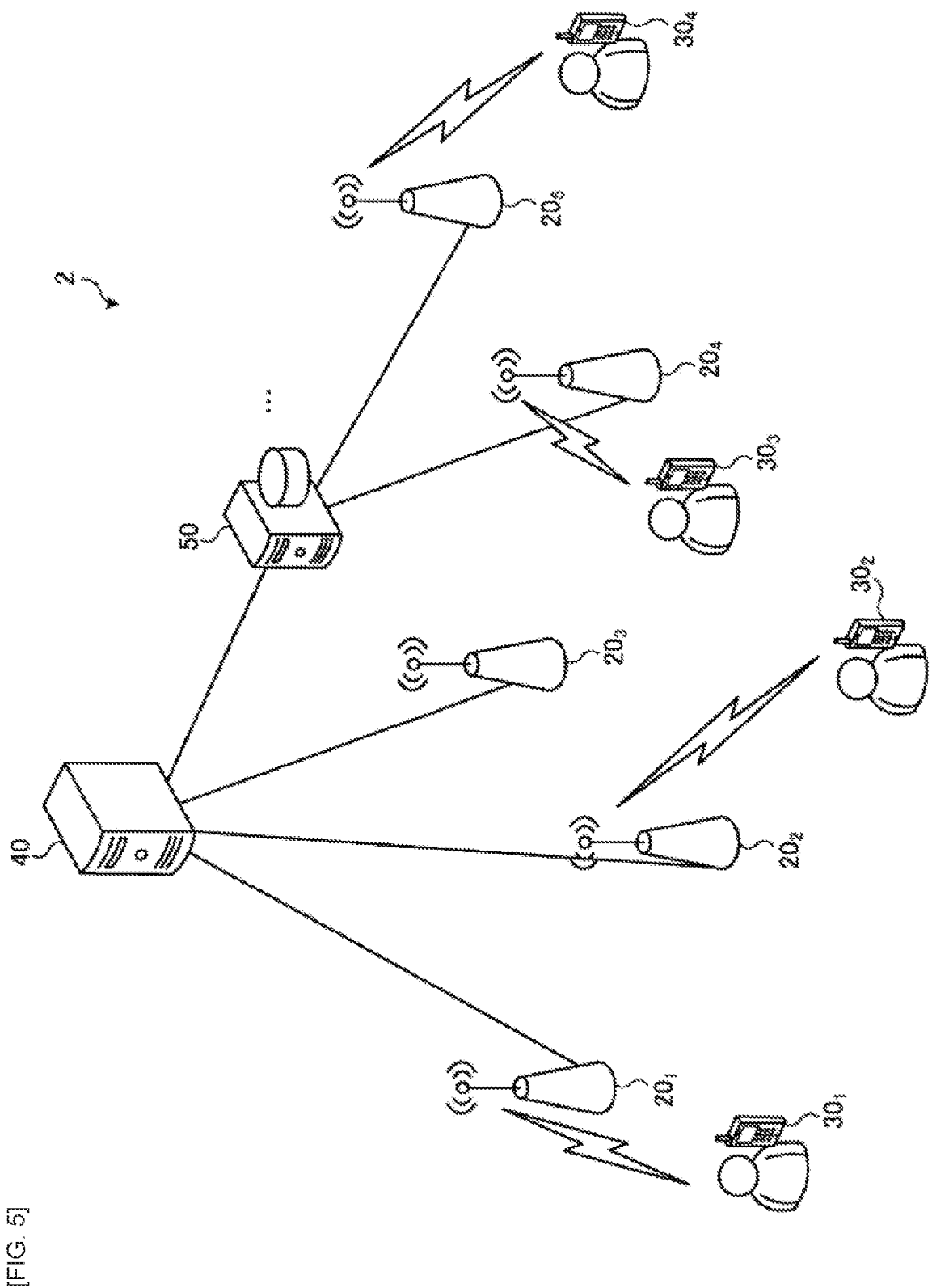
[FIG. 5]

[FIG. 6]
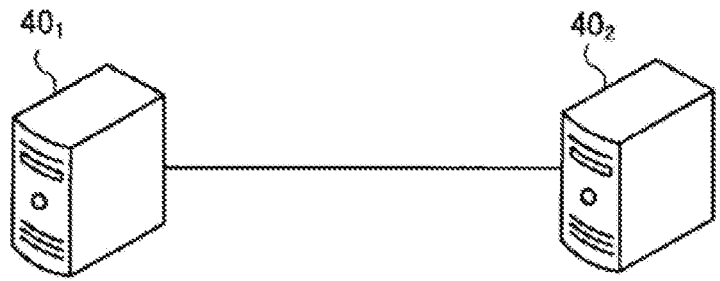
[FIG. 7]
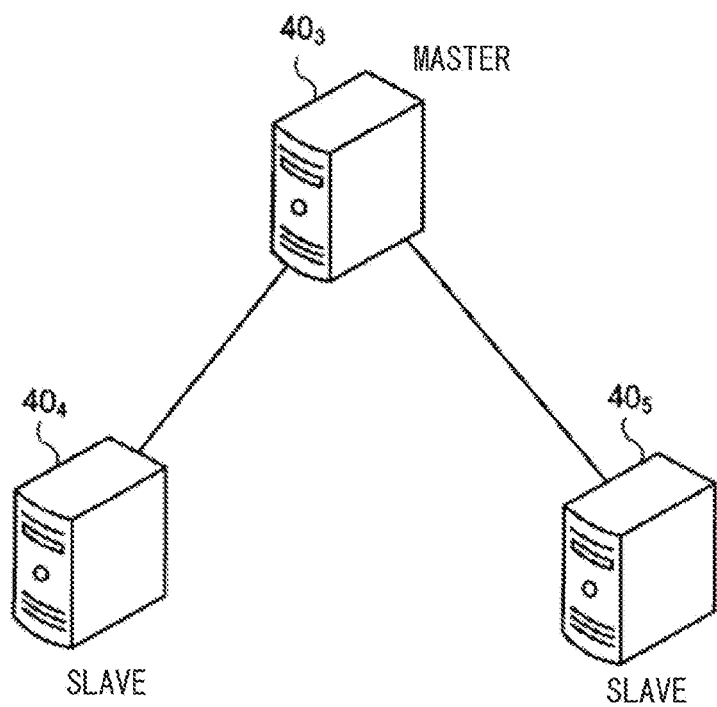

[FIG. 8]
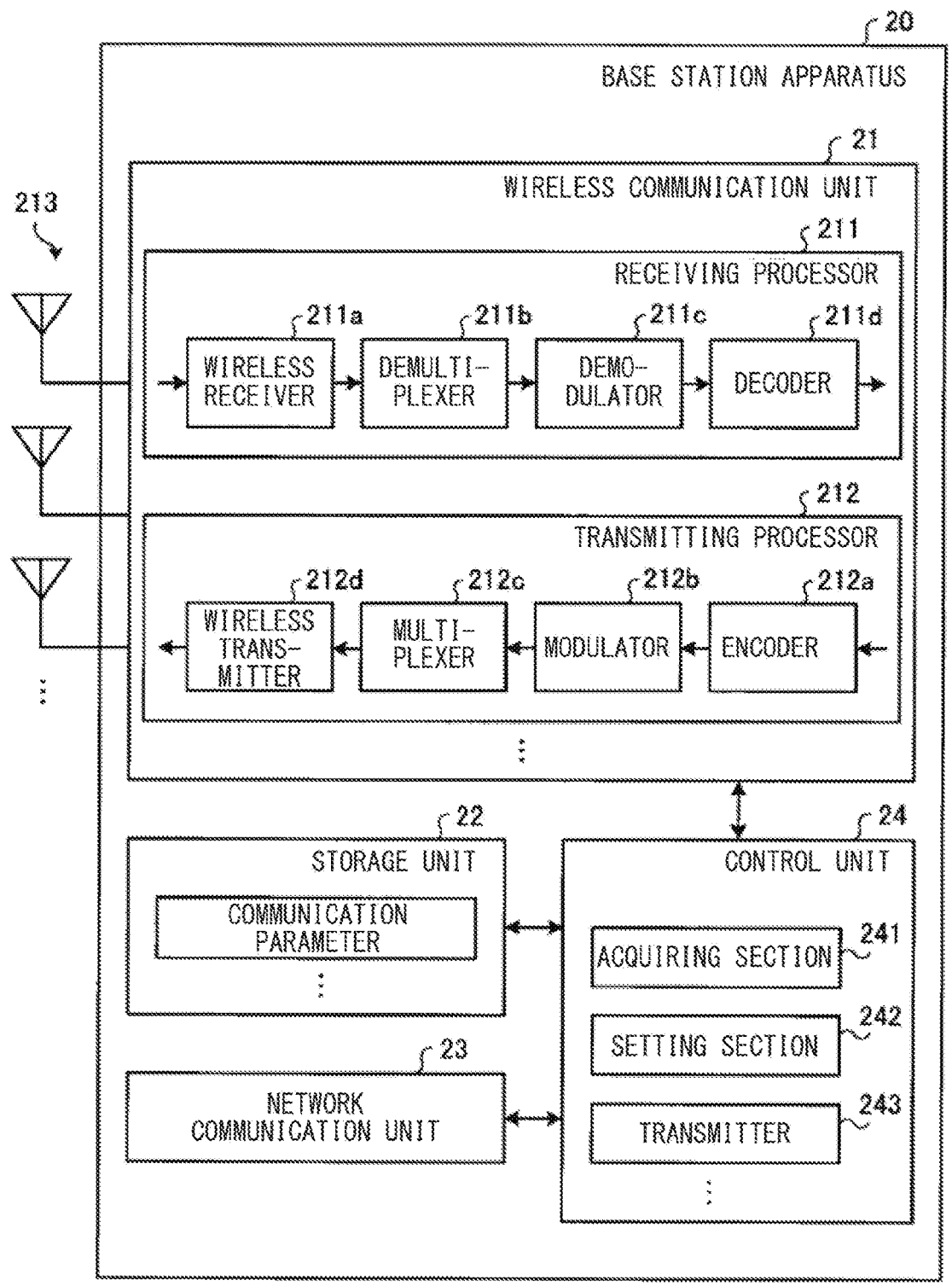

[FIG. 9]
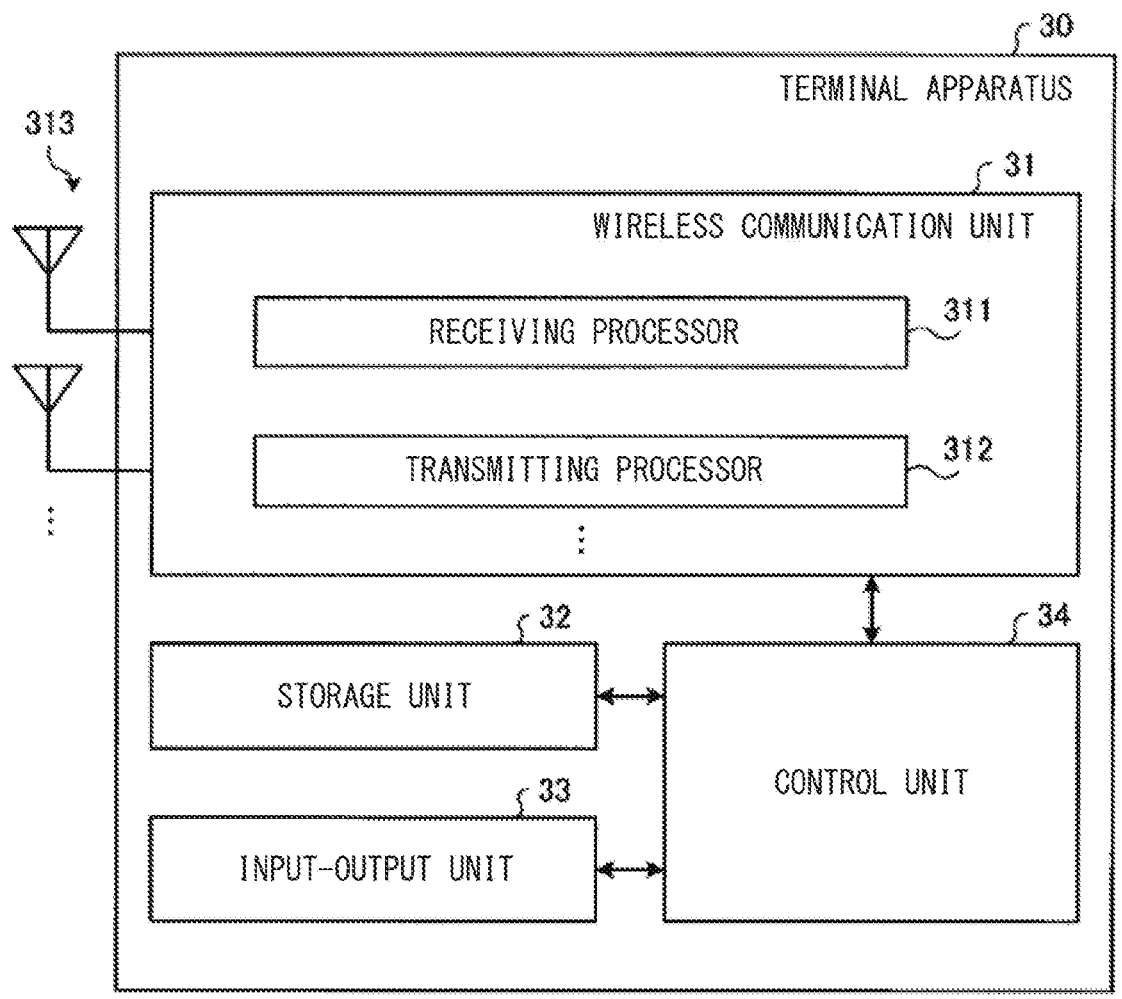

[FIG. 10]
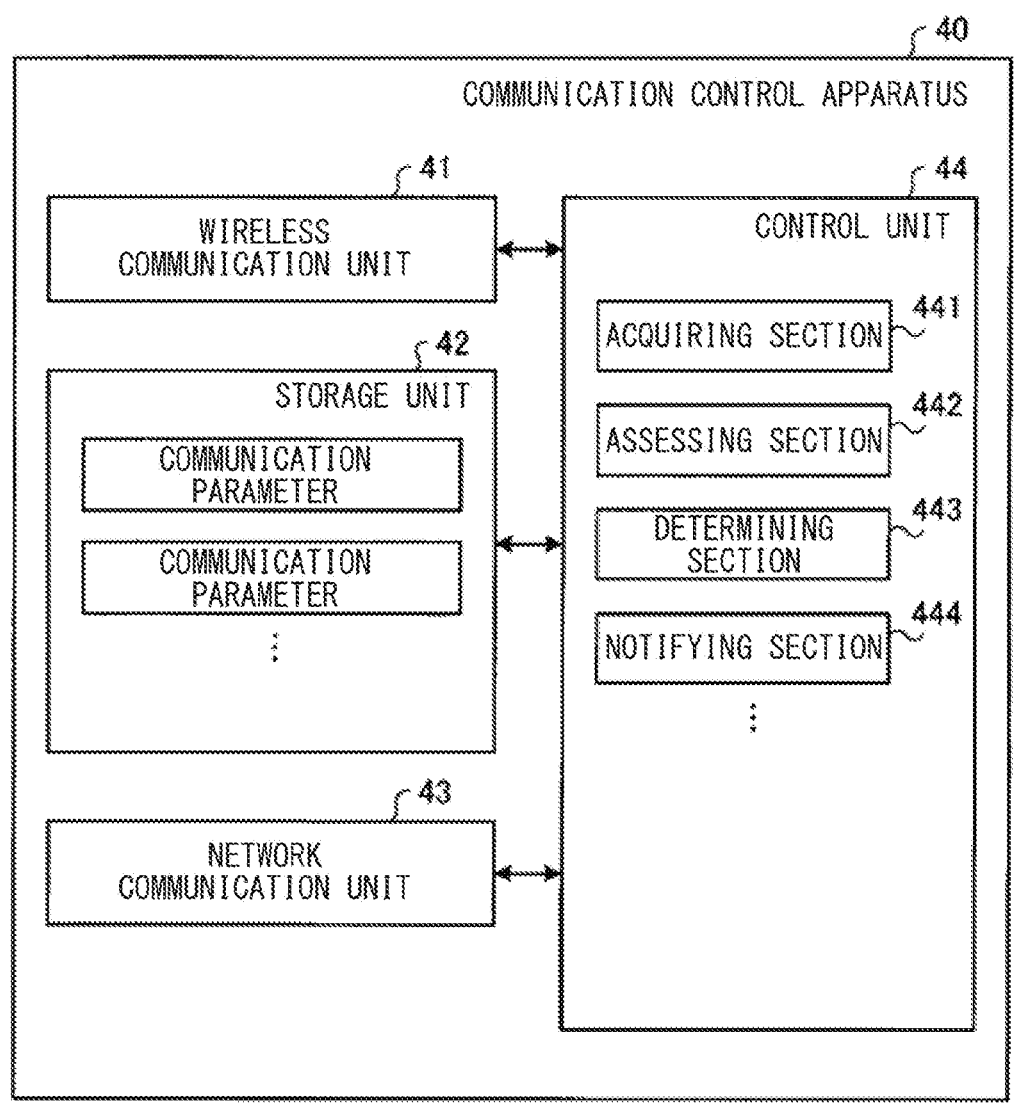

[FIG. 11]
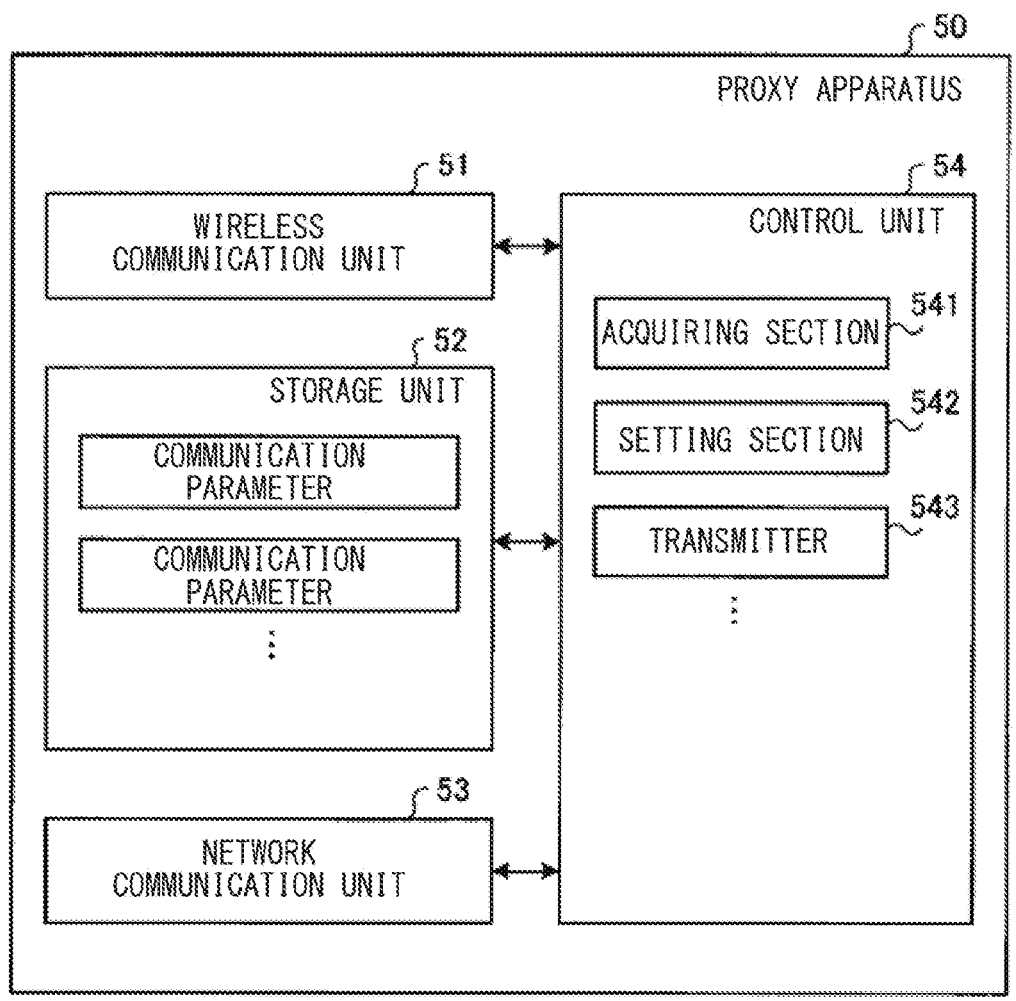

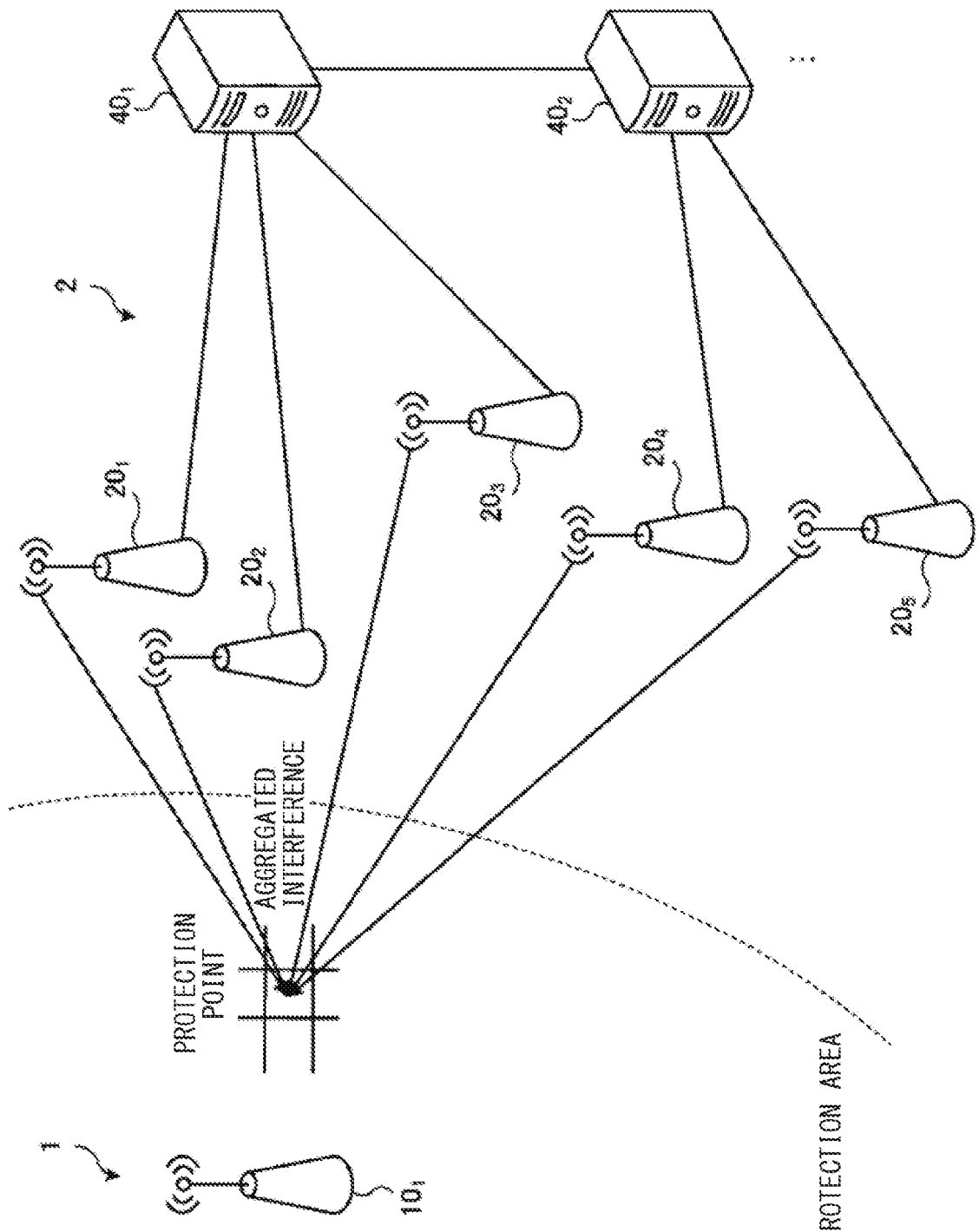
[FIG. 12]

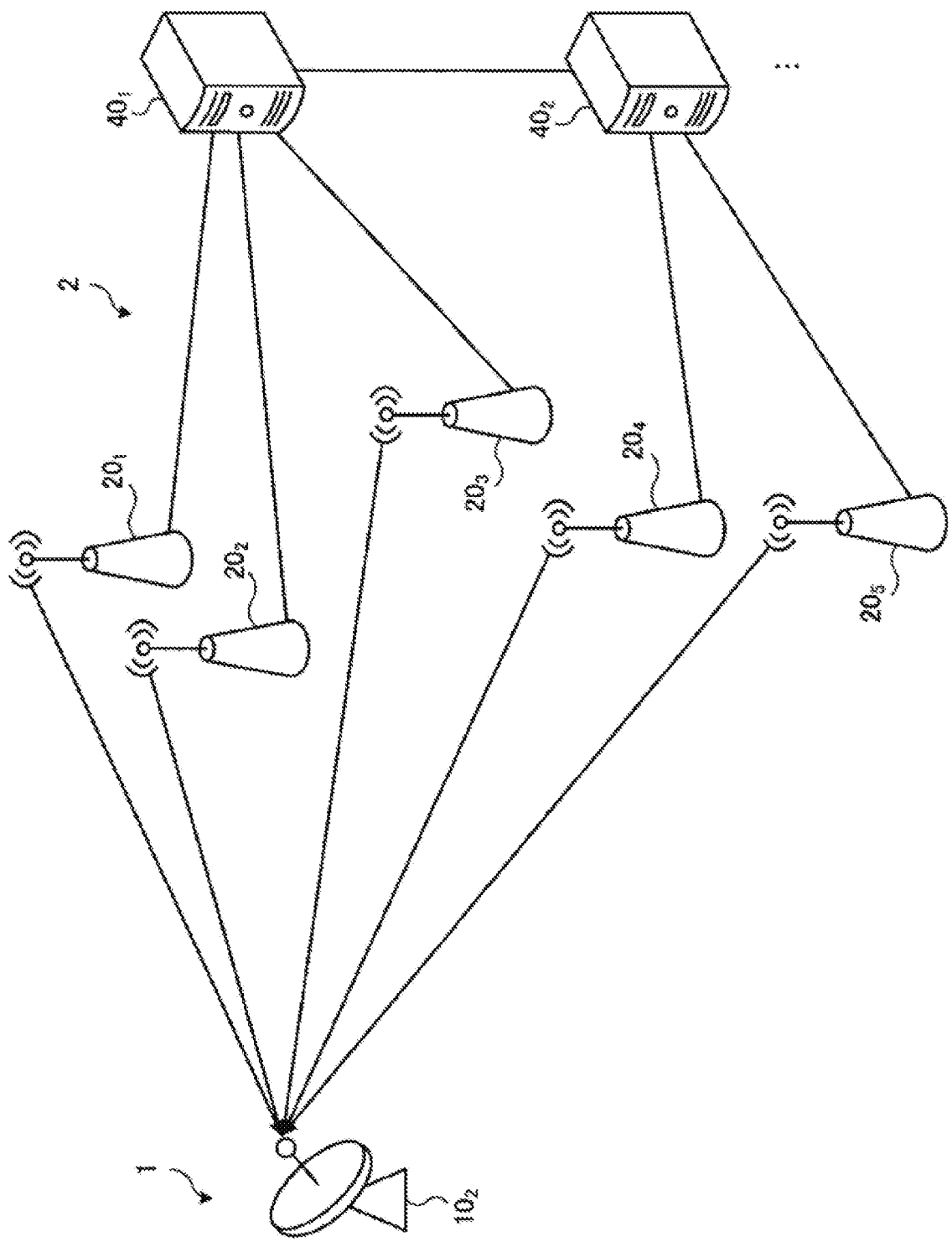
[FIG. 13]

[FIG. 14]
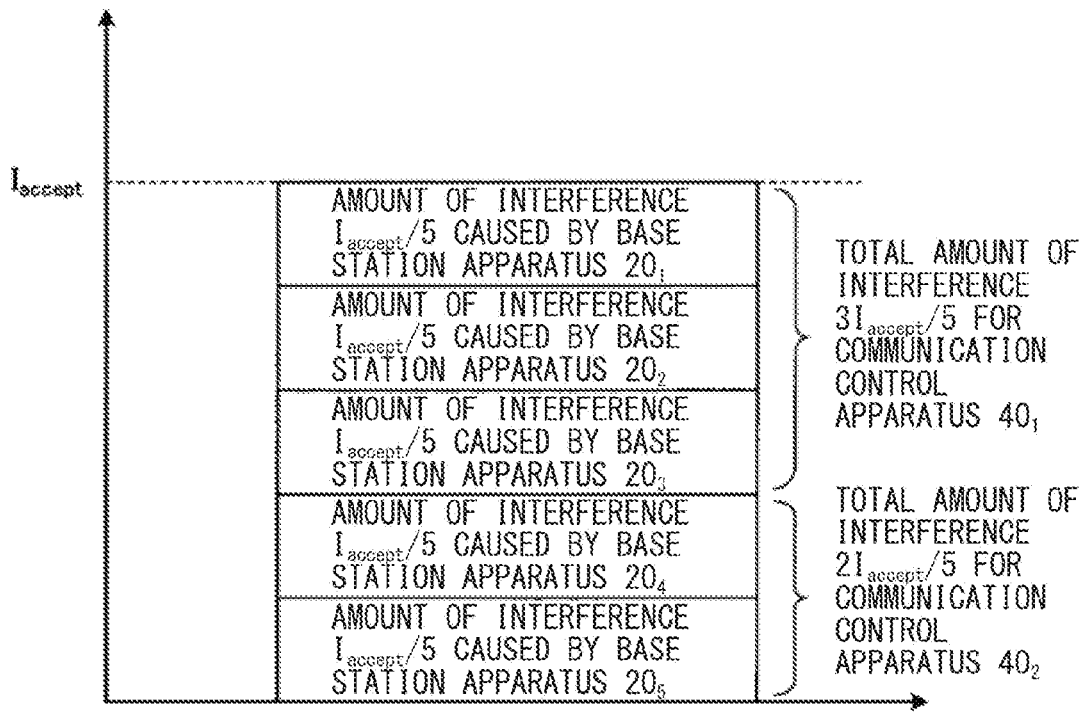
[FIG. 15]
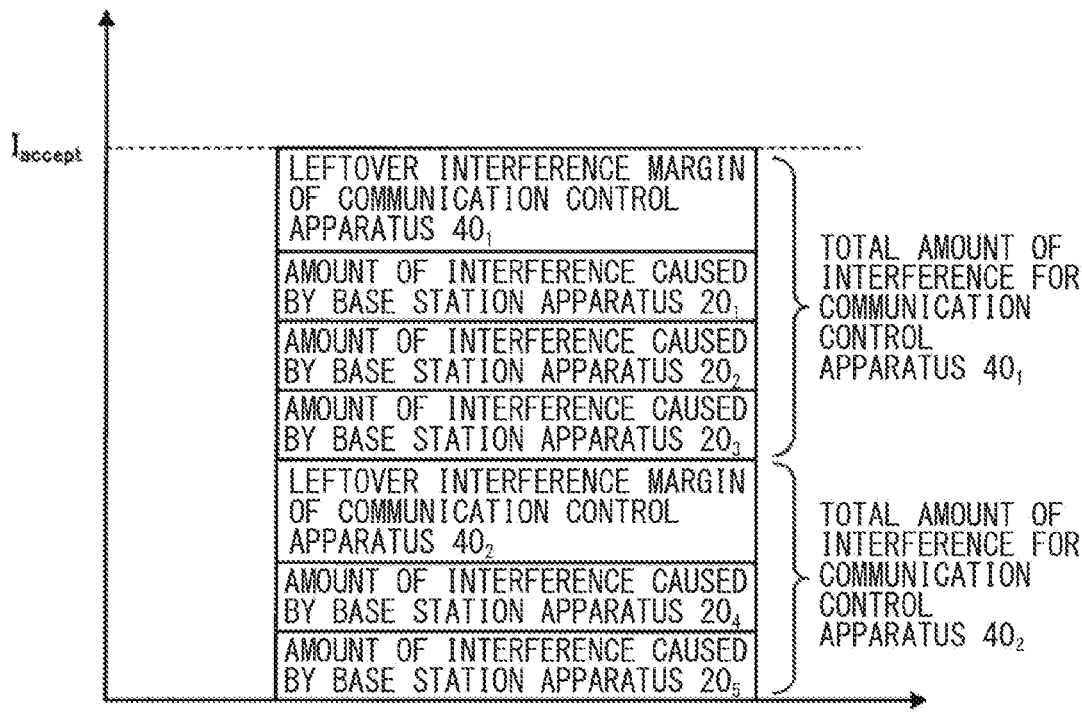

[FIG. 16]
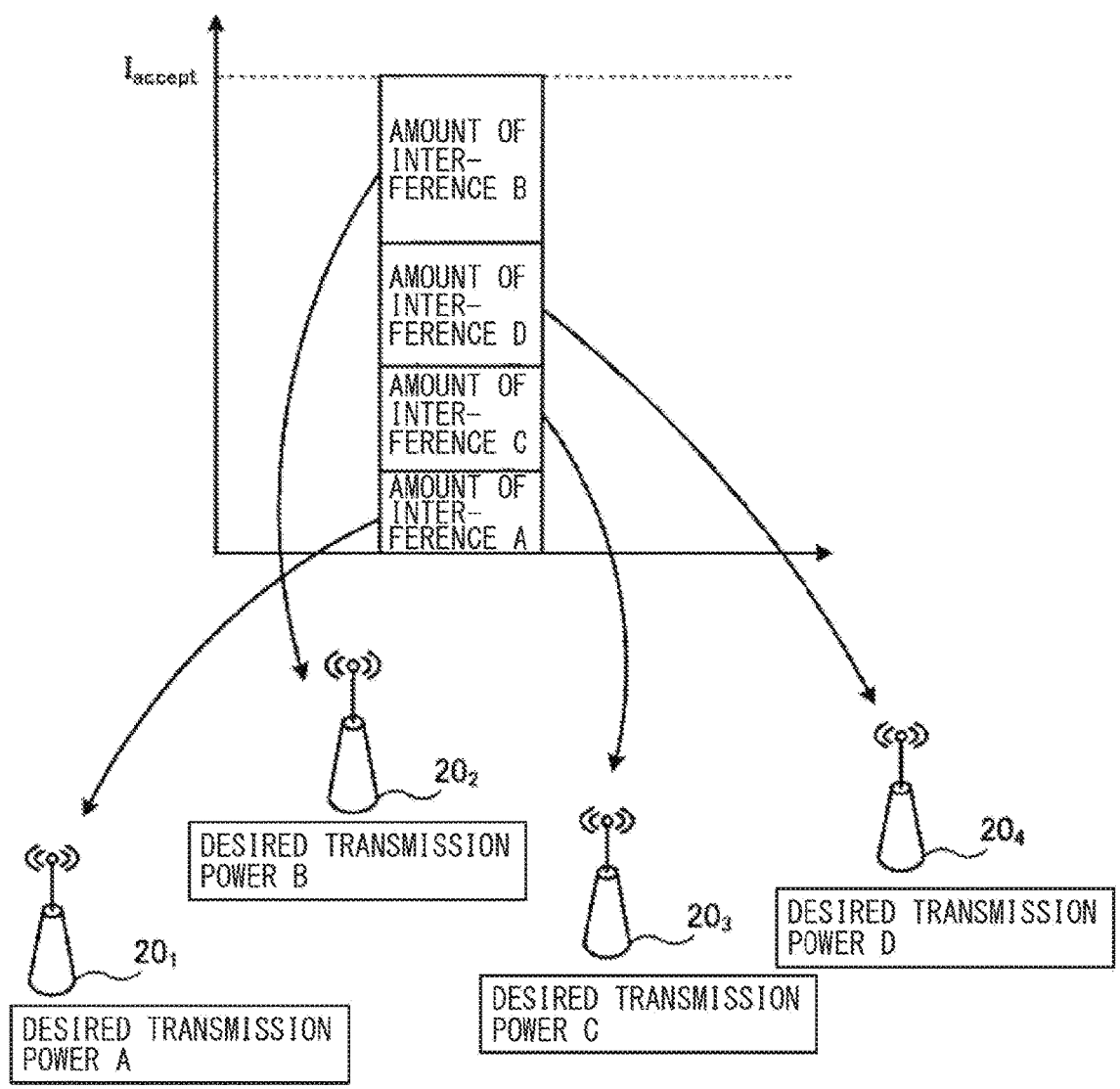

[FIG. 17]
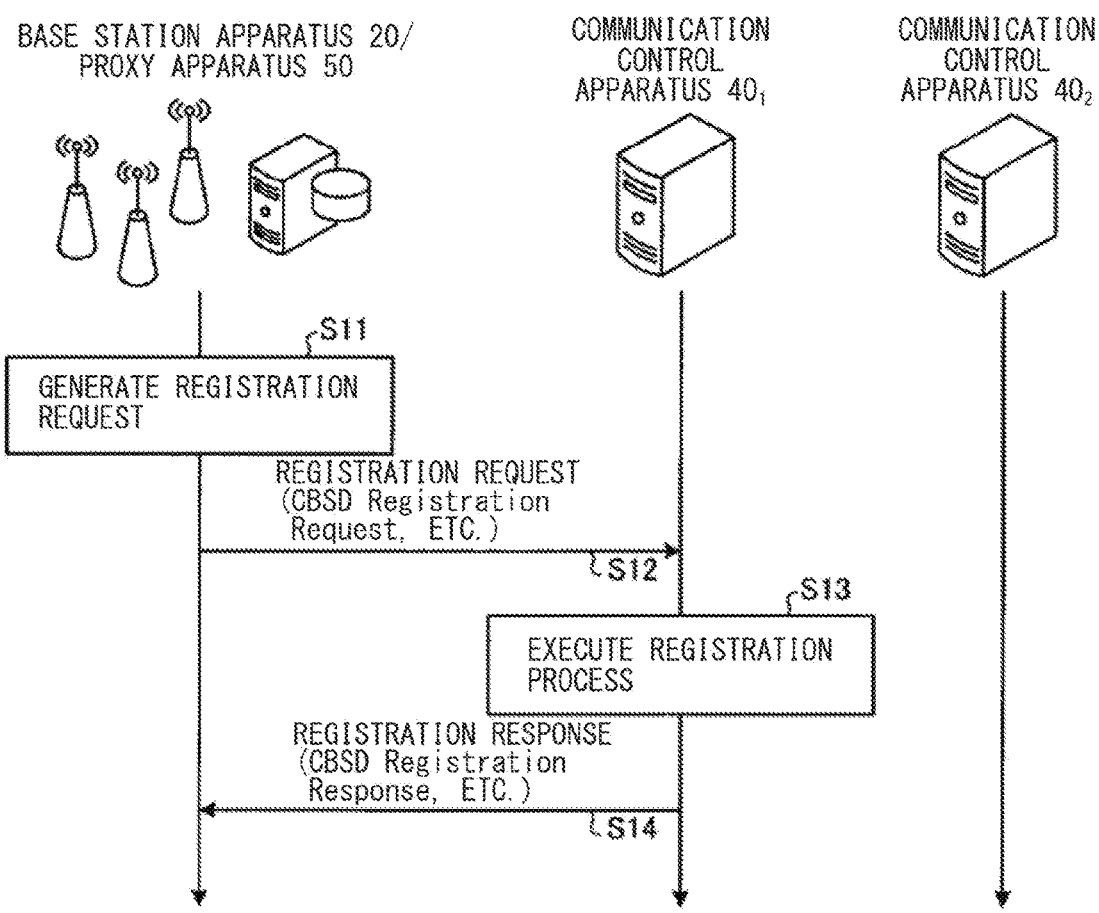

[FIG. 18]
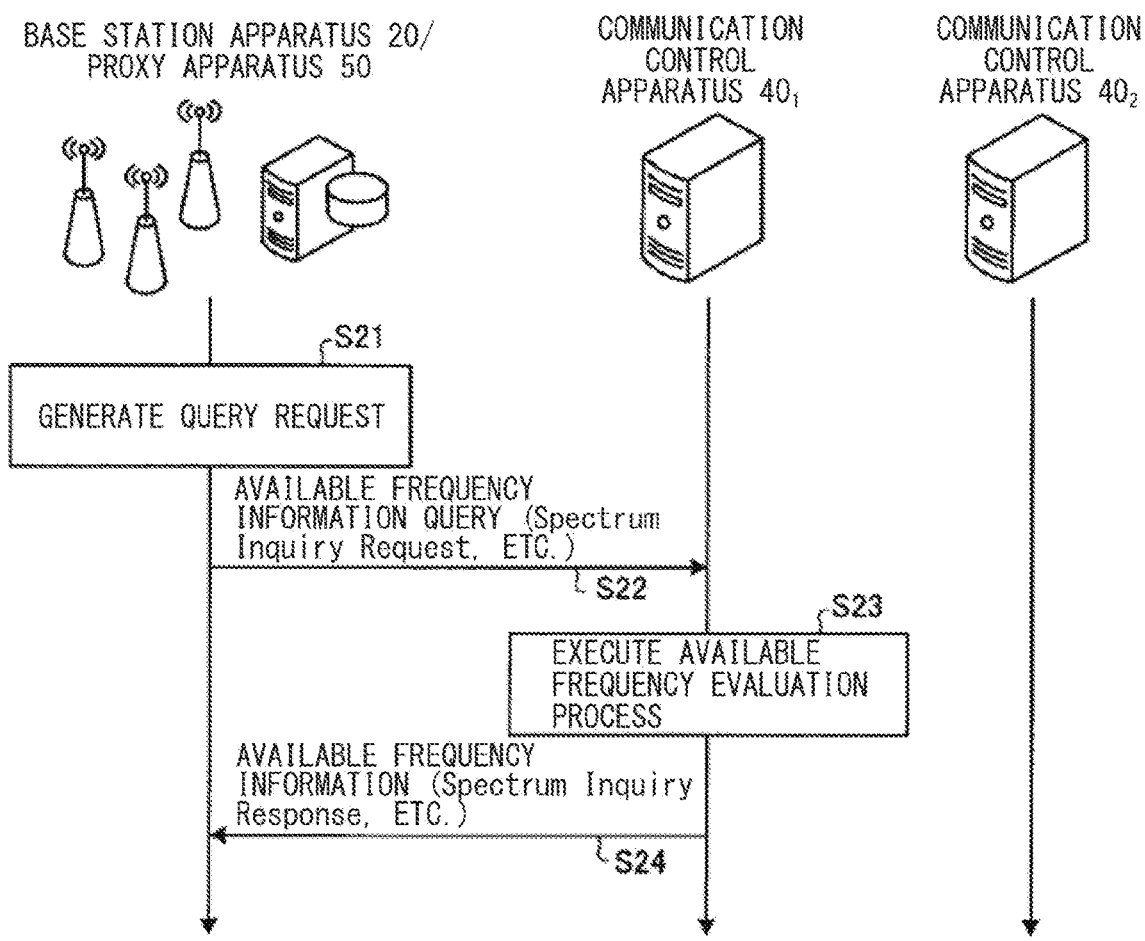

[FIG. 19]
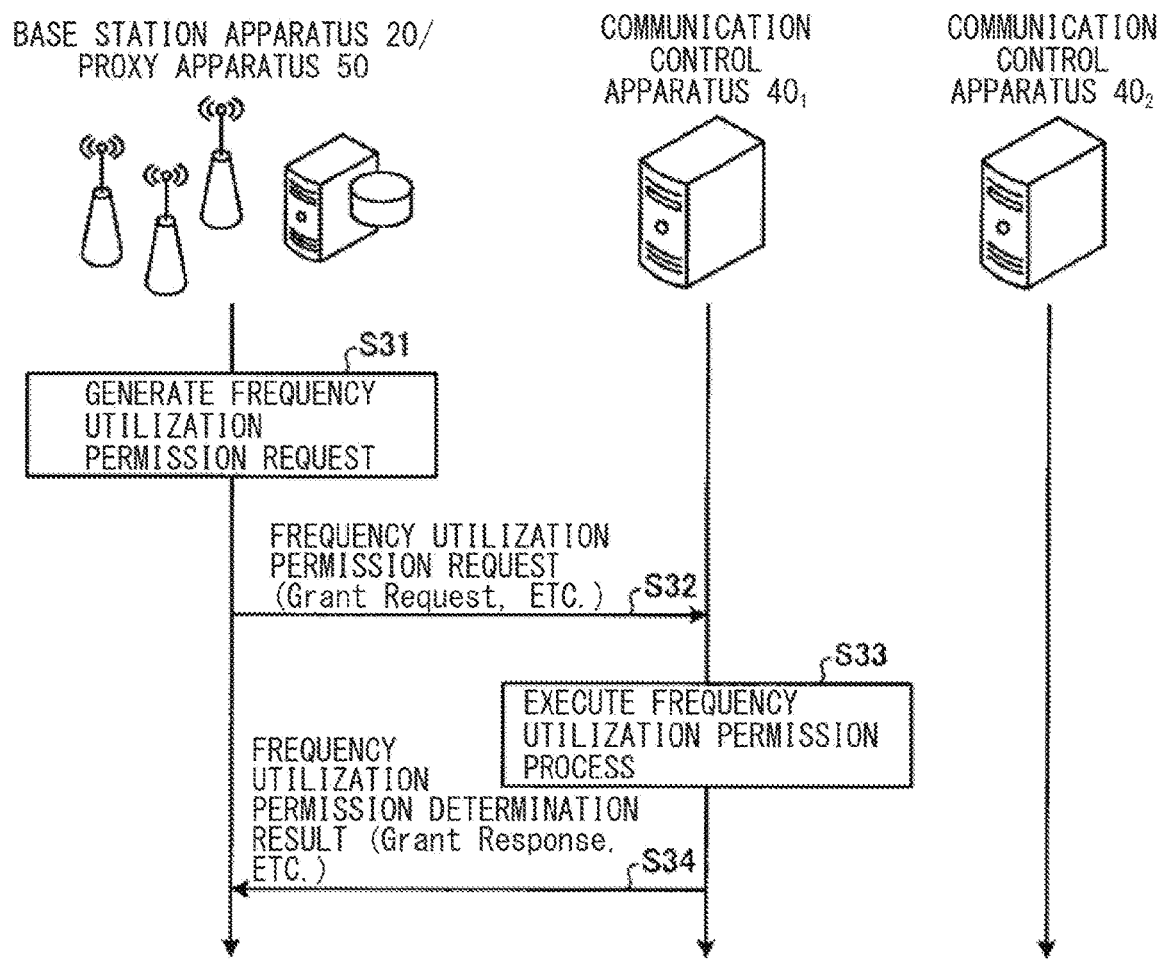

[FIG. 20]
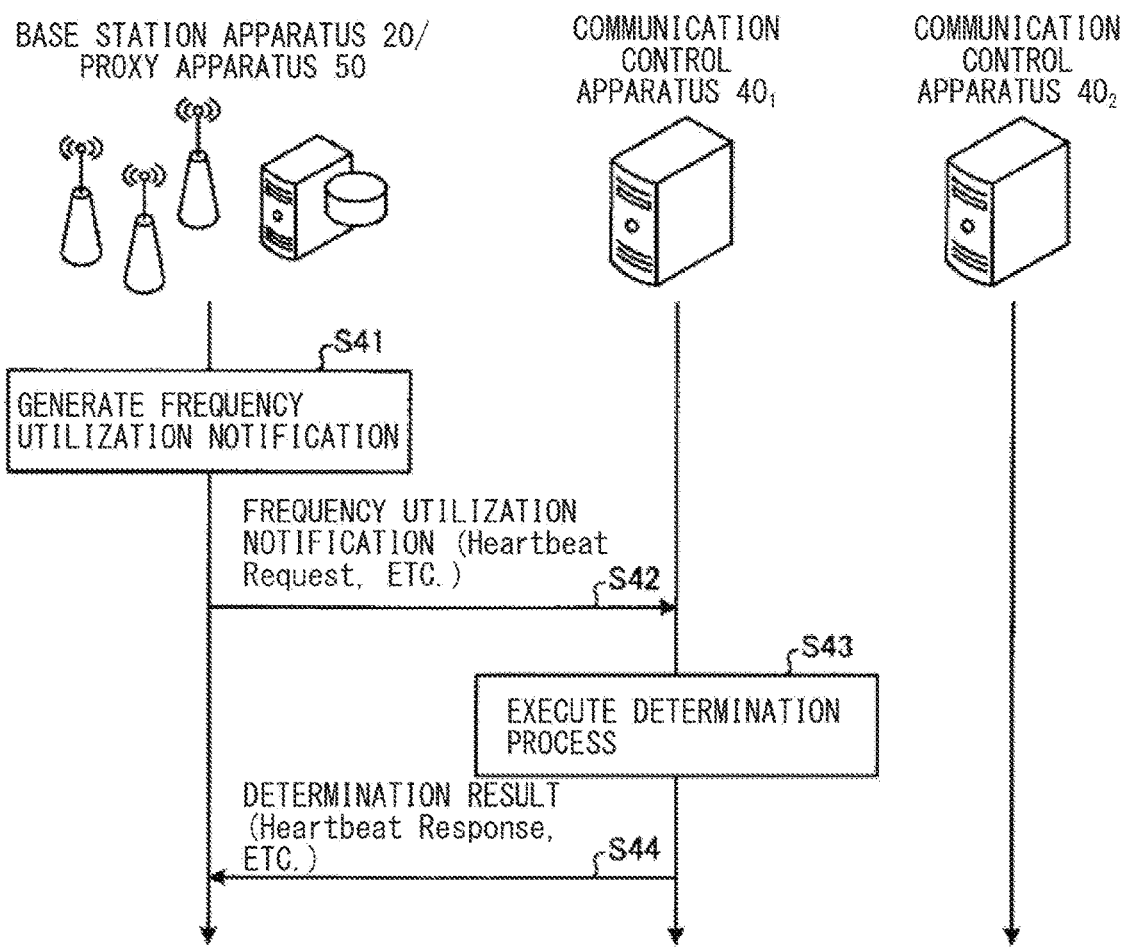

[FIG. 21]
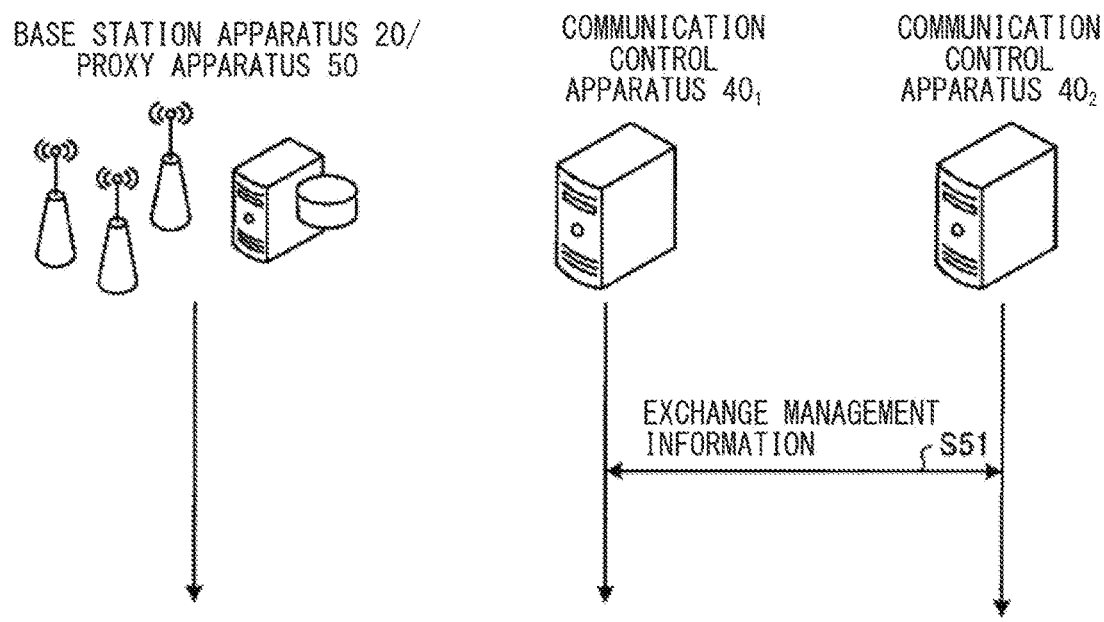

[FIG. 22]
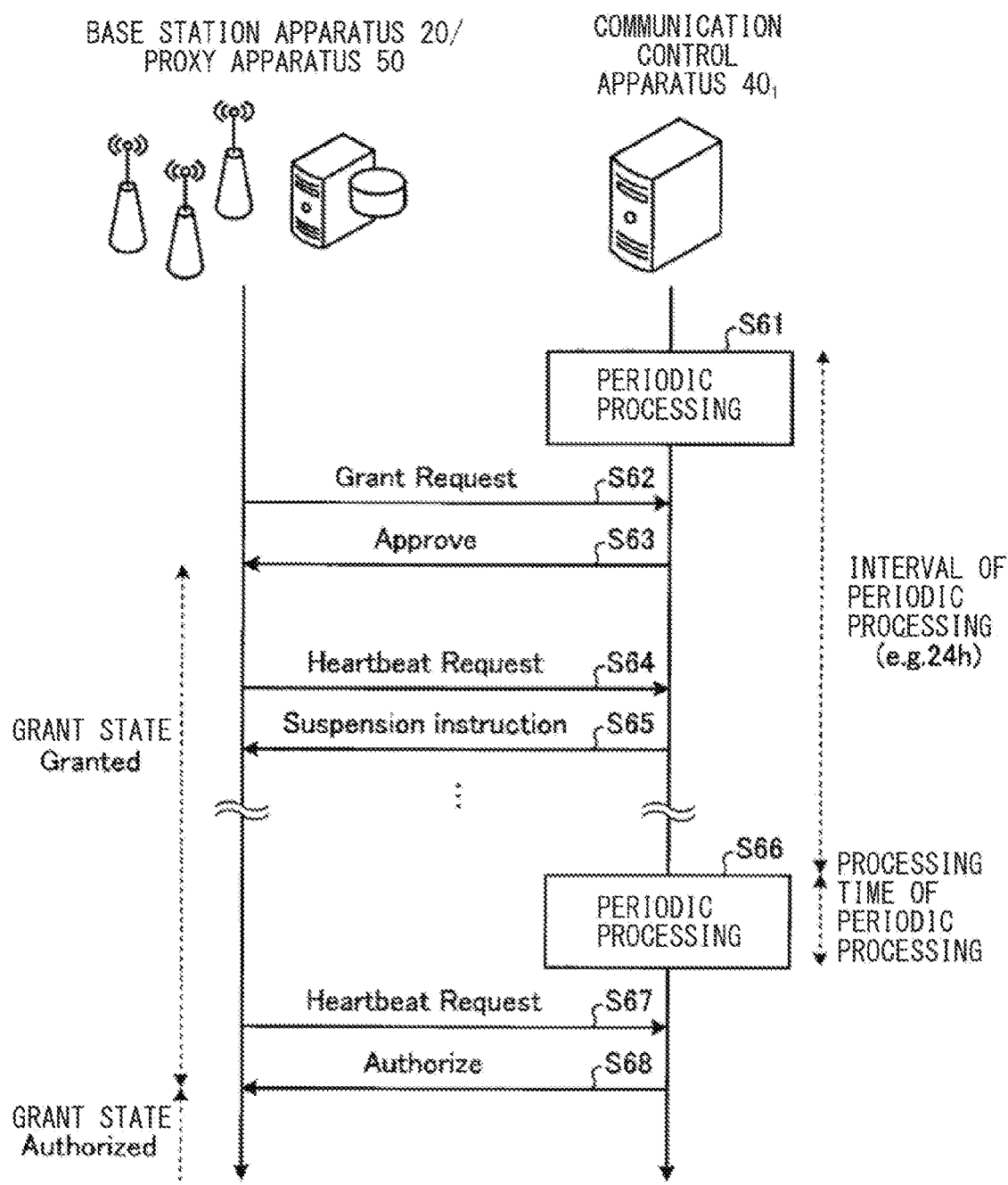

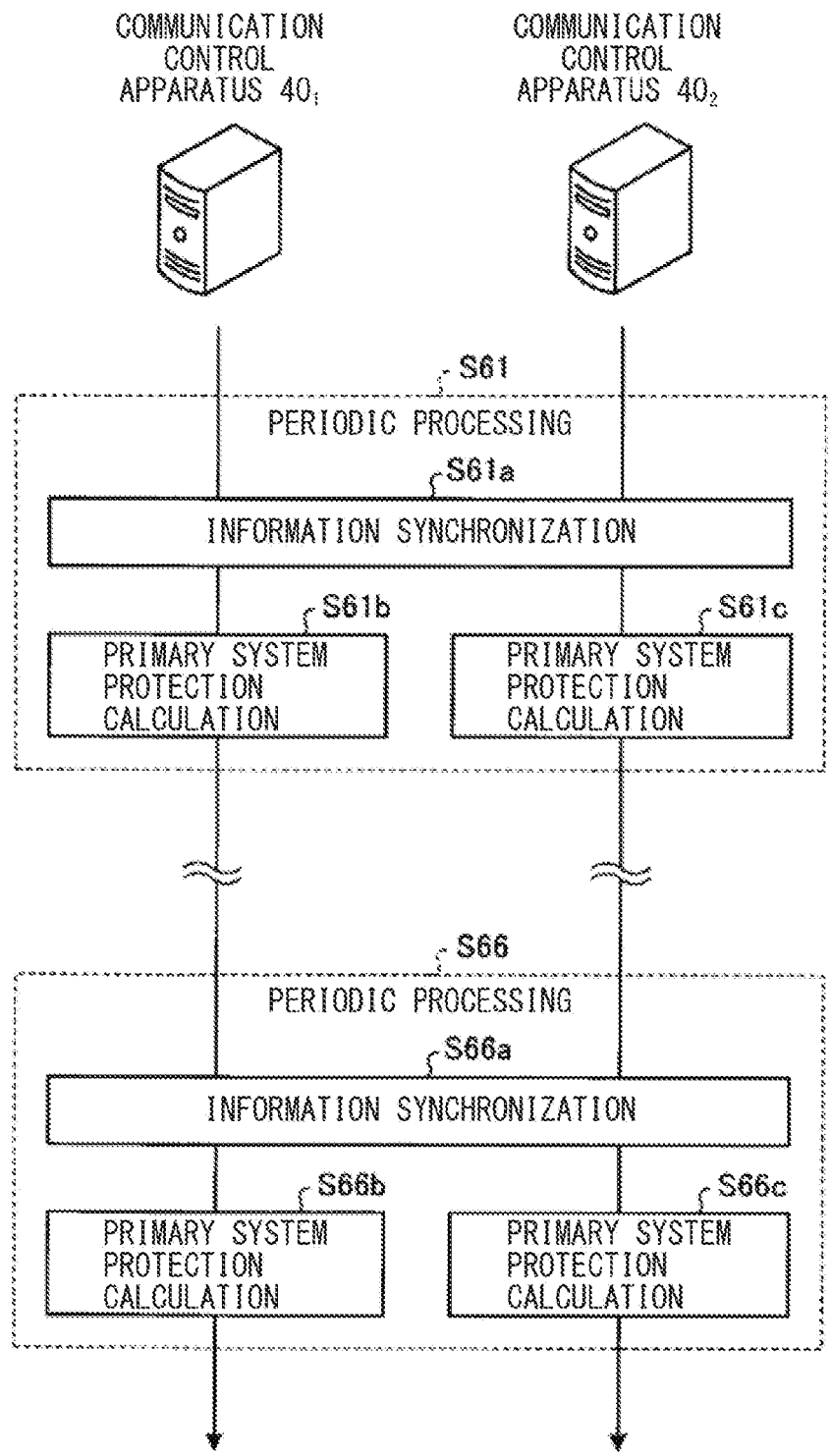
[FIG. 23]

[FIG. 24]
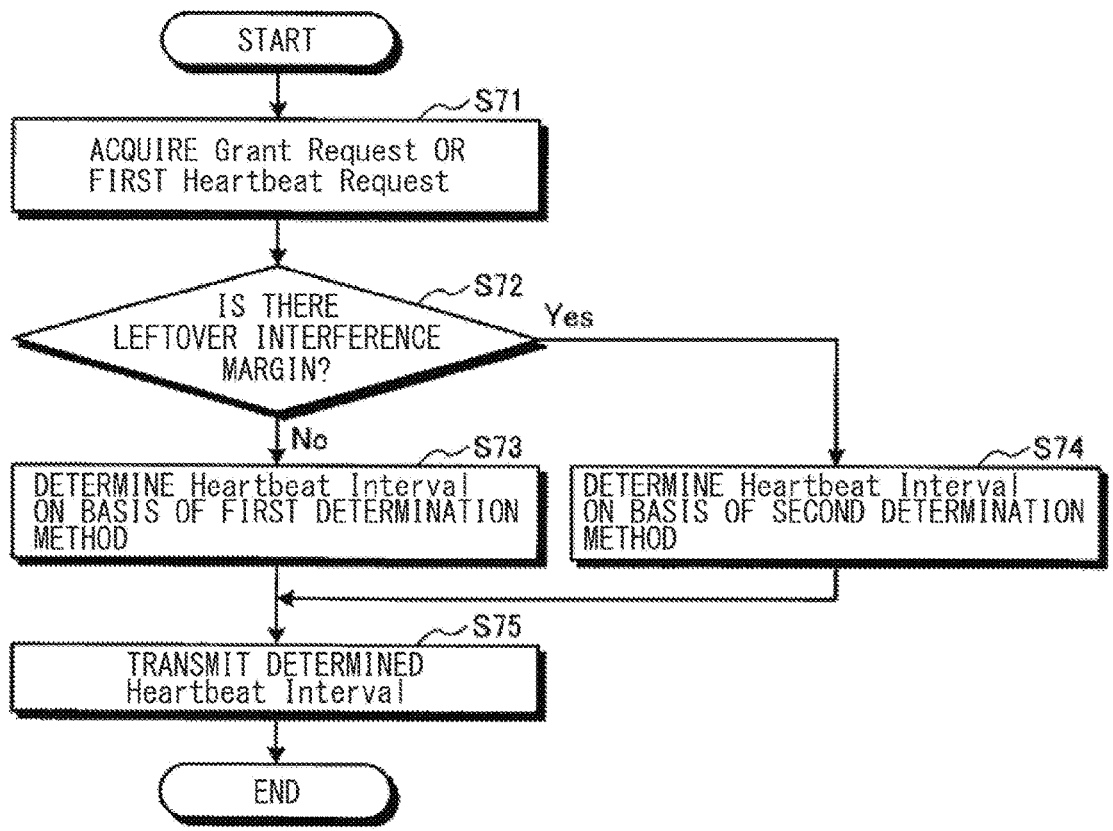
[FIG. 25]
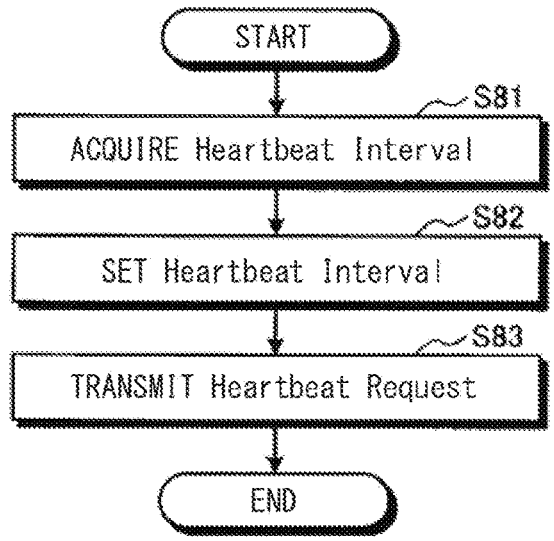

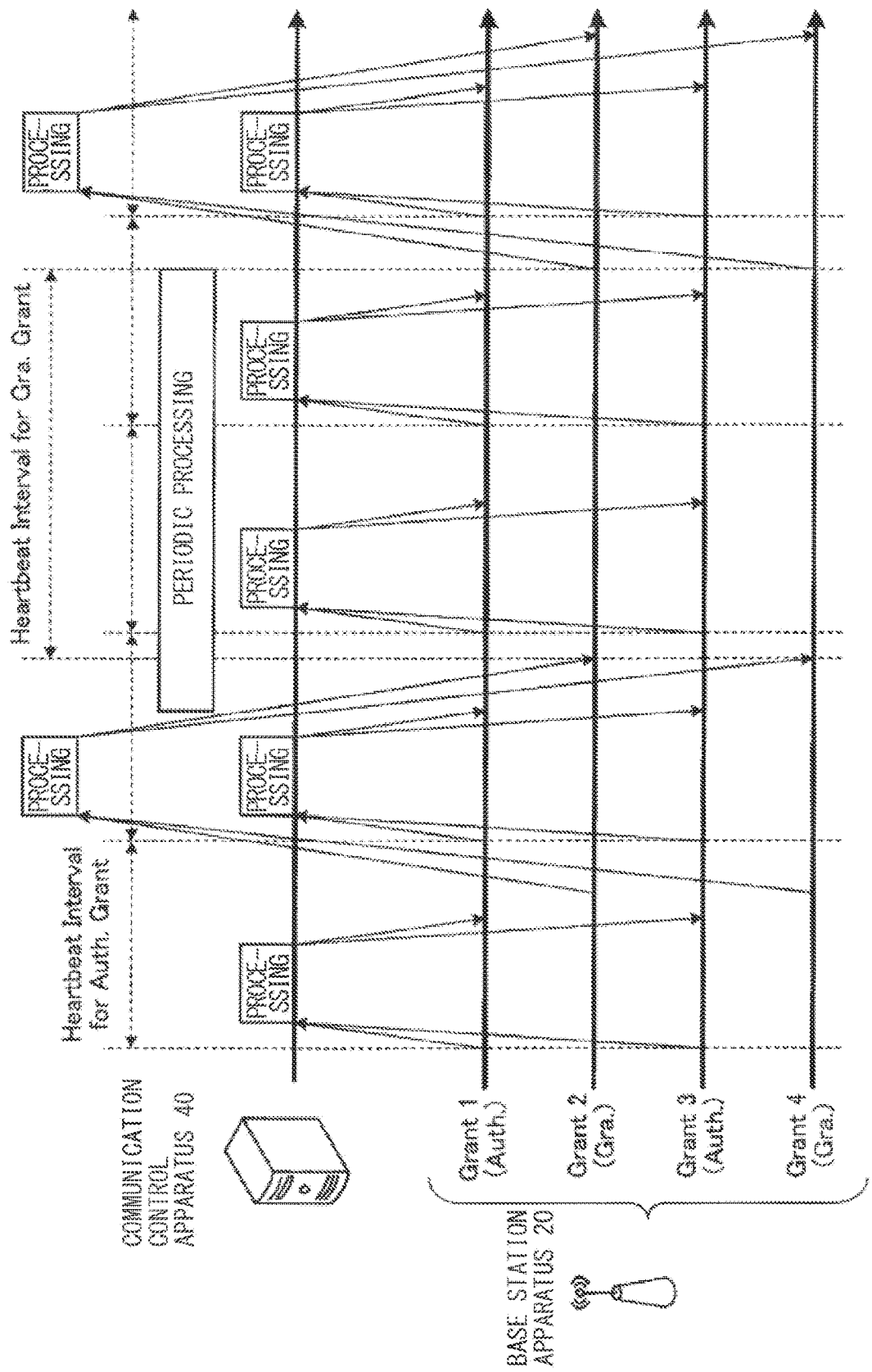

COMMUNICATION CONTROL APPARATUS, COMMUNICATION APPARATUS, AND COMMUNICATION CONTROL METHOD

CROSS REFERENCE TO RELATED APPLICATIONS

This application is a U.S. National Phase of International Patent Application No. PCT/JP2019/035429 filed on Sep. 10, 2019, which claims priority benefit of Japanese Patent Application No. JP 2018-210022 filed in the Japan Patent Office on Nov. 7, 2018. Each of the above-referenced applications is hereby incorporated herein by reference in its entirety.

TECHNICAL FIELD

The present disclosure relates to a communication control apparatus, a communication apparatus, and a communication control method.

BACKGROUND ART

An issue of depletion of radio wave resources (radio resources) allocable to wireless systems (wireless apparatuses) has emerged. It is difficult to newly allocate radio wave resources to wireless systems because all radio wave bands are already used by existing wireless systems (wireless apparatuses). Hence, more efficient use of radio wave resources by utilization of a cognitive radio technology has begun to attract attention in recent years. The cognitive radio technology uses temporal and spatial free radio waves (White Space) of the existing wireless systems to secure radio wave resources.

CITATION LIST

Non-Patent Literature

NPTL 1: WINNF-TS-0247-V1.0.0 CBRS Certified Professional Installer Accreditation Technical Specification.

NPTL 2: WINNF-TS-0016-V1.2.1 Signaling Protocols and Procedures for Citizens Broadband Radio Service (CBRS): Spectrum Access System (SAS)—Citizens Broadband Radio Service Device (CBSD) Interface Technical Specification NPTL 3: ECC Report 186, Technical and operational requirements for the operation of white space devices under geo-location approach, CEPT ECC, 2013 January NPTL 4: White Space Database Provider (WSDB) Contract, available at https://www.ofcom.org.uk/__data/assets/pdf_file/0026/84077/white_space_database_contract_for_operational_use_of_wsds.pdf NPTL 5: WINNF-TS-0096-V1.2.0 Signaling Protocols and Procedures for Citizens Broadband Radio Service (CBRS): Spectrum Access System (SAS)—SAS Interface Technical Specification NPTL 6: WINNF-TS-0112-V1.4.1 Requirements for Commercial Operation in the U.S. 3550-3700 MHz Citizens Broadband Radio Service Band NPTL 7: WINNF-TS-0061-V1.2.0 Test and Certification for Citizens Broadband Radio Service (CBRS); Conformance and Performance Test Technical Specification; SAS as Unit Under Test (UUT)

NPTL 8: IEEE Std 802.19.1aTM-2017 "Coexistence Methods for Geo-location Capable Devices Operating under General Authorization"

NPTL 9: WINNF-SSC-0008 Spectrum Sharing Committee Policy and Procedure Coordinated Periodic Activities Policy

SUMMARY OF THE INVENTION

Problems to be Solved by the Invention

However, simply using free radio waves does not necessarily enable efficient use of radio wave resources. For example, to achieve efficient use of radio wave resources, control information such as requests and responses is to be exchanged efficiently between a plurality of wireless systems (wireless apparatuses) and a control system (control apparatus) that controls them, in order to respond quickly to various situations. However, it is not easy to exchange control information efficiently in the presence of various systems under different situations.

Hence, the present disclosure proposes a communication control apparatus, a communication apparatus, and a communication control method that enable efficient use of radio wave resources.

Means for Solving the Problems

To solve the above issue, a communication control apparatus according to one embodiment of the present disclosure includes: an acquiring section that acquires, from a second wireless system that performs wireless communication by using a radio wave of a frequency band used by a first wireless system or from a proxy system that acts on behalf of the second wireless system, a request for the second wireless system to start or continue radio wave transmission; a determining section that determines a transmission interval of the request to be transmitted from a predetermined second wireless system out of a plurality of the second wireless systems or a predetermined proxy system out of a plurality of the proxy systems; and a notifying section that notifies the predetermined second wireless system or the predetermined proxy system of the determined transmission interval.

BRIEF DESCRIPTION OF DRAWINGS

FIG. 1 is an explanatory diagram illustrating a distribution example of an interference margin to communication apparatuses constituting a secondary system.

FIG. 2 is a state transition diagram illustrating a permission state of radio wave transmission.

FIG. 3 is an explanatory diagram illustrating a hierarchical structure in CBRS.

FIG. 4 is an explanatory diagram illustrating bands of the CBRS.

FIG. 5 is a diagram illustrating a configuration example of a communication system according to an embodiment of the present disclosure.

FIG. 6 is a diagram illustrating a model in which communication control apparatuses are disposed in a distributed manner.

FIG. 7 is a diagram illustrating a model in which one communication control apparatus centrally controls a plurality of communication control apparatuses.

FIG. 8 is a diagram illustrating a configuration example of a communication apparatus according to the embodiment of the present disclosure.

FIG. 9 is a diagram illustrating a configuration example of a terminal apparatus according to the embodiment of the present disclosure.

FIG. 10 is a diagram illustrating a configuration example of a communication control apparatus according to the embodiment of the present disclosure.

FIG. 11 is a diagram illustrating a configuration example of a proxy apparatus according to the embodiment of the present disclosure.

FIG. 12 is an explanatory diagram illustrating an example of an interference model assumed in the present embodiment.

FIG. 13 is an explanatory diagram illustrating another example of an interference model assumed in the present embodiment.

FIG. 14 is an explanatory diagram for explaining a primary system protection method of an interference margin simultaneous distribution type.

FIG. 15 is a diagram illustrating how a leftover interference margin occurs.

FIG. 16 is an explanatory diagram for explaining a primary system protection method of an interference margin sequential distribution type.

FIG. 17 is a sequence diagram for explaining a registration procedure.

FIG. 18 is a sequence diagram for explaining an available-frequency information query procedure.

FIG. 19 is a sequence diagram for explaining a frequency utilization permission procedure.

FIG. 20 is a sequence diagram for explaining a frequency utilization notification procedure.

FIG. 21 is a sequence diagram for explaining a management information exchange procedure.

FIG. 22 is a sequence diagram illustrating an example of heartbeat-related operation.

FIG. 23 is a diagram illustrating specific processing contents of periodic processing.

FIG. 24 is a flowchart illustrating a communication control process related to determination of a heartbeat interval.

FIG. 25 is a flowchart illustrating a request transmission process related to transmission of a heartbeat request.

FIG. 26 is a diagram illustrating how a common heartbeat interval is set for grants in the same state.

MODES FOR CARRYING OUT THE INVENTION

Hereinafter, embodiments of the present disclosure are described in detail with reference to the accompanying drawings. It is to be noted that, in the following embodiments, repeated description is omitted for the same components by assigning the same reference signs.

Further, in the present specification and drawings, a plurality of components having substantially the same functional configuration are distinguished by adding different numbers to the end of the same reference sign in some cases. For example, a plurality of components having substantially the same functional configuration are distinguished as necessary, like communication control apparatuses $40_1$ and $40_2$. It is to be noted that only the same reference sign is assigned to a plurality of components having substantially the same functional configuration in a case where there is no particular need to distinguish them. For example, in a case where there is no particular need to distinguish the communication control apparatuses $40_1$ and $40_2$, they are simply referred to as communication control apparatuses 40.

Further, the present disclosure will be described in the following order of items.
1. Introduction
1-1. Control of Wireless System for Achievement of Frequency Sharing
1-2. Overview of Present Embodiment
1-3. Terms Related to Frequency and Sharing
2. Configuration of Communication System
2-1. Overall Configuration of Communication System
2-2. Configuration of Base Station Apparatus
2-3. Configuration of Terminal Apparatus
2-4. Configuration of Communication Control Apparatus
2-5. Configuration of Proxy Apparatus
3. Interference Model
4. Primary System Protection Method
4-1. Interference Margin Simultaneous Distribution Type
4-2. Interference Margin Sequential Distribution Type
5. Description of Procedures
5-1. Registration Procedure
5-2. Available-Frequency Information Query Procedure
5-3. Frequency Utilization Permission Procedure
5-4. Frequency Utilization Notification
5-5. Supplement to Procedures
5-6. Procedures Related to Terminal Apparatus
5-7. Procedure Occurring Between Communication Control Apparatuses
6. Heartbeat-Related Operation
6-1. Typical Operation Flow
6-2. Heartbeat Interval Determination Method (First Determination Method)
6-3. Heartbeat Interval Determination Method (Second Determination Method)
6-4. Processing Flow Related to Heartbeat Interval
6-5. Heartbeat Interval Determination Method (Third Determination Method)
6-6. Case Where Base Station Apparatus Possesses Plurality of Grants
7. Modification Examples
7-1. Modification Examples Related to System Configuration
7-2. Other Modification Examples
8. Conclusion

1. INTRODUCTION

In recent years, an issue of depletion of radio wave resources (e.g., frequencies) allocable to wireless systems has emerged. However, it is difficult to newly allocate radio wave resources because all radio wave bands are already used by existing wireless systems. Hence, more efficient use of radio wave resources by utilization of a cognitive radio technology has begun to attract attention in recent years.

The cognitive radio technology utilizes temporal and spatial free radio waves (White Space) of the existing wireless systems (e.g., dynamic frequency sharing (DSA: Dynamic Spectrum Access)) to secure radio wave resources. For example, in the United States, legislation and standardization of CBRS (Citizens Broadband Radio Service) utilizing a frequency sharing technology have been accelerating with the aim of opening to the public a Federal use band (3.55-3.70 GHz), which overlaps with frequency bands known worldwide as 3GPP bands 42 and 43.

It is to be noted that the cognitive radio technology contributes not only to the dynamic frequency sharing but also to an improvement in efficiency of frequency utilization by wireless systems. For example, ETSI EN 303 387 and IEEE 802 19.1-2014 specify a coexistence technology between wireless systems that use free radio waves.

<1-1. Control of Wireless System for Achievement of Frequency Sharing>

In general, in frequency sharing, national and local regulatory authorities (NRA: National Regulatory Authority) make it compulsory to protect a wireless system (primary system) of a primary user (primary user) licensed or authorized for the use of a frequency band. Typically, the NRA provides an allowable interference reference value for the primary system, and demands that interference caused by sharing by a wireless system (secondary system) of a secondary user (secondary user) fall below the allowable interference reference value.

To achieve frequency sharing, for example, a communication control apparatus (e.g., a frequency management database) controls communication of the secondary system so as not to cause fatal interference to the primary system. The communication control apparatus is an apparatus that manages communication, etc. of a communication apparatus. For example, the communication control apparatus is an apparatus (system) for management of radio wave resources (e.g., frequencies), such as a GLDB (Geo-location Database) or a SAS (Spectrum Access System). In the present embodiment, the communication control apparatus corresponds to a communication control apparatus 40 to be described later. The communication control apparatus 40 will be described in detail later.

Here, the primary system refers to, for example, a system (e.g., an existing system) that uses radio waves of a predetermined frequency band preferentially over another system such as the secondary system. Further, the secondary system refers to, for example, a system that makes secondary use (e.g., dynamic frequency sharing) of radio waves of the frequency band used by the primary system. The primary system and the secondary system may each include a plurality of communication apparatuses or one communication apparatus. The communication control apparatus distributes interference tolerance (also referred to as an interference margin) of the primary system to one or more communication apparatuses constituting the secondary system so that aggregated interference (Interference Aggregation) caused to the primary system by the one or more communication apparatuses does not exceed the interference tolerance. In this case, the interference tolerance may be an amount of interference predetermined by an operator of the primary system or a public organization, etc. that manages radio waves. In the following description, the term "interference margin" refers to the interference tolerance. Further, the aggregated interference is sometimes referred to as aggregated interference power.

FIG. 1 is an explanatory diagram illustrating a distribution example of an interference margin to communication apparatuses constituting the secondary system. In the example of FIG. 1, a communication system 1 is the primary system and a communication system 2 is the secondary system. The communication system 1 includes a wireless communication apparatus $10_1$, etc. Further, the communication system 2 includes base station apparatuses $20_1$, $20_2$, $20_3$, etc. It is to be noted that although the communication system 1 is provided with only one wireless communication apparatus 10 in the example of FIG. 1, the communication system 1 may be provided with a plurality of wireless communication apparatuses 10. Further, although the communication system 2 is provided with three base station apparatuses 20 in the example of FIG. 1, the communication system 2 may be provided with less than three or more than three base station apparatuses 20. Further, the wireless communication apparatus provided in the communication system 2 may not necessarily be a base station apparatus. It is to be noted that although only one primary system (the communication system 1 in the example of FIG. 1) and only one secondary system (the communication system 2 in the example of FIG. 1) are illustrated in the example of FIG. 1, the primary system and the secondary system may each be a plurality of systems.

The wireless communication apparatus $10_1$ and the base station apparatuses $20_1$, $20_2$, and $20_3$ are each able to transmit and receive radio waves. An amount of interference allowed by the wireless communication apparatus $10_1$ is $I_{accept}$. Further, amounts of interference caused by the base station apparatuses $20_1$, $20_2$, and $20_3$ to a predetermined protection point of the communication system 1 (primary system) are amounts of caused interference $I_1$, $I_2$, and $I_3$, respectively. Here, the protection point is an interference calculation reference point for protection of the communication system 1.

The communication control apparatus distributes the interference margin $I_{accept}$ to the plurality of base station apparatuses 20 so that the aggregated interference to the predetermined protection point of the communication system 1 (amount of received interference $I_1+I_2+I_3$ illustrated in FIG. 1) does not exceed the interference margin $I_{accept}$. For example, the communication control apparatus distributes the interference margin $I_{accept}$ to the respective base station apparatuses 20 so that the amounts of caused interference $I_1$, $I_2$, and $I_3$ are each $I_{accept}/3$. Alternatively, the communication control apparatus distributes the interference margin $I_{accept}$ to the respective base station apparatuses 20 so that the amounts of caused interference $I_1$, $I_2$, and $I_3$ are each equal to or less than $I_{accept}/3$. Needless to say, a method of distributing the interference margin is not limited to this example.

The communication control apparatus calculates maximum transmission power allowed for each base station apparatus 20 (hereinafter referred to as maximum allowable transmission power) on the basis of the amount of interference distributed (hereinafter referred to as amount of distributed interference). For example, the communication control apparatus calculates the maximum allowable transmission power of each base station apparatus 20 by back-calculating from the amount of distributed interference, on the basis of propagation loss, antenna gain, etc. Then, the communication control apparatus notifies each base station apparatus 20 of information about the calculated maximum allowable transmission power.

<1-2. Overview of Present Embodiment>

In NPTL 2, a signaling protocol between a database (SAS) and a base station (CBSD) is standardized for 3550-3700 MHz frequency sharing in the United States. The CBSD (Citizens Broadband Radio Service Device) is, for example, a wireless device that performs communication using radio waves of a frequency band of the CBRS. In this standard, radio wave transmission authorization that the SAS gives to the CBSD is referred to as a "grant (Grant)". Operation parameters authorized by the grant are defined by two factors: maximum allowable EIRP (Equivalent Isotropic Radiated Power) and a frequency channel. That is, in order to perform radio wave transmission using a plurality of frequency channels, it is necessary for the CBSD to acquire a plurality of grants from the SAS.

A state (State) indicating a permission state of radio wave transmission is defined by the grant. FIG. 2 is a state transition diagram illustrating the permission state of radio wave transmission. In FIG. 2, a Granted state indicates a state in which the grant is possessed but radio wave transmission is not permitted, and an Authorized state indicates a state in which radio wave transmission is permitted on the basis of operation parameter values defined by the grant. Transition occurs between these two states depending on a result of a heartbeat procedure (Heartbeat Procedure) specified in the same standard.

Various objectives are defined for the heartbeat procedure, one of which is issuing a radio wave suspension instruction to the CBSD when a ship-based radar, which is an existing system in the same band, is using radio waves. It is compulsory for SASs to suspend radio waves of all CBSDs that can cause interference within 300 seconds in a case where it is determined that the ship-based radar is using radio waves. In this case, issuing a push notification of the suspension instruction is assumed to be complicated in implementation. Therefore, instead, the CBSD issues a heartbeat (Heartbeat) to the SAS on a regular basis, and it is thus allowed to issue a radio wave suspension instruction by using a response (Response) thereto.

Here, a heartbeat interval (Heartbeat Interval) at which the CBSD issues a heartbeat is designated by the SAS. In addition to the above 300-second rule, it is compulsory for the CBSD to suspend radio waves within 60 seconds upon receiving an instruction from the SAS. Therefore, it is basically recommended to set a maximum value of the heartbeat interval to a value of 240 seconds or less.

NPTL 7 and NPTL 9 disclose a synchronization technique between SASs, called CPAS (Coordinated Periodic Activities among SASs). The technique performs, once every 24 hours, information synchronization between SASs and calculation related to protection of an existing system (Incumbent). In the following description, calculation related to protection of the existing system is sometimes referred to as primary system protection calculation. It is necessary for the CBSD to perform radio wave transmission while protecting the existing system. Therefore, if a grant (Grant) is acquired during daytime, the state of the Grant does not become the Authorized state until the next CPAS is completed. That is, no matter how many times a heartbeat request (Heartbeat request) comes, the SAS continues to issue the suspension (Suspension) instruction to the CBSD.

As describe above, it is very inefficient to continue performing heartbeat request even though the state of the Grant is known not to become the Authorized state.

Hence, the present embodiment enables a transmission interval (e.g., heartbeat interval) of a request (e.g., heartbeat request) for a second wireless system (e.g., a base station apparatus such as a CBSD) to start or continue radio wave transmission to be determined by various methods by a communication control apparatus (e.g., a SAS) that controls the second wireless system. The second wireless system performs wireless communication using radio waves of a frequency band used by a first wireless system (e.g., primary system).

This enables efficient exchange of information between the second wireless system and the communication control apparatus. As a result, communication volume and processing loads are reduced, which enables a secondary system including the second wireless system to respond quickly to various situations as a whole system. This results in achievement of efficient use of radio wave resources.

<1-3. Terms Related to Frequency and Sharing>

It is to be noted that, in the present embodiment, the primary system (the communication system 1) and the secondary system (the communication system 2) are assumed to be in a dynamically frequency sharing environment. Hereinafter, the present embodiment will be described taking as an example the CBRS legally prepared by the FCC (Federal Communications Commission) of the U.S. It is to be noted that the communication system 1 and the communication system 2 of the present embodiment are not limited to the CBRS.

FIG. 3 is an explanatory diagram illustrating a hierarchical structure in the CBRS. As illustrated in FIG. 3, each of users of a frequency band is classified into one of three groups. This group is called "tier". As the respective three groups, a hierarchical structure including an incumbent tier (Incumbent Tier), a priority access tier (Priority Access Tier), and a general authorized access tier (General Authorized Access Tier) is defined. In this hierarchical structure, the priority access tier (Priority Access Tier) is located higher than the general authorized access tier (General Authorized Access Tier), and the incumbent tier (Incumbent Tier) is located higher than the priority access tier. Taking the CBRS as an example, a system (existing system) located in the incumbent tier serves as the primary system, and a system located in the general authorized access tier and the priority access tier serves as the secondary system.

The incumbent tier (Incumbent Tier) is a group including existing users of the shared frequency band. In the CBRS, the Department of Defense (DOD: Department of Defense), a fixed satellite operator, and a grandfathered wireless broadband licensee (GWBL: Grandfathered Wireless Broadband Licensee) are defined as existing users. The "Incumbent Tier" is not requested to avoid or suppress interference with the "Priority Access Tier" and "the GAA (General Authorized Access) Tier" with lower priority. Further, the "Incumbent Tier" is protected against interference from the "Priority Access Tier" and the "GAA Tier". That is, the user of the "Incumbent Tier" is able to use the frequency band without considering the presence of other groups.

The priority access tier (Priority Access Tier) is a group including users with a license called PAL (Priority Access License). The "Priority Access Tier" is requested to avoid or suppress interference with the "Incumbent Tier" with higher priority than the "Priority Access Tier", but is not requested to avoid or suppress interference with the "GAA Tier" with lower priority. Further, the "Priority Access Tier" is not protected against interference from the "Incumbent Tier" with higher priority, but is protected against interference from the "GAA Tier" with lower priority.

The general authorized access tier (GAA Tier) is a group including all other users that do not belong to the "Incumbent Tier" and the "Priority Access Tier". The "GAA Tier" is requested to avoid or suppress interference with the "Incumbent Tier" and the "Priority Access Tier" with higher priority. Further, the "GAA Tier" is not protected against interference from the "Incumbent Tier" and the "Priority Access Tier" with higher priority. That is, the "GAA Tier" is a "tier" that is legislatively requested of opportunistic (opportunistic) frequency utilization.

It is to be noted that the hierarchical structure is not limited to these definitions. Although the CBRS is generally referred to as a 3Tier structure, it may be a 2Tier structure. Typical examples include 2Tier structures such as LSA (Licensed Shared Access) and TVWS (TV band White Space). The LSA adopts a structure equivalent to combination of the "Incumbent Tier" and the "Priority Access Tier". In addition, the TVWS adopts a structure equivalent to combination of the "Incumbent Tier" and the "GAA Tier". Further, four or more Tiers may be present. Specifically, for example, an intermediate tier corresponding to the "Priority Access Tier" may be further assigned priority, etc. Further, for example, the "GAA Tier" may similarly be assigned priority, etc.

FIG. 4 is an explanatory diagram illustrating bands of the CBRS. Taking the above CBRS as an example, the primary system is a military radar system (Military Radar System), a grandfathered wireless system (Grandfathered Wireless System), or fixed satellite service (space to earth) (Fixed Satellite Service (space-to-earth)). Here, the military radar system is typically a ship-based radar. Further, the secondary system is a wireless network system including a base station and a terminal called a CBSD (Citizens Broadband Radio Service Device) and a EUD (End User Device). Priority is further present for the secondary system, and priority access license (PAL: Priority Access License) enabling licensed use of the shared band and substantially unlicensed general authorized access (GAA: General Authorized Access) are defined. A tier 1 (Tier 1) illustrated in FIG. 4 corresponds to the incumbent tier illustrated in FIG. 3. Further, a tier 2 (Tier 2) illustrated in FIG. 4 corresponds to the priority access tier illustrated in FIG. 3. In addition, a tier 3 (Tier 3) illustrated in FIG. 4 corresponds to the general authorized access tier illustrated in FIG. 3.

It is to be noted that the primary system (the communication system 1) of the present embodiment is not limited to the example illustrated in FIG. 4. Another type of wireless system may be used as the primary system (the communication system 1). For example, another wireless system may be used as the primary system, depending on the country/region/frequency band to which the present embodiment is applied. For example, the primary system may be a television broadcasting system, such as a DVB-T (Digital Video Broadcasting-Terrestrial) system. The primary system may also be a wireless system called a FS (Fixed System). It may also be frequency sharing in another frequency band. For example, typical examples may include LSA and TVWS (TV band White Space). The primary system may also be a cellular communication system such as LTE (Long Term Evolution) or NR (New Radio). The primary system may also be an aeronautical radio system, such as ARNS (Aeronautical Radio Navigation Service). Needless to say, the primary system is not limited to the above wireless system and may be another type of wireless system.

Further, the free radio waves (White Space) used by the communication system 2 is not limited to radio waves of the Federal use band (3.55-3.70 GHz). The communication system 2 may use radio waves of a frequency band different from the Federal use band (3.55-3.70 GHz) as free radio waves. For example, if the primary system (the communication system 1) is a television broadcasting system, the communication system 2 may be a system that uses TV white space as free radio waves. Here, the TV white space refers to a frequency band that is not used by the television broadcasting system among frequency channels allocated to the television broadcasting system (primary system). In this case, the TV white space may be a channel that is not used depending on the region.

Further, the relationship between the communication system 1 and the communication system 2 is not limited to a frequency sharing relationship with the communication system 1 as the primary system and the communication system 2 as the secondary system. The relationship between the communication system 1 and the communication system 2 may be a network coexistence (Network Coexistence) relationship between identical or different wireless systems using the same frequency.

In general, in frequency sharing, the existing system using the target band is referred to as the primary system, and the system of the secondary user is referred to as the secondary system. However, in a case of applying the present embodiment to an environment other than a frequency sharing environment, these (primary system, secondary system) may be replaced with a system expressed by another term. For example, a macrocell in a HetNet may be used as the primary system, and a small cell or a relay station may be used as the secondary system. Further, a base station may be used as the primary system, and a Relay UE or Vehicle UE present in its coverage and implementing D2D or V2X may be used as the secondary system. The base station is not limited to a fixed type, and may be a portable/mobile type. In such a case, for example, the communication control apparatus provided by the present invention may be provided in a base station, a relay station, a Relay UE, or the like.

It is to be noted that the term "frequency" appearing in the following description may be replaced with another term. For example, the term "frequency" may be replaced with terms such as "resource," "resource block," "resource element," "channel," "component carrier," "carrier," and "subcarrier", and terms having meanings similar to these.

2. CONFIGURATION OF COMMUNICATION SYSTEM

Hereinafter, the communication system 2 according to an embodiment of the present disclosure will be described. The communication system 2 is a wireless communication system that performs wireless communication by making secondary use of radio waves used by the communication system 1 (first wireless system). For example, the communication system 2 is a wireless communication system that performs dynamic frequency sharing by using free radio waves of the communication system 1. The communication system 2 uses a predetermined wireless access technology (Radio Access Technology) to provide wireless services to a user or an apparatus of the user.

Here, the communication system 2 may be a cellular communication system such as W-CDMA (Wideband Code Division Multiple Access), cdma2000 (Code Division Multiple Access 2000), LTE, or NR. In the following description, the "LTE" is assumed to include LTE-A (LTE-Advanced), LTE-A Pro (LTE-Advanced Pro), and EUTRA (Evolved Universal Terrestrial Radio Access). Further, the "NR" is assumed to include a NRAT (New Radio Access Technology) and FEUTRA (Further EUTRA). It is to be noted that the communication system 2 is not limited to a cellular communication system. For example, the communication system 2 may be another wireless communication system, such as a wireless LAN (Local Area Network) system, a television broadcasting system, an aeronautical radio system, or a space radiocommunication system.

In the present embodiment, the communication system 1 is the primary system and the communication system 2 is the secondary system. As described above, the communication system 1 and the communication system 2 may each be a plurality of systems. It is to be noted that, although the communication system 1 includes one wireless communication apparatus 10 (the wireless communication apparatus $10_1$ illustrated in FIG. 1) in the example of FIG. 1, it may include a plurality of wireless communication apparatuses 10. The wireless communication apparatus 10 may have the same configuration as the base station apparatus 20 or a terminal apparatus 30 to be described later.

<2-1. Overall Configuration of Communication System>

The communication system 2 typically includes the following entities.

Communication apparatus (e.g., base station apparatus or proxy apparatus)
Terminal apparatus
Communication control apparatus It is to be noted that, in the following description, the entity to be the communication apparatus is assumed to be the base station apparatus 20 and/or a proxy apparatus 50. However, the entity to be the communication apparatus is not limited to the base station apparatus 20 and the proxy apparatus 50, and may be another communication apparatus (e.g., the terminal apparatus 30 and the communication control apparatus 40).

FIG. 5 is a diagram illustrating a configuration example of the communication system 2 according to the embodiment of the present disclosure. The communication system 2 includes the base station apparatus 20, the terminal apparatus 30, the communication control apparatus 40, and the proxy apparatus 50. The communication system 2 provides wireless services to the user or an apparatus of the user by cooperative operation of apparatuses (e.g., a communication apparatus such as a wireless communication apparatus) constituting the communication system 2. The wireless communication apparatus refers to an apparatus with a wireless communication function, and corresponds to the base station apparatus 20 and the terminal apparatus 30 in the example of FIG. 5.

It is to be noted that the communication control apparatus 40 and the proxy apparatus 50 may have a wireless communication function. In this case, the communication control apparatus 40 and the proxy apparatus 50 may also be regarded as wireless communication apparatuses. In the following description, a wireless communication apparatus is sometimes referred to simply as a communication apparatus. It is to be noted that the communication apparatus is not limited to a wireless communication apparatus. For example, an apparatus that does not have a wireless communication function and is able to perform only wired communication may also be regarded as a communication apparatus.

The communication system 2 may include a plurality of base station apparatuses 20, a plurality of terminal apparatuses 30, a plurality of communication control apparatuses 40, and a plurality of proxy apparatuses 50. In the example of FIG. 5, the communication system 1 includes base station apparatuses $20_1$, $20_2$, $20_3$, $20_4$, $20_5$, etc. as the base station apparatus 20. Further, the communication system 2 includes terminal apparatuses $30_1$, $30_2$, $30_3$, $30_4$, etc. as the terminal apparatus 30. The communication system 1 also includes communication control apparatuses $40_1$, $40_2$, etc. as the communication control apparatus 40.

It is to be noted that, in the following description, the wireless communication apparatus is sometimes referred to as a wireless system. For example, the wireless communication apparatus 10 and the base station apparatuses $20_1$ to $20_5$ each are one wireless system. Further, the terminal apparatuses $30_1$ to $30_4$ each are one wireless system. It is to be noted that the communication system 1 is the first wireless system in the following description, but each of one or more wireless communication apparatuses 10 provided in the communication system 1 may be regarded as the first wireless system. Further, each of one or more base station apparatuses 20 provided in the communication system 2 is the second wireless system in the following description, but the communication system 2 itself may be regarded as the second wireless system, or each of one or more terminal apparatuses 30 provided in the communication system 2 may be regarded as the second wireless system. Each communication control apparatus 40 or each proxy apparatus 50 may be regarded as the second wireless system if the communication control apparatus 40 and the proxy apparatus 50 have a wireless communication function.

It is to be noted that the wireless system may be one system including a plurality of communication apparatuses including at least one wireless communication apparatus. For example, a system including one or more base station apparatuses 20 and one or more terminal apparatuses 30 subordinate thereto may be regarded as one wireless system. Further, the communication system 1 or the communication system 2 may each be regarded as one wireless system. In the following description, a communication system including a plurality of communication apparatuses including at least one wireless communication apparatus is sometimes referred to as a wireless communication system or simply a communication system. It is to be noted that one system including a plurality of communication apparatuses including one wireless communication apparatus may be regarded as the first wireless system or the second wireless system.

The base station apparatus 20 (second wireless system) is a wireless communication apparatus that wirelessly communicates with the terminal apparatus 30 or another communication apparatus (another base station apparatus 20, another proxy apparatus 50). The base station apparatus 20 is a type of communication apparatus. The base station apparatus 20 is, for example, an apparatus corresponding to a wireless base station (Base Station, Node B, eNB, gNB, etc.) or a wireless access point (Access Point). The base station apparatus 20 may be a wireless relay station. The base station apparatus 20 may also be an optical feeder called a RRH (Remote Radio Head). In the present embodiment, a base station of the wireless communication system is sometimes referred to as a base station apparatus. It is to be noted that a wireless access technology used by the base station apparatus 20 may be a cellular communication technology or a wireless LAN technology. Needless to say, the wireless access technology used by the base station apparatus 20 is not limited thereto and may be other wireless access technologies.

The base station apparatus 20 may not necessarily be fixed, and may be installed in a moving object like an automobile. In addition, the base station apparatus 20 may not necessarily be present on the ground; objects present in the air or space, such as aircrafts, drones, helicopters, and satellites, or objects present on and in the sea, such as ships and submarines, may be provided with communication apparatus functions. In such a case, the base station apparatus 20 may wirelessly communicate with another fixedly installed communication apparatus.

The coverage size of the base station apparatus 20 may also be a large size as with a macrocell or a small size as with a picocell. Needless to say, the coverage size of the base station apparatus 20 may be an extremely small size as with a femtocell. Further, in a case where the base station apparatus 20 has a beamforming capability, a cell or a service area may be formed for each beam.

The base station apparatus 20 may be used, operated, and/or managed by various entities. For example, a mobile network operator (MNO: Mobile Network Operator), a mobile virtual network operator (MVNO: Mobile Virtual Network Operator), a mobile virtual network enabler (MVNE: Mobile Virtual Network Enabler), a neutral host network (NHN: Neutral Host Network) operator, an enterprise, an educational body (school corporation, local board of education, etc.), a real estate (building, apartment, etc.) administrator, an individual, etc. may be assumed for the base station apparatus 20. Needless to say, the subject responsible for using, operating, and/or managing the base station apparatus 20 is not limited thereto.

The base station apparatus 20 may be installed and/or operated by one operator or may be installed and/or operated by one individual. Needless to say, the subject responsible for installing and operating the base station apparatus 20 is not limited thereto. For example, the base station apparatus 20 may be jointly installed and operated by a plurality of operators or a plurality of individuals. The base station apparatus 20 may also be a shared facility used by a plurality of operators or a plurality of individuals. In this case, installation and/or operation of the facility may be performed by a third party different from the users.

The base station apparatus 20 operated by the operator is typically Internet-connected via a core network. In addition, the base station apparatus 20 is operated and maintained by a function called OA&M (Operation, Administration & Maintenance). It is to be noted that, for example, the communication system 2 may include a network manager that integrates and controls the base station apparatuses 20 in the network.

It is to be noted that the concept of a base station includes access points and wireless relay stations (also called relay apparatuses). Further, the concept of a base station includes not only a structure (Structure) with a function of a base station, but also an apparatus installed in the structure. The structure is, for example, a building (Building) such as an office building, a house, a steel tower, a station facility, an airport facility, a port facility, or a stadium. It is to be noted that the concept of a structure includes not only buildings but also constructions (Non-building structure) such as tunnels, bridges, dams, walls, and steel columns, as well as facilities such as cranes, gates, or wind turbines. Further, the concept of a structure includes not only a structure on the ground (land) or underground, but also a structure over water such as piers and mega-floats, and an underwater structure such as oceanographic observation facilities.

The base station may also be a movably configured base station (mobile station). In this case, the base station (mobile station) may be a wireless communication apparatus installed in a mobile body or may be the mobile body itself. Further, the mobile body may be a mobile body (e.g., a vehicle such as an automobile, a bus, a truck, a train, or a linear motor car) that moves over the ground (land), or may be a mobile body (e.g., a subway) that moves underground (e.g., in a tunnel). Needless to say, the mobile body may be a mobile terminal such as a smartphone. The mobile body may also be a mobile body moving over water (e.g., a vessel such as a passenger ship, a cargo ship, or a hovercraft), or may be a mobile body moving underwater (e.g., a submersible such as a submersible vessel, a submarine, or an unmanned underwater vehicle). The mobile body may also be a mobile body moving in the atmosphere (e.g., an aircraft such as an airplane, an airship, or a drone), or may be a space mobile body moving outside the atmosphere (e.g., an artificial celestial body such as an artificial satellite, a spacecraft, a space station, or an explorer).

The terminal apparatus 30 is communication equipment having a communication function. The terminal apparatus 30 is typically communication equipment such as a smart phone. The terminal apparatus 30 may be a user terminal such as a cellular phone, a smart device (a smart phone or a tablet), a wearable terminal, a PDA (Personal Digital Assistant), or a personal computer. The terminal apparatus is sometimes referred to as a User Equipment, a User Terminal, a User Station, a Mobile Terminal, a Mobile Station, etc.

It is to be noted that the terminal apparatus 30 may not be used by persons. The terminal apparatus 30 may be a sensor installed in a machine or building of a factory, like so-called MTC (Machine Type Communication). The terminal apparatus 30 may also be an M2M (Machine to Machine) device or an IoT (Internet of Things) device. Further, the terminal apparatus 30 may be an apparatus having a relay communication function, as typified by D2D (Device to Device) and V2X (Vehicle to everything). Further, the terminal apparatus 30 may be equipment called CPE (Client Premises Equipment) and used in a wireless backhaul or the like. Further, the terminal apparatus 30 may be a wireless communication apparatus installed in a mobile body or may be the mobile body itself.

In addition, the terminal apparatus 30 may not necessarily be present on the ground, and may be objects present in the air or space, such as aircrafts, drones, helicopters, and satellites, and objects present on and in the sea, such as ships and submarines.

The communication control apparatus 40 is an apparatus that manages the base station apparatus 20. For example, the communication control apparatus 40 is an apparatus that controls wireless communication of the base station apparatus 20. For example, the communication control apparatus 40 determines communication parameters (also referred to as operation parameters) to be used by the base station apparatus 20, and issues a permission or an instruction to the base station apparatus 20. In this case, the communication control apparatus 40 may be a network manager that integrates and controls the wireless apparatuses in the network. Taking ETSI EN 303 387 and IEEE 802 19.1-2014 as an example, the communication control apparatus 40 may be a control apparatus such as a Spectrum Manager/Coexistence Manager that performs radio wave interference control between pieces of wireless equipment. Further, for example, a RLSS (Registered Location Secure Server) specified in IEEE 802 11-2016 may also serve as the communication control apparatus 40. In addition, in a frequency sharing environment, a database (database server, apparatus, or system) such as a GLDB (Geolocation database) or a SAS (Spectrum Access System) may also serve as the communication control apparatus 40. Basically, the control target of the communication control apparatus 40 is the base station apparatus 20, but the communication control apparatus 40 may control the terminal apparatus 30 subordinate thereto.

It is to be noted that a plurality of communication control apparatuses 40 may be present in one communication system 2. FIG. 6 illustrates a model in which the communication control apparatuses 40 are disposed in a distributed manner. In this case, the plurality of communication control apparatuses 40 (in the example of FIG. 6, the communication control apparatus $40_1$ and the communication control apparatus $40_2$) exchange information about the base station apparatus 20 managed by each other, and perform necessary frequency allocation and interference control calculation.

The communication control apparatus 40 may also be a master-slave type apparatus. FIG. 7 is a diagram illustrating a model in which one communication control apparatus centrally controls a plurality of communication control apparatuses (so-called master-slave model). In the example of FIG. 7, the master communication control apparatus is a communication control apparatus $40_3$, and the slave communication control apparatuses are communication control apparatuses $40_4$ and $40_5$. In such a system, the master communication control apparatus is able to control a plurality of slave communication control apparatuses and make decisions intensively. In addition, the master communication control apparatus may delegate and abandon the decision-making authority for the slave communication control apparatuses for load distribution (load balancing) or the like.

It is to be noted that the communication control apparatus 40 may, to play its role, acquire necessary information also from entities other than the base station apparatus 20, the terminal apparatus 30, and the proxy apparatus 50. Specifically, the communication control apparatus 40 may acquire information necessary for protection, such as position information of the primary system, from a database (regulatory database) managed and operated by a national or local radio wave administrative agency, for example. Examples of regulatory databases include a ULS (Universal Licensing System) operated by the U.S. Federal Communications Commissions (Federal Communications Commissions). Other examples of information necessary for protection may include, for example, an out-of-band emission limit (DOBE (Out-of-Band Emission) Limit), an adjacent-channel leakage ratio (ACLR: Adjacent Channel Leakage Ratio), adjacent-channel selectivity (Adjacent Channel Selectivity), a fading margin, and/or a protection ratio (PR: Protection Ratio). For these examples, in a case where numerical values are fixedly given by law, it is desirable to use them.

Further, as other examples, it may be assumed that the communication control apparatus 40 acquires radio wave sensing information from a radio wave sensing system that is installed and operated for radio wave detection of the primary system. As a specific example, the communication control apparatus 40 may acquire radio wave detection information of the primary system from a radio wave sensing system such as an environmental sensing function (ESC: Environmental Sensing Capability) in the U.S. CBRS. Further, in a case where a communication apparatus or a terminal has a sensing function, the communication control apparatus 40 may acquire radio wave detection information of the primary system from them.

The proxy apparatus 50 (proxy system) is an apparatus that acts on behalf of (as a representative for) one or more communication apparatuses (e.g., the base station apparatus 20) to communicate with the communication control apparatus 40. The proxy apparatus 50 is also a type of communication apparatus. The proxy apparatus 50 may be a DP (Domain Proxy) specified in NPTL 2 or the like. Here, the DP refers to an entity that communicates with the SAS on behalf of each of a plurality of CBSDs or a network including a plurality of CBSDs. It is to be noted that the proxy apparatus 50 is not limited to the DP specified in NPTL 2, as long as it has a function of acting on behalf of (as a representative for) one or more communication apparatuses to communicate with the communication control apparatus 40. A network manager that integrates and controls the base station apparatuses 20 in the network may be regarded as the proxy apparatus 50.

Interfaces between the entities may be either wired or wireless. For example, as an interface between the communication control apparatus and the communication apparatus, it is possible to use a wireless interface independent of frequency sharing, as well as a wired circuit. In this case, the wireless interface may be, for example, a wireless interface provided by a mobile network operator via a licensed band (Licensed band) or a wireless interface using an existing license-exempt band (License-exempt band) (e.g., a wireless interface using Wi-Fi communication).

The configurations of the apparatuses constituting the communication system 2 will be specifically described below.

<2-2. Configuration of Base Station Apparatus>

First, the configuration of the base station apparatus 20 will be described. FIG. 8 is a diagram illustrating a configuration example of the base station apparatus 20 according to the embodiment of the present disclosure. The base station apparatus 20 is a wireless communication apparatus (wireless system) that wirelessly communicates with the terminal apparatus 30 under the control of the communication control apparatus 40. For example, the base station apparatus 20 is a base station apparatus (ground station apparatus) located on the ground. In this case, the base station apparatus 20 may be a base station apparatus installed in a structure located on the ground, or may be a base station apparatus installed in a mobile body moving over the ground. More specifically, the base station apparatus 20 may be an antenna installed in a structure, such as a building, and a signal processing apparatus coupled to the antenna. Needless to say, the base station apparatus 20 may be a structure or mobile body itself. The "ground" is a ground in a broad sense that includes not only the ground (land) but also underground, over water, and underwater. The base station apparatus 20 is a type of communication apparatus.

It is to be noted that the base station apparatus 20 is not limited to the ground station apparatus. For example, the base station apparatus 20 may be a base station apparatus (non-ground station apparatus) that moves or floats in the air or in space. In this case, the base station apparatus 20 may be an aircraft station apparatus or a satellite station apparatus.

The aircraft station apparatus may be an apparatus mounted on an aircraft or the like, or it may be the aircraft itself. The concept of the aircraft includes not only a heavy aircraft such as airplanes and gliders, but also a light aircraft such as balloons and airships. The concept of the aircraft also includes rotorcrafts such as helicopters and autogyros. It is to be noted that the aircraft station apparatus (or an aircraft on which the aircraft station apparatus is mounted) may be a manned aircraft or an unmanned aircraft such as a drone.

The satellite station apparatus may be an apparatus mounted on a space mobile body such as an artificial satellite, or may be a space mobile body itself. The satellite to be the satellite station apparatus may be any of a low-earth-orbiting (LEO: Low Earth Orbiting) satellite, a medium-earth-orbiting (MEO: Medium Earth Orbiting) satellite, a geostationary-earth-orbiting (GEO: Geostationary Earth Orbiting) satellite, and a highly elliptical orbiting (HEO: Highly Elliptical Orbiting) satellite. Needless to say, the satellite station apparatus may be an apparatus mounted on a low-earth-orbiting satellite, a medium-earth-orbiting satellite, a geostationary satellite, or a highly elliptical orbiting satellite.

The base station apparatus 20 may also be a relay station apparatus. The relay station apparatus is, for example, an aeronautical station or an earth station. The relay station apparatus may be regarded as a type of the relay apparatus described above. The aeronautical station is a wireless station installed on the ground or in a mobile body moving over the ground to communicate with the aircraft station apparatus. In addition, the earth station is a wireless station located on the earth (including in the air) to communicate with the satellite station apparatus. The earth station may be a large earth station, or a small earth station such as a VSAT (Very Small Aperture Terminal). It is to be noted that the earth station may be a VSAT control earth station (also referred to as a master station or a HUB station) or may be a VSAT earth station (also referred to as a slave station). The earth station may also be a wireless station installed in a mobile body moving over the ground. Examples of an earth station to be mounted on a vessel include earth stations on board vessels (ESV: Earth Stations on board Vessels). In addition, the earth station may include an aircraft earth station that is installed in an aircraft (including a helicopter) and communicates with the satellite station. In addition, the earth station may include an aeronautical earth station that is installed in a mobile body moving over the ground and communicates with the aircraft earth station via the satellite station. It is to be noted that the relay station apparatus may be a portable wireless station that communicates with a satellite station or an aircraft station.

The base station apparatus 20 includes a wireless communication unit 21, a storage unit 22, a network communication unit 23, and a control unit 24. It is to be noted that the configuration illustrated in FIG. 8 is a functional configuration, and a hardware configuration may be different from this. Further, the functions of the base station apparatus 20 may be implemented in a distributed manner in a plurality of physically separated apparatuses.

The wireless communication unit 21 is a wireless communication interface that wirelessly communicates with another communication apparatus (e.g., the terminal apparatus 30, the communication control apparatus 40, the proxy apparatus 50, and another base station apparatus 20). The wireless communication unit 21 operates under the control of the control unit 24. The wireless communication unit 21 may support a plurality of wireless access schemes. For example, the wireless communication unit 21 may support both NR and LTE. The wireless communication unit 21 may support other cellular communication schemes such as W-CDMA and cdma2000. Further, the wireless communication unit 21 may support a wireless LAN communication scheme in addition to the cellular communication scheme. Needless to say, the wireless communication unit 21 may only support one wireless access scheme.

The wireless communication unit 21 includes a receiving processor 211, a transmitting processor 212, and an antenna 213. The wireless communication unit 21 may include a plurality of receiving processors 211, a plurality of transmitting processors 212, and a plurality of antennas 213. It is to be noted that, in a case where the wireless communication unit 21 supports a plurality of wireless access schemes, each part of the wireless communication unit 21 may be configured individually for each wireless access scheme. For example, if the base station apparatus 20 supports NR and LTE, the receiving processor 211 and the transmitting processor 212 may be configured individually for the NR and the LTE.

The receiving processor 211 processes uplink signals received via the antenna 213. The receiving processor 211 includes a wireless receiver 211a, a demultiplexer 211b, a demodulator 211c, and a decoder 211d.

The wireless receiver 211a performs, on the uplink signal, down-conversion, removal of unwanted frequency components, control of amplifying levels, quadrature demodulation, conversion to a digital signal, removal of a guard interval, extraction of a frequency domain signal by fast Fourier transform, and the like. For example, assume that the wireless access scheme of the base station apparatus 20 is a cellular communication scheme such as LTE. In this case, the demultiplexer 211b demultiplexes, from the signal outputted from the wireless receiver 211a, uplink channels such as a PUSCH (Physical Uplink Shared Channel) or a PUCCH (Physical Uplink Control Channel) and an uplink reference signal. The demodulator 211c demodulates received signals by using a modulation scheme such as BPSK (Binary Phase Shift Keying) or QPSK (Quadrature Phase shift Keying) for modulation symbols of the uplink channels. The modulation scheme used by the demodulator 211c may be 16QAM (Quadrature Amplitude Modulation), 64QAM, or 256QAM. The decoder 211d performs decoding processing on encoded bits of the demodulated uplink channels. The decoded uplink data and uplink control information are outputted to the control unit 24.

The transmitting processor 212 performs a process of transmitting downlink control information and downlink data. The transmitting processor 212 includes an encoder 212a, a modulator 212b, a multiplexer 212c, and a wireless transmitter 212d.

The encoder 212a encodes the downlink control information and the downlink data inputted from the control unit 24 by using an encoding scheme such as block encoding, convolutional encoding, or turbo-encoding. The modulator 212b modulates the encoded bits outputted from the encoder 212a by a predetermined modulation scheme such as BPSK, QPSK, 16QAM, 64QAM, or 256QAM. The multiplexer 212c multiplexes modulation symbols of the respective channels and a downlink reference signal, and disposes the resulting signal in a predetermined resource element. The wireless transmitter 212d performs various signal processing on the signal from the multiplexer 212c. For example, the wireless transmitter 212d performs processing such as conversion to a time domain by a fast Fourier transform, addition of a guard interval, generation of a baseband digital signal, conversion to an analog signal, quadrature modulation, up-conversion, removal of extra frequency components, and power amplification. The signal generated by the transmitting processor 212 is transmitted from the antenna 213.

The storage unit 22 is a data-readable/writable storage apparatus such as a DRAM, an SRAM, a flash memory, or a hard disk. The storage unit 22 functions as a storage means of the base station apparatus 20. The storage unit 22 stores desired transmission power information, operation parameters, possessed resource information, and the like.

The desired transmission power information is information about transmission power that the base station apparatus 20 requests of the communication control apparatus 40 as information about transmission power necessary to transmit radio waves.

The operation parameters are information (e.g., setting information) related to radio wave transmission operation of the base station apparatus 20. For example, the operation parameter is information about a maximum value of transmission power (maximum allowable transmission power) allowed for the base station apparatus 20. Needless to say, the operation parameter is not limited to information about the maximum allowable transmission power.

Further, the possessed resource information is information related to radio resource possession of the base station apparatus 20. For example, the possessed resource information is information about radio resources currently available for the base station apparatus 20. For example, the possessed resource information is information about an amount of the possessed interference margin allocated from the communication control apparatus 40 to the base station apparatus 20. The information about the possessed amount may be information in units of resource blocks to be described later.

That is, the possessed resource information may be information related to resource blocks possessed by the base station apparatus 20 (e.g., an amount of the possessed resource blocks).

The network communication unit 23 is a communication interface for communication with another apparatus (e.g., the communication control apparatus 40, the proxy apparatus 50, and another base station apparatus 20). For example, the network communication unit 23 is a LAN (Local Area Network) interface such as a NIC (Network Interface Card). The network communication unit 23 may be a USB interface including a USB (Universal Serial Bus) host controller, a USB port, and the like. Further, the network communication unit 23 may be a wired interface or may be a wireless interface. The network communication unit 23 functions as a network communication means of the base station apparatus 20. The network communication unit 23 communicates with the other apparatus under the control of the control unit 24.

The control unit 24 is a controller (Controller) that controls each part of the base station apparatus 20. The control unit 24 is, for example, implemented by a processor such as a CPU (Central Processing Unit) or an MPU (Micro Processing Unit). For example, the control unit 24 is implemented by the processor executing a variety of programs stored in the storage apparatus inside the base station apparatus 20 by using a RAM (Random Access Memory), etc. as a work area. It is to be noted that the control unit 24 may be implemented by an integrated circuit such as an ASIC (Application Specific Integrated Circuit) or a FPGA (Field Programmable Gate Array). The CPU, the MPU, the ASIC, and the FPGA may all be regarded as controllers.

The control unit 24 includes an acquiring section 241, a setting section 242, and a transmitter 243, as illustrated in FIG. 8. The blocks (the acquiring section 241 to the transmitter 243) constituting the control unit 24 are functional blocks that indicate the functions of the control unit 24. These functional blocks may be software blocks or hardware blocks. For example, the functional blocks described above may each be one software module implemented by software (including a microprogram) or may be one circuit block on a semiconductor chip (die). Needless to say, the functional blocks may each be one processor or one integrated circuit. The functional block may be configured by any method. It is to be noted that the control unit 24 may be configured in functional units different from the functional blocks described above. The operation of the blocks (the acquiring section 241 to the transmitter 243) constituting the control unit 24 will be described in detail in the description of a request transmission process, etc. to be described later.

<2-3. Configuration of Terminal Apparatus>

Next, the configuration of the terminal apparatus 30 will be described. FIG. 9 is a diagram illustrating a configuration example of the terminal apparatus 30 according to the embodiment of the present disclosure. The terminal apparatus 30 is a communication apparatus that wirelessly communicates with the base station apparatus 20 and/or the communication control apparatus 40. It is to be noted that, in the present embodiment, the concept of a communication apparatus (or wireless communication apparatus) includes not only a base station apparatus and a proxy apparatus, but also a terminal apparatus. The communication apparatus (or wireless communication apparatus) may also be referred to as a wireless system.

The terminal apparatus 30 includes a wireless communication unit 31, a storage unit 32, an input-output unit 33, and a control unit 34. It is to be noted that the configuration illustrated in FIG. 9 is a functional configuration, and a hardware configuration may be different from this. Further, the functions of the terminal apparatus 30 may be implemented in a distributed manner in a plurality of physically separated components.

The wireless communication unit 31 is a wireless communication interface that wirelessly communicates with another communication apparatus (e.g., the base station apparatus 20 and another terminal apparatus 30). The wireless communication unit 31 operates under the control of the control unit 34. The wireless communication unit 31 supports one or more wireless access schemes. For example, the wireless communication unit 31 supports both NR and LTE. The wireless communication unit 31 may support another wireless access scheme, such as W-CDMA or cdma2000.

The wireless communication unit 31 includes a receiving processor 311, a transmitting processor 312, and an antenna 313. The wireless communication unit 31 may include a plurality of receiving processors 311, a plurality of transmitting processors 312, and a plurality of antennas 313. It is to be noted that, in a case where the wireless communication unit 31 supports a plurality of wireless access schemes, each part of the wireless communication unit 31 may be configured individually for each wireless access scheme. For example, the receiving processor 311 and the transmitting processor 312 may be configured individually for the LTE and the NR. The configurations of the receiving processor 311 and the transmitting processor 312 are similar to those of the receiving processor 211 and the transmitting processor 212 of the base station apparatus 20.

The storage unit 32 is a data-readable/writable storage apparatus such as a DRAM, an SRAM, a flash memory, or a hard disk. The storage unit 32 functions as a storage means of the terminal apparatus 30.

The input-output unit 33 is a user interface for exchange of information with a user. For example, the input-output unit 33 is an operation apparatus for the user to perform various operations, such as a keyboard, a mouse, an operation key, or a touch panel. Alternatively, the input-output unit 33 is a display apparatus such as a liquid crystal display (Liquid Crystal Display) or an organic EL display (Organic Electroluminescence Display). The input-output unit 33 may be an acoustic apparatus such as a loudspeaker or a buzzer. Further, the input-output unit 33 may be a lighting apparatus such as an LED (Light Emitting Diode) lamp. The input-output unit 33 functions as an input/output means (input means, output means, operation means, or notification means) of the terminal apparatus 30.

The control unit 34 is a controller that controls each part of the terminal apparatus 30. The control unit 34 is, for example, implemented by a processor such as a CPU or an MPU. For example, the control unit 34 is implemented by the processor executing a variety of programs stored in the storage apparatus inside the terminal apparatus 30 by using a RAM, etc. as a work area. It is to be noted that the control unit 34 may be implemented by an integrated circuit such as an ASIC or a FPGA. The CPU, the MPU, the ASIC, and the FPGA may all be regarded as controllers.

<2-4. Configuration of Communication Control Apparatus>

The communication control apparatus 40 is an apparatus that controls wireless communication of the base station apparatus 20. The communication control apparatus 40 may control wireless communication of the terminal apparatus 30 directly or via the base station apparatus 20. The communication control apparatus 40 may be a network manager that integrates and controls the wireless apparatuses within the network. For example, the communication control apparatus 40 may be a Spectrum Manager/Coexistence Manager. The communication control apparatus 40 may also be a database server such as a GLDB (Geolocation database) or a SAS (Spectrum Access System).

It is to be noted that, if the communication system 2 is a cellular communication system, the communication control apparatus 40 may be an apparatus constituting a core network. A core network CN is, for example, an EPC (Evolved Packet Core) or a 5GC (5G Core network). If the core network is an EPC, the communication control apparatus 40 may be, for example, an apparatus having a function as an MME (Mobility Management Entity). Further, if the core network is a 5GC, the communication control apparatus 40 may be, for example, an apparatus having a function as an AMF (Access and Mobility Management Function). It is to be noted that, even in a case where the communication system 2 is a cellular communication system, the communication control apparatus 40 may not necessarily be an apparatus that constitutes a core network. For example, the communication control apparatus 40 may be an apparatus having a function as an RNC (Radio Network Controller).

It is to be noted that the communication control apparatus 40 may have a function of a gateway. For example, if the core network is an EPC, the communication control apparatus 40 may be an apparatus having a function as a S-GW (Serving Gateway) or a P-GW (Packet Data Network Gateway). Further, if the core network is a 5GC, the communication control apparatus 40 may be an apparatus having a function as a UPF (User Plane Function). It is to be noted that the communication control apparatus 40 may not necessarily be an apparatus constituting the core network. For example, assume that the core network is a core network of W-CDMA or cdma2000. In this case, the communication control apparatus 40 may be an apparatus that functions as an RNC (Radio Network Controller).

The communication control apparatus 40 may also be a system that controls a plurality of secondary systems. In this case, the communication system 2 may be regarded as a system including a plurality of secondary systems.

FIG. 10 is a diagram illustrating a configuration example of the communication control apparatus 40 according to the embodiment of the present disclosure. The communication control apparatus 40 includes a wireless communication unit 41, a storage unit 42, a network communication unit 43, and a control unit 44. It is to be noted that the configuration illustrated in FIG. 10 is a functional configuration, and a hardware configuration may be different from this. Further, the functions of the communication control apparatus 40 may be implemented in a distributed manner in a plurality of physically separated components. For example, the communication control apparatus 40 may include a plurality of server apparatuses.

The wireless communication unit 41 is a wireless communication interface that wirelessly communicates with another communication apparatus (e.g., the base station apparatus 20, the terminal apparatus 30, the proxy apparatus 50, and another communication control apparatus 40). The wireless communication unit 41 operates under the control of the control unit 44. The wireless communication unit 31 supports one or more wireless access schemes. For example, the wireless communication unit 31 supports both NR and LTE. The wireless communication unit 31 may support another wireless access scheme, such as W-CDMA or cdma2000. The configuration of the wireless communication unit 41 is similar to that of the wireless communication unit 21 of the base station apparatus 20.

The storage unit 42 is a data-readable/writable storage apparatus such as a DRAM, an SRAM, a flash memory, or a hard disk. The storage unit 22 functions as a storage means of the base station apparatus 20. The storage unit 22 stores operation parameters of each of the plurality of base station apparatuses 20 constituting the communication system 2. It is to be noted that the storage unit 22 may store the possessed resource information of each of the plurality of base station apparatuses 20 constituting the communication system 2. As described above, the possessed resource information is information related to the possession of radio resources of the base station apparatus 20.

The network communication unit 43 is a communication interface for communication with another apparatus (e.g., the base station apparatus 20, the proxy apparatus 50, and another communication control apparatus 40). The network communication unit 43 may be a network interface or an equipment connection interface. For example, the network communication unit 43 may be a LAN (Local Area Network) interface such as a NIC (Network Interface Card). The network communication unit 43 may also be a USB interface including a USB (Universal Serial Bus) host controller, a USB port, and the like. Further, the network communication unit 43 may be a wired interface or a wireless interface. The network communication unit 43 functions as a communication means of the communication control apparatus 40. The network communication unit 43 communicates with the base station apparatus 20, the terminal apparatus 30, and the proxy apparatus 50 under the control of the control unit 44.

The control unit 44 is a controller that controls each part of the communication control apparatus 40. The control unit 44 is, for example, implemented by a processor such as a CPU or an MPU. For example, the control unit 44 is implemented by the processor executing a variety of programs stored in the storage apparatus inside the communication control apparatus 40 by using a RAM, etc. as a work area. It is to be noted that the control unit 44 may be implemented by an integrated circuit such as an ASIC or a FPGA. The CPU, the MPU, the ASIC, and the FPGA may all be regarded as controllers.

The control unit 44 includes an acquiring section 441, an assessing section 442, a determining section 443, and a notifying section 444, as illustrated in FIG. 10. The blocks (the acquiring section 441 to the notifying section 444) constituting the control unit 44 are functional blocks that indicate the functions of the control unit 44. These functional blocks may be software blocks or hardware blocks. For example, the functional blocks described above may each be one software module implemented by software (including a microprogram) or may be one circuit block on a semiconductor chip (die). Needless to say, the functional blocks may each be one processor or one integrated circuit. The functional block may be configured by any method. It is to be noted that the control unit 44 may be configured in functional units different from the functional blocks described above. The operation of the blocks (the acquiring section 441 to the notifying section 444) constituting the control unit 44 will be described in detail in the description of a communication control process, etc. to be described later.

<2-5. Configuration of Proxy Apparatus>

Next, the configuration of the proxy apparatus 50 will be described. FIG. 11 is a diagram illustrating a configuration example of the proxy apparatus 50 according to the embodiment of the present disclosure. The proxy apparatus 50 is a communication apparatus that communicates with the base station apparatus 20 and the communication control apparatus 40. The proxy apparatus 50 is a proxy system that acts on behalf of (as a representative for) one or more base station apparatuses 20 to communicate with the communication control apparatus 40. For example, the proxy apparatus 50 is a domain proxy (DP: Domain Proxy) that acts on behalf of (as a representative for) a plurality of CBSDs. It is to be noted that the proxy system may include one apparatus, or may include a plurality of apparatuses. The communication between the proxy apparatus 50 and the base station apparatus 20 may be wired communication or wireless communication. Similarly, the communication between the proxy apparatus 50 and the communication control apparatus 40 may be wired communication or wireless communication.

It is to be noted that the communication apparatus on behalf of which the proxy apparatus 50 acts (as a representative) is not limited to the base station apparatus 20 and may be, for example, the terminal apparatus 30. In the following description, one or more communication apparatuses (e.g., one or more base station apparatuses 20) on behalf of which the proxy apparatus 50 acts (as a representative) may be referred to as subordinate communication apparatuses (e.g., subordinate base station apparatuses 20).

The proxy apparatus 50 includes a wireless communication unit 51, a storage unit 52, a network communication unit 53, and a control unit 54. It is to be noted that the configuration illustrated in FIG. 11 is a functional configuration, and a hardware configuration may be different from this. Further, the functions of the proxy apparatus 50 may be implemented in a distributed manner in a plurality of physically separated components.

The wireless communication unit 51 is a wireless communication interface that wirelessly communicates with another communication apparatus (e.g., the base station apparatus 20, the terminal apparatus 30, the communication control apparatus 40, and another proxy apparatus 50). The wireless communication unit 51 operates under the control of the control unit 54. The wireless communication unit 51 supports one or more wireless access schemes. For example, the wireless communication unit 31 supports both NR and LTE. The wireless communication unit 51 may support another wireless access scheme, such as W-CDMA or cdma2000.

The storage unit 52 is a data-readable/writable storage apparatus such as a DRAM, an SRAM, a flash memory, or a hard disk. The storage unit 52 functions as a storage means of the proxy apparatus 50. The storage unit 22 may store the desired transmission power information, the operation parameters, the possessed resource information, and the like of each of the subordinate base station apparatuses 20.

The network communication unit 53 is a communication interface for communication with another apparatus (e.g., the base station apparatus 20, the communication control apparatus 40, and another proxy apparatus 50). For example, the network communication unit 53 is a LAN interface such as a NIC. The network communication unit 53 may be a USB interface including a USB host controller, a USB port, and the like. Further, the network communication unit 53 may be a wired interface or a wireless interface. The network communication unit 53 functions as a network communication means of the proxy apparatus 50. The network communication unit 53 communicates with the other apparatus under the control of the control unit 54.

The control unit 54 is a controller (Controller) that controls each part of the proxy apparatus 50. The control unit 54 is, for example, implemented by a processor such as a CPU (Central Processing Unit) or an MPU (Micro Processing Unit). For example, the control unit 54 is implemented by the processor executing a variety of programs stored in the storage apparatus inside the proxy apparatus 50 by using a RAM (Random Access Memory), etc. as a work area. It is to be noted that the control unit 24 may be implemented by an integrated circuit such as an ASIC (Application Specific Integrated Circuit) or a FPGA (Field Programmable Gate Array). The CPU, the MPU, the ASIC, and the FPGA may all be regarded as controllers.

The control unit 54 includes an acquiring section 541, a setting section 542, and a transmitter 543, as illustrated in FIG. 11. The blocks (the acquiring section 541 to the transmitter 543) constituting the control unit 24 are functional blocks that indicate the functions of the control unit 54. These functional blocks may be software blocks or hardware blocks. For example, the functional blocks described above may each be one software module implemented by software (including a microprogram) or may be one circuit block on a semiconductor chip (die). Needless to say, the functional blocks may each be one processor or one integrated circuit. The functional block may be configured by any method. It is to be noted that the control unit 24 may be configured in functional units different from the functional blocks described above. The operation of the blocks (the acquiring section 541 to the transmitter 543) constituting the control unit 54 may be the same as the operation of the blocks (the acquiring section 241 to the transmitter 243) constituting the control unit 24 of the base station apparatus 20. The description of the acquiring section 241 to the transmitter 243 appearing in the following description may be replaced with the acquiring section 541 to the transmitter 543.

3. INTERFERENCE MODEL

Next, an interference model that is assumed in the present embodiment will be described. FIG. 12 is an explanatory diagram illustrating an example of the interference model assumed in the present embodiment. It is to be noted that the description of the base station apparatus 20 appearing in the following description may be replaced with a word indicating another communication apparatus having a wireless communication function.

The interference model illustrated in FIG. 12 is applied, for example, in a case where the primary system has a service area. In the example of FIG. 12, the communication system 1 (primary system) is a wireless communication system having a service area. This service area serves as, for example, a protection area of the communication system 1. In the protection area, a plurality of interference calculation reference points (hereinafter referred to as protection points) are set. The protection point is set by, for example, the operator of the communication system 1 or a public organization, etc. that manages radio waves (hereinafter referred to as an administrator). For example, the administrator may divide the protection area into grids, and set the center of a predetermined grid as the protection point. The protection point may be determined by any method. The interference margin of each protection point is set by the administrator, etc. FIG. 12 illustrates the interference caused to the protection point by the plurality of base station apparatuses 20 constituting the communication system 2 (secondary system). The communication control apparatus 40 of the communication system 2 controls the transmission power of the plurality of base station apparatuses 20 so that the aggregated interference at each protection point does not exceed the set interference margin.

FIG. 13 is an explanatory diagram illustrating another example of the interference model assumed in the present embodiment. The interference model illustrated in FIG. 13 is applied, for example, in a case where the primary system performs only reception. In the example of FIG. 13, the communication system 1 (primary system) includes a receiving antenna as a wireless communication apparatus $10_2$. The wireless communication apparatus $10_2$ is, for example, a receiving antenna of a satellite ground station. The communication control apparatus 40 of the communication system 2 regards the position of the receiving antenna as the protection point, and controls the transmission power of the plurality of base station apparatuses 20 so that the aggregated interference at that point does not exceed the interference margin.

4. PRIMARY SYSTEM PROTECTION METHOD

Next, a primary system protection method will be described. As described above, primary system protection methods are classifiable into the following two types, for example.
(1) Interference Margin Simultaneous Distribution Type
(2) Interference Margin Sequential Distribution Type It is to be noted that examples of the primary system protection method of the interference margin simultaneous distribution type include, for example, a technique disclosed in NPTL 3 (e.g., a technique of calculating the maximum allowable EIRP). Further, examples of the primary system protection method of the interference margin sequential distribution type include, for example, a sequential distribution process (IAP: Iterative Allocation Process) disclosed in NPTL 6.

The primary system protection method of the "interference margin simultaneous distribution type" and the primary system protection method of the "interference margin sequential distribution type" are described below. It is to be noted that the description of the base station apparatus 20 appearing in the following description may be replaced with a word indicating another communication apparatus having a wireless communication function.
<4-1. Interference Margin Simultaneous Distribution Type>

The primary system protection method of the interference margin simultaneous distribution type is described first. FIG. 14 is an explanatory diagram for explaining the primary system protection method of the interference margin simultaneous distribution type. As described above, in the interference margin simultaneous distribution type, the communication control apparatus 40 calculates the maximum allowable transmission power of the secondary system by using a "value uniquely determined by the positional relationship between the protection reference point of the primary system and the secondary system" as a reference value. In the example of FIG. 14, the allowable interference threshold of the primary system is $I_{accept}$. This threshold may be an actual threshold, or a value set by factoring in a certain margin (e.g., protection ratio (Protection Ratio)) from the actual threshold, in consideration of a calculation error and interference fluctuation.

In the primary system protection method of the interference margin simultaneous distribution type, interference control means determining transmission power (EIRP, Conducted Power+Antenna gain, etc.) of the wireless apparatus so as not to exceed the allowable interference threshold. In this case, if a large number of base station apparatuses 20 are present and each of them is made not to exceed the allowable interference threshold, interference power received by the communication system 1 (primary system) can exceed the allowable interference threshold. Hence, the interference margin (allowable amount of interference) is "distributed", on the basis of the number of the base station apparatuses 20 registered in the communication control apparatus 40.

For example, in the example of FIG. 14, the total number of the base station apparatuses 20 is five. Therefore, the allowable amount of interference of $I_{accept}/5$ is distributed individually. The base station apparatus 20 is unable to recognize this amount of distribution by itself. It therefore recognizes the amount of distribution through the communication control apparatus, or acquires transmission power determined on the basis of this amount of distribution. The communication control apparatus is unable to recognize the number of wireless apparatuses managed by another communication control apparatus. Therefore, information is exchanged with each other, which makes it possible to recognize the total number and distribute the allowable amount of interference. For example, the allowable amount of interference of $3I_{accept}/5$ is allocated within the communication control apparatus $40_1$.

It is to be noted that, in this technique, the interference margin not used by the base station apparatus 20 may serve as a leftover interference margin. FIG. 15 is a diagram illustrating how the leftover interference margin occurs. FIG. 15 illustrates the total amount of interference set for each of the two communication control apparatuses 40 (the communication control apparatuses $40_1$ and $40_2$). FIG. 15 also illustrates the amount of interference (amount of caused interference) that the plurality of base station apparatuses 20 ($20_1$ to $20_5$) managed by the two communication control apparatuses 40 cause to a predetermined protection point of the communication system 1. An amount of interference that is obtained by subtracting the amounts of interference provided by the base station apparatuses 20 from the total amount of interference for each of the two communication control apparatuses 40 is the leftover interference margin. In the following description, the extra amount of interference is called a leftover interference margin. The leftover interference margin may also be referred to as a leftover amount of interference.
<4-2. Interference Margin Sequential Distribution Type>

Next, the primary system protection method of the interference margin sequential distribution type will be described. As described above, in the interference margin sequential distribution type, the communication control apparatus 40 calculates the maximum allowable transmission power of the secondary system by using the "desired transmission power of the secondary system" as a reference value. FIG. 16 is an explanatory diagram for explaining the primary system protection method of the interference margin sequential distribution type. In the interference margin sequential distribution type, for example, each of the plurality of base station apparatuses 20 stores the desired transmission power information in the storage unit 22. The desired transmission power information is information about transmission power that the base station apparatus 20 requests of the communication control apparatus 40 as information about transmission power necessary to transmit radio waves. In the example of FIG. 16, the base station apparatuses $20_1$ to $20_4$ hold desired transmission power information A to D, respectively. The communication control apparatus 40 allocates amounts of interference A to D to the base station apparatuses $20_1$ to $20_4$, respectively, on the basis of the desired transmission power information A to D.

5. DESCRIPTION OF PROCEDURES

Next, procedures that may occur between entities in the communication system 2 will be described. It is to be noted that the description of the base station apparatus 20 appearing in the following description may be replaced with a word indicating another communication apparatus having a wireless communication function.

<5-1. Registration Procedure (Registration Procedure)>

The registration procedure is a procedure of registering device parameters related to the base station apparatus 20 in the communication control apparatus 40. Typically, the registration procedure is started by the base station apparatus 20 or one or more communication systems including a plurality of base station apparatuses 20 notifying the communication control apparatus 40 of a registration request including the device parameters. The registration request may be transmitted by a communication system (e.g., a proxy system such as the proxy apparatus 50) acting on behalf of (as a representative for) the one or more base station apparatuses 20.

In the following description, the communication system acting on behalf of (as a representative for) the plurality of base station apparatuses 20 is assumed to be the proxy apparatus 50. However, the word of the proxy apparatus 50 that appears in the following description may be replaced with a word that indicates another communication system acting on behalf of (as a representative for) a communication apparatus, such as a proxy system.

(Details of Desired Parameters)

Device parameters refer to the following information, for example.

Communication-apparatus-unique information
Position information
Antenna information
Wireless interface information
Legal information
Installer information
In implementation, information other than these may be treated as device parameters.

The communication-apparatus-unique information is information allowing identification of the base station apparatus 20, information related to hardware of the base station apparatus 20, etc. For example, a serial number, a product model number, and the like may be included.

The information allowing identification of the base station apparatus 20 refers to communication apparatus user information, a communication apparatus serial number, etc. For example, a user ID, a call sign, and the like may be assumed as the communication apparatus user information. The user ID may be originally generated by a communication apparatus user or may be pre-issued by the communication control apparatus 40.

The information related to the hardware of the base station apparatus 20 may include, for example, transmission power class information, manufacturer information, and the like. As the transmission power class information, for example, FCC C.F.R Part 96 specifies two classes of Category A and Category B, and either information may be included. Further, 3GPP TS 36.104 and TS 38.104 specify some classes of eNodeB s and gNodeBs, and these may also be used.

Information related to software of the base station apparatus 20 may include, for example, version information, a build number, etc. related to an executable program that describes processing necessary for interaction with the communication control apparatus 40. It may also include version information, a build number, etc. of software for operation as the base station apparatus 20.

The position-related information is typically information that allows identification of a geolocation of the base station apparatus 20. For example, it is coordinate information acquired by a positioning function typified by a GPS (Global Positioning System), Beidou, a QZSS (Quasi-Zenith Satellite System), Galileo, or an A-GPS (Assisted Global Positioning System). Typically, information related to a latitude, a longitude, an altitude, and a positioning error may be included. Alternatively, it may be, for example, position information registered in an information management apparatus managed by the NRA (National Regulatory Authority) or its consignment organization. Alternatively, it may be, for example, X-axis, Y-axis, and Z-axis coordinates with a specific geolocation as the origin. Further, an identifier indicating outdoor/indoor may be assigned together with such coordinate information.

Further, the position-related information may be information indicating a region where the base station apparatus 20 is located. For example, information defined by the administration, such as a postcode or an address, may be used. Further, for example, the region may be indicated by a set of three or more geographic coordinates. These pieces of information indicating the region may be provided together with the above coordinate information.

Further, the position-related information may be assigned information indicating the floor of a building in a case where the base station apparatus 20 is located indoors. For example, an identifier, etc. indicating the number of stories or ground/underground may be assigned. Further, for example, information indicating a further closed space located indoors, such as a room number or a room name in the building, may be assigned.

The above positioning function is typically desired to be provided for the base station apparatus 20. However, depending on performance of the positioning function or an installation position, it is not necessarily possible to acquire position information that satisfies demanded accuracy. Therefore, the positioning function may be used by an installer. In such a case, it is desirable that position information measured by the installer be written to the base station apparatus 20.

The antenna information is typically information that indicates performance, a configuration, etc. of an antenna provided in the base station apparatus 20. Typically, it may include, for example, information such as an antenna installation height, a tilt angle (Downtilt), a horizontal orientation (Azimuth), aiming (Boresight), antenna peak gain, or an antenna model.

The antenna information may also include information related to formable beams. For example, information such as a beam width, a beam pattern, or analog/digital beamforming capability may be included.

The antenna information may also include information related to performance and a configuration of MIMO (Multiple Input Multiple Output) communication. For example, it may include information such as the number of antenna elements or the maximum number of spatial streams. It may also include codebook (Codebook) information, weighting matrix information (a unitary matrix, a ZF (Zero-Forcing) matrix, or a MMSE (Minimum Mean Square Error) matrix obtained by SVD (Singular Value Decomposition), EVD (Eigen Value Decomposition), BD (Block Diagonalization), etc.), or the like to be used. In addition, in a case where MLD (Maximum Likelihood Detection) or the like involving nonlinear operation is provided, information indicating it may be included.

The antenna information may include a ZoD (Zenith of Direction, Departure). The ZoD is a type of radio wave arrival angle. The ZoD may be estimated by another base station apparatus 20 from radio waves emitted from the antenna of the base station apparatus 20. In this case, the base station apparatus 20 may be a terminal apparatus that operates as a base station or an access point, an apparatus that performs D2D communication, a moving relay base station, or the like. The ZoD may be estimated by a radio wave arrival direction estimation technology such as MUSIC (Multiple Signal Classification) or ESPRIT (Estimation of Signal Propagation via Rotation Invariance Techniques). It may be used by the communication control apparatus 40 as measurement information.

The wireless interface information typically refers to information that indicates a wireless interface technology provided for the base station apparatus 20. For example, it includes identifier information indicating a technology used in GSM (registered trademark), CDMA2000, UMTS, E-UTRA, 5G NR, or further next-generation cellular systems, an LTE-compliant derivation technology such as MulteFire or LTE-U (LTE-Unlicensed), a MAN (Metropolitan Area Network) such as WiMAX or WiMAX2+, or a standard technology such as an IEEE 802.11 wireless LAN. A version number or release number of a technical specification that defines these may also be assigned. It may not necessarily be a standard technology, and information indicating a proprietary wireless technology may be included.

The wireless interface information may also include frequency band information supported by the base station apparatus 20. For example, it may be expressed by one or more of combinations of an upper limit frequency and a lower limit frequency, one or more of combinations of a center frequency and a bandwidth, one or more 3GPP Operating Band numbers, or the like.

As the frequency band information supported by the base station apparatus 20, capability information of carrier aggregation (Carrier Aggregation) or channel bonding (Channel Bonding) may also be included. For example, combinable band information or the like may be included. Further, for carrier aggregation, information related to bands to be used as a primary component carrier (PCC: Primary Component Carrier) and secondary component carriers (SCC: Secondary Component Carrier) may also be included. The number of CCs aggregable at the same time may also be included.

As the frequency band information supported by the base station apparatus 20, information indicating radio wave utilization priority, such as PAL or GAA, may also be included.

The wireless interface information may also include modulating scheme information supported by the base station apparatus 20. For example, typical examples may include information indicating a primary modulation scheme, such as FSK (Frequency Shift Keying), n-value PSK (Phase Shift Keying) (where n is 2, 4, 8, etc.), or n-value QAM (Quadrature Amplitude Modulation) (where n is 4, 16, 64, 256, etc.), and information indicating a secondary modulation scheme, such as OFDM (Orthogonal Frequency Division Multiplexing), DFT-s-OFDM (DFT spread OFDM), or FBMC (Filter Bank Multi Carrier).

The wireless interface information may also include information related to error-correcting codes. For example, capability of Turbo codes, LDPC (Low Density Parity Check) codes, Polar codes, etc. and coding rate information to be applied may be included.

The modulating scheme information and the information related to the error correcting codes may also be expressed, as another form, by MCS (Modulation and Coding Scheme) indexes.

The wireless interface information may also include information that indicates a function unique to each wireless technology supported by the base station apparatus 20. For example, typical examples include TM (Transmission Mode) information specified in LTE. In addition, for a specific function having two or more modes, the mode may be included in the wireless interface information, like the TM described above. Further, in a case where the base station apparatus 20 supports a function that does not have two or more modes but is not necessary in terms of specifications in the technical specifications, information indicating this may also be included.

The wireless interface information may also include wireless access scheme (RAT: Radio Access Technology) information supported by the base station apparatus 20. For example, it may include orthogonal multiple access schemes (OMA: Orthogonal Multiple Access) such as TDMA (Time Division Multiple Access), FDMA (Frequency Division Multiple Access), or OFDMA (Orthogonal Frequency Division Multiple Access), non-orthogonal multiple access schemes (NOMA: Non Orthogonal Multiple Access) such as PDMA (Power Division Multiple Access, typically implemented by combining Superposition Coding (SPC) and Successive Interference Canceller (SIC)), CDMA (Code Division Multiple Access), SCMA (Sparse Code Multiple Access), IDMA (Interleaver Division Multiple Access), or SDMA (Spatial Division Multiple Access), and opportunistic access schemes (Opportunistic Access) such as CSMA/CA (Carrier Sense Multiple Access/Collision Avoidance) or CSMA/CD (Carrier Sense Multiple Access/Collision Detection).

The wireless interface information may also include information related to a duplex-mode supported by the base station apparatus 20. Typical examples may include, for example, FDD (Frequency Division Duplex), TDD (Time Division Duplex), and FD (Full Duplex). In a case where TDD is included as the wireless interface information, TDD Frame Configuration information used/supported by the base station apparatus 20 may be assigned. Further, the information related to the duplex mode may be included for each frequency band indicated by the above frequency band information.

The wireless interface information may also include information related to a transmit diversity technique supported by the base station apparatus 20. For example, space-time coding (STC: Space Time Coding) or the like may be included.

The wireless interface information may also include guard band information. For example, information related to a standardized guard band size may be included. Alternatively, for example, information related to the guard band size desired by the base station apparatus 20 may be included.

The legal information typically refers to regulatory information that the base station apparatus 20 has to comply with and is defined by a national or local radio wave administrative agency or a similar organization, approval information that the base station apparatus 20 has acquired, etc. As the regulatory information, typically, for example, upper limit information of out-of-band emission, information related to blocking characteristics of a receiver, and the like may be included. As the approval information, typically, for example, type approval (Type Approval) information (FCC ID, technical standards conformity certification, etc.), legal regulation information to be used as a criterion for approval acquisition (e.g., FCC rule number, ETSI Harmonized Standard number, etc.), and the like may be included.

Of the legal information, information related to numerical values may be substituted by information defined in a specification of a wireless interface technology. For example, in place of the upper limit information of out-of-band emission, an adjacent channel leakage ratio (ACLR: Adjacent Channel Leakage Ratio) may be used to derive and use the upper limit of out-of-band emission. Further, the ACLR itself may be used as necessary. Further, adjacent-channel selectivity (ACS: Adjacent Channel Selectivity) may be used in place of the blocking characteristics. They may also be used in conjunction, or an adjacent-channel interference ratio (ACIR: Adjacent Channel Interference Ratio) may be used.

The installer information may include information allowing identification of a person (installer) who has installed the base station apparatus 20, unique information associated with the installer, etc. For example, NPTL 2 discloses, as the information allowing identification of the installer, a CPIR-ID (Certified Professional Installer Registration ID) and a CPI-name. Also disclosed as the unique information associated with the installer are, for example, a contact address (Mailing/Contact address), an e-mail address, a telephone number, a PKI (Public Key Identifier), etc. Without being limited thereto, other information related to the installer may be included, as necessary.

(Supplement to Desired Parameters)

In the registration procedure, in some embodiments, it is assumed to be requested that the device parameters related to not only the base station apparatus 20 but also the terminal apparatus 30 be registered in the communication control apparatus 40. In a such case, the embodiment may be applied by replacing the term "communication apparatus" in the description given above in (Details of Desired Parameters) with the term "terminal apparatus" or a similar term. In addition, "terminal-apparatus"-unique parameters that are not described above in (Details of Desired Parameters) may also be treated as the desired parameters in the registration procedure. Examples include a UE (User Equipment) Category, etc. specified in the 3GPP.

(Details of Registration Process)

FIG. 17 is a sequence diagram for explaining the registration procedure. The base station apparatus 20 or one or more communication systems including a plurality of base station apparatuses 20 generates a registration request message by using the device parameters described above (step S11), and notifies the communication control apparatus 40 (step S12). The message generation and/or notification may be performed by the proxy apparatus 50.

Here, in a case where the installer information is included in the device parameters, this information may be used to process the registration request to prevent tampering, etc. In addition, some or all of information included in the registration request may be encrypted. Specifically, for example, the following processing may be performed: an installer-unique public key is shared in advance between the installer and the communication control apparatus 40, and information is encrypted by the installer using a private key. Targets of the encryption include, for example, security-sensitive information such as position information.

In addition, the position information may be, for example, directly written by the installer into the communication control apparatus 40, as disclosed in NPTL 2.

After receiving the registration request, the communication control apparatus 40 performs the registration process of the base station apparatus 20 (Step S13), and returns a registration response in accordance with the process result (Step S14). If there is no lack of information necessary for registration or abnormality, the communication control apparatus 40 records information in the storage unit 42 and reports normal completion. Otherwise, the communication control apparatus 40 reports a registration failure. In a case where the registration is normally completed, the communication control apparatus 40 may allocate IDs individually to the communication apparatuses, and report the ID information by enclosing it when responding. In a case where a registration failure occurs, typically, the base station apparatus 20 or one or more communication systems including a plurality of base station apparatuses 20, or an operator (e.g., a mobile network operator or an individual) or installer thereof corrects the registration request, for example, and attempts the registration procedure until the registration is normally completed.

It is to be noted that the registration procedure may be executed a plurality of times. Specifically, for example, the registration procedure may be re-executed in a case where the position information is changed beyond a predetermined criterion, due to movement or an improvement in accuracy. The predetermined criterion is typically defined by a legal system. For example, 47 C.F.R Part 15 makes it compulsory for a Mode II personal/portable white space device to re-access a database in a case where the position information changes by 100 meters or more.

<5-2. Available-Frequency Information Query Procedure (Available Spectrum Query Procedure)>

The available-frequency information query procedure refers to a procedure in which the base station apparatus 20 or the proxy apparatus 50 queries the communication control apparatus 40 about information related to an available frequency. Typically, the procedure is started by the base station apparatus 20 or the proxy apparatus 50 notifying the communication control apparatus 40 of a query request including information that allows identification of the base station apparatus 20 (or the base station apparatus 20 subordinate to the proxy apparatus 50).

(1) Example 1

Here, the available-frequency information typically refers to information indicating a frequency of which secondary use is safely possible without causing fatal interference to the primary system at the position of the base station apparatus 20 (or the base station apparatus 20 subordinate to the proxy apparatus 50). For example, in order to protect the primary system using a frequency channel F1, in a case where the base station apparatus 20 is installed in a secondary use prohibition area such as an Exclusion Zone, the base station apparatus 20 is not notified of the frequency channel F1 as an available channel.

(2) Example 2

Further, for example, in a case where it is determined that fatal interference will be caused to the primary system, even outside the secondary use prohibited area, the frequency channel may not be reported as an available channel.

(3) Example 3

There may also be a frequency channel that is not reported as available as the available-frequency information on the basis of a condition other than primary system protection requirements of Example 2. Specifically, for example, in order to avoid interference that can occur between the base station apparatuses 20 in advance, a frequency channel being used by another base station apparatus 20 present in the neighborhood of the base station apparatus 20 (or the base station apparatus 20 subordinate to the proxy apparatus 50) may not be reported as an available channel.

(4) Example 4

Even in cases corresponding to these cases (Example 2, Example 3), it is possible to report, as an available channel, the same frequency as the primary system or the neighboring base station apparatus 20. In such a case, maximum allowable transmission power information is typically included in the available-frequency information. The maximum allowable transmission power is typically expressed by equivalent isotropic radiated power (EIRP: Equivalent Isotropic Radiated Power). It is not necessarily limited thereto and may be, for example, provided by combining the antenna gain with the antenna power (Conducted Power). Feeder loss (Feeder Loss) may also be included. In addition, as the antenna gain, allowable peak gain may be set for each spatial direction.
(Details of Desired Parameters)

Assumed as the information allowing identification of the base station apparatus 20 may be, for example, the communication-apparatus-unique information registered at the time of the above registration procedure or the ID information described above in (Details of Registration Process).

The query request may also include query requirement information. The query requirement information may include, for example, information indicating a frequency band of which availability is to be known. Further, for example, transmission power information may be included. The base station apparatus 20 or the proxy apparatus 50 may include the transmission power information in a case where, for example, only frequency information assumed to allow use of the desired transmission power is to be known. The query requirement information may not necessarily be included.

The query request may also include a measurement report. The measurement report contains a result of measurement performed by the base station apparatus 20 and/or the terminal apparatus 30. For example, raw data as well as processed information may be included. For example, standard metrics typified by RSRP (Reference Signal Received Power), a RSSI (Reference Signal Strength Indicator), and RSRQ (Reference Signal Received Quality) may be used.
(Details of Available Frequency Evaluation Process)

FIG. 18 is a sequence diagram for explaining the available-frequency information query procedure. The base station apparatus 20 or the proxy apparatus 50 generates a query request including information allowing identification of the base station apparatus 20 (or the base station apparatus 20 subordinate to the proxy apparatus 50) (step S21), and notifies the communication control apparatus 40 (step S22).

After receiving the query request, the communication control apparatus 40 evaluates the available frequency on the basis of the query requirement information (step S23). For example, as described in Examples 1 to 3 above, it is possible to evaluate the available frequency by considering the presence of the primary system, its secondary use prohibition area, and the neighboring base station apparatus 20.

As described in Example 4 above, the communication control apparatus 40 may derive the maximum allowable transmission power information. Typically, it is derived by using allowable interference power information in the primary system or its protection region (Protection Zone), the reference position (Reference Point) information for calculation of the interference power level received by the primary system, the registered information of the base station apparatus 20, and a propagation-loss estimation model. Specifically, it is calculated by the following expression, as an example.

$$P_{MaxTx(dBm)} = I_{Th(dBm)} + PL(d)_{(dB)} \quad (1)$$

Here, $P_{MaxTx(dBm)}$ is the maximum allowable transmission power, $I_{Th(dBm)}$ is the allowable interference power, d is a distance between the reference position (Reference Point) and the base station apparatus 20, and $PL(d)_{(dB)}$ is the propagation loss at the distance d. Although this expression does not explicitly indicate the antenna gain in a transmitter/receiver, it may be included depending on how the maximum allowable transmission power is expressed (EIRP, Conducted power, etc.) or a reference point of received power (antenna input point, antenna output point, etc.). A safety margin or the like may also be included to compensate for fluctuations due to fading. Further, feeder loss, for example, may be considered as necessary.

Further, the above expression is described on the basis of the assumption that a single base station apparatus 20 is an interference source. For example, in a case where aggregated interference (Aggregated Interference) from a plurality of base station apparatuses 20 are to be considered at the same time, correction values may be factored in. Specifically, for example, the correction value may be determined on the basis of three types of interference margin schemes (Fixed/Predetermined, Flexible, Flexible Minimized) disclosed in NPTL 3.

It is to be noted that, although the above expression is expressed by using logarithms, in implementation, they may be converted to antilogarithms to be used, as a matter of course. Further, all logarithmic parameters described in this specification may be converted to antilogarithms to be used as appropriate.
(1) Technique 1

In addition, as described above in the section of (Details of Desired Parameters), in a case where the transmission power information is included in the query requirement information, it is possible to evaluate the available frequency by a method different from the method described above. Specifically, for example, assuming that the desired transmission power indicated by the transmission power information is used, in a case where the estimated amount of caused interference falls below the allowable interference power in the primary system or its protection region (Protection Zone), the frequency channel is determined as available and reported to the base station apparatus 20 (or the proxy apparatus 50).
(2) Technique 2

Although an example in which a band utilization condition described above is calculated on the basis of the other-system-related information described above has been described, the present disclosure is not limited to such an example. For example, in a case where an area/space in which the base station apparatus 20 is able to use the shared band is predetermined, as with the area of a REM (Radio Environment Map), the available-frequency information may be derived on the basis of only the position-related information and the height-related information. Further, for example, also in a case where a look-up table is prepared that associates the position and height with the available-frequency information, the available-frequency information may be derived on the basis of only the position-related information and the height-related information.

Evaluation of the available frequency may not necessarily be performed after receiving a query request. For example, it may be voluntarily performed by the communication control apparatus 40 after normal completion of the aforementioned registration procedure, without a query request. In such a case, the communication control apparatus 40 may create the REM or look-up table exemplified in Technique 2 or a similar information table.

Either technique may also evaluate radio wave utilization priority such as PAL or GAA. For example, in a case where registered device parameters or query requirements include information related to the radio wave utilization priority, it may be determined and reported whether the frequency is available on the basis of the priority. Further, for example, in a case where information related to the base station apparatus 20 that performs high priority utilization (e.g., PAL) (in NPTL 2, referred to as Cluser List) is registered in advance in the communication control apparatus 40 by the user, as disclosed in NPTL 2, the evaluation may be performed on the basis of the information.

After completion of the evaluation of the available frequency, the communication control apparatus 40 notifies the base station apparatus 20 (or the proxy apparatus 50) of the evaluation result (step S24). The base station apparatus 20 may select desired communication parameters by using the evaluation result received from the communication control apparatus 40.

<5-3. Frequency Utilization Permission Procedure (Spectrum Grant Procedure)>

The frequency utilization permission procedure is a procedure for the base station apparatus 20 to receive permission for secondary frequency use from the communication control apparatus 40. Typically, after the normal completion of the registration procedure, the procedure is started by the base station apparatus 20 or one or more communication systems including a plurality of base station apparatuses 20 notifying the communication control apparatus 40 of a frequency utilization permission request including information that allows identification of the base station apparatus 20. This notification may be provided by the proxy apparatus 50. It is to be noted that "after the normal completion of the registration procedure" also means that the available-frequency information query procedure may not necessarily be performed.

The present invention assumes that at least the following two types of frequency utilization permission request schemes may be used.
Designation Scheme
Flexible Scheme The designation scheme is a request scheme in which the base station apparatus 20 designates, as the desired communication parameters, at least the frequency band to be used and the maximum transmission power, and requests the communication control apparatus 40 to permit operation based on the desired communication parameters. Parameters are not necessarily limited to these parameters, and parameters unique to a wireless interface technology (such as a modulation scheme and a duplex mode) may be designated. Information indicating the radio wave utilization priority, such as PAL or GAA may also be included.

The flexible scheme is a request scheme in which the base station apparatus 20 designates only requirements related to communication parameters, and requests the communication control apparatus 40 to designate the communication parameters that allow secondary use permission while satisfying the requirements. The requirements related to the communication parameters may include the bandwidth or the desired maximum transmission power or desired minimum transmission power. Parameters are not necessarily limited to these parameters, and parameters unique to a wireless interface technology (such as a modulation scheme and a duplex mode) may be designated. Specifically, for example, one or more of the TDD Frame Configuration may be selected and reported in advance.

In either scheme, a measurement report may be included. The measurement report contains a result of measurement performed by the base station apparatus 20 and/or the terminal apparatus 30. For example, raw data as well as processed information may be included. For example, standard metrics typified by RSRP (Reference Signal Received Power), a RSSI (Reference Signal Strength Indicator), and RSRQ (Reference Signal Received Quality) may be used.

(Details of Frequency Utilization Permission Process)

FIG. 19 is a sequence diagram for explaining the frequency utilization permission procedure. The base station apparatus 20 or one or more communication systems including a plurality of base station apparatuses 20 generates a frequency utilization permission request including information that allows identification of the base station apparatus 20 (step S31) and notifies the communication control apparatus 40 (step S32). The request generation and/or notification may be performed by the proxy apparatus 50. The frequency utilization permission request is acquired, for example, by the acquiring section 441 of the communication control apparatus 40.

After acquiring the frequency utilization permission request, the communication control apparatus 40 performs the frequency utilization permission process on the basis of the frequency utilization permission request scheme (step S33). For example, it is possible for the communication control apparatus 40 to perform the frequency utilization permission process by considering the presence of the primary system, its secondary use prohibited area, and the neighboring base station apparatus 20, by using the techniques described in Examples 1 to 3 in <5-2. Available-Frequency Information Query Procedure>.

In a case where the flexible scheme is used, the communication control apparatus 40 may derive the maximum allowable transmission power information by using the technique described in Example 4 of <5-2. Available-Frequency Information Query Procedure>. Typically, the communication control apparatus 40 calculates the maximum allowable transmission power by using the allowable interference power information in the primary system or its protection region (Protection Zone), the reference position (Reference Point) information for calculation of the interference power level received by the primary system, the registered information of the base station apparatus 20, and the propagation-loss estimation model. For example, the communication control apparatus 40 calculates the maximum allowable transmission power by the following expression (2).

$$P_{MaxTx(dBm)} = I_{Th(dBm)} + PL(d)_{(dB)} \qquad (2)$$

Here, $P_{MaxTx(dBm)}$ is the maximum allowable transmission power, $I_{Th(dBm)}$ is the allowable interference power, d is a distance between the reference position (Reference Point) and the base station apparatus 20, and $PL(d)_{(dB)}$ is the propagation loss at the distance d. Although this expression does not explicitly indicate the antenna gain in a transmitter/receiver, the expression may be deformed to be used depending on how the maximum allowable transmission power is expressed (EIRP, Conducted power, etc.) or a reference point of received power (antenna input point, antenna output point, etc.). A safety margin or the like may also be included to compensate for fluctuations due to fading. Further, feeder loss, for example, may be considered as necessary.

Further, the above expression is described on the basis of the assumption that a single base station apparatus 20 is an interference source. For example, in a case where aggregated interference (Aggregated Interference) from a plurality of base station apparatuses 20 are to be considered at the same time, correction values may be factored in. Specifically, for example, the correction value may be determined on the basis of three types of schemes (Fixed/Predetermined, Flexible, Flexible Minimized) disclosed in NPTL 3.

Various models may be used as the propagation-loss estimation model. In a case where a model is designated for each application, it is desirable to use the designated model. For example, in NPTL 6, the propagation-loss model such as eHATA (Extended Hata) or an ITM (Irregular Terrain Model) is adopted for each application. As a matter of course, the propagation-loss model may not be limited thereto in implementation of the present invention.

In a case where the model is not designated in a predetermined application, different models may be used as necessary. As a specific example, it is possible to use different models as follows, for example: using an aggressive model, such as the free space loss model, in estimating interference power caused to another base station apparatus 20, and using a conservative model in estimating the coverage of the base station apparatus 20.

In addition, in a case where the designation scheme is used, it is possible to perform the frequency utilization permission process by using the technique described in Technique 1 of <5-2. Available-Frequency Information Query Procedure>. Specifically, for example, assuming that the desired transmission power indicated by the transmission power information is used, in a case where the estimated amount of caused interference falls below the allowable interference power in the primary system or its protection region (Protection Zone), the utilization of the frequency channel is determined as permittable and reported to the base station apparatus 20 (or the proxy apparatus 50).

Either technique may also evaluate radio wave utilization priority such as PAL or GAA. For example, in a case where registered device parameters or query requirements include information related to the radio wave utilization priority, it may be determined and reported whether the frequency is available on the basis of the priority. Further, for example, in a case where information related to the base station apparatus 20 that performs high priority utilization (e.g., PAL) (in NPTL 2, referred to as Cluser List) is registered in advance in the communication control apparatus 40 by the user, as disclosed in NPTL 2, the availability may be evaluated on the basis of the information.

The frequency utilization permission process may not necessarily be performed when a request is received. For example, it may be voluntarily performed by the communication control apparatus 40 after the aforementioned registration procedure is normally completed, without a frequency utilization permission request. Further, for example, the frequency utilization permission determination process may be performed at regular intervals. In such a case, the REM or look-up table exemplified in Technique 2 of <5-2. Available-Frequency Information Query Procedure> or a similar information table may be created.

After completion of the frequency utilization permission process, the communication control apparatus 40 notifies the base station apparatus 20 of the determination result (step S34).

<5-4. Frequency Utilization Notification (Spectrum Use Notification/Heartbeat)>

The frequency utilization notification is a procedure in which the base station apparatus 20 or the proxy apparatus 50 notifies the communication control apparatus 40 of the frequency utilization based on the communication parameters allowed for use in the above frequency utilization permission procedure. Typically, the procedure is started by the base station apparatus 20 or the proxy apparatus 50 notifying the communication control apparatus 40 of a notification message including information allowing identification of the base station apparatus 20.

It is desirable that this procedure be performed periodically until the frequency utilization is rejected from the communication control apparatus 40. If this procedure is normally completed, the base station apparatus 20 may start or continue radio wave transmission. If the state of the grant is Granted in the example of FIG. 2 above, the state of the grant shifts to Authorized due to success of this procedure. Further, if the state of the grant is Authorized in the example of FIG. 2 above, the state of the grant shifts to Granted or Idole due to failure of this procedure.

In the following description, the frequency utilization notification may be referred to as heartbeat request (Heartbeat Request) or simply as heartbeat (Heartbeat). Further, the heartbeat request transmission interval is sometimes referred to as a heartbeat interval (Heartbeat Interval). It is to be noted that the description of the heartbeat request (Heartbeat Request) or the heartbeat (Heartbeat) appearing in the following description may be replaced as appropriate with another description indicating a "request for starting or continuing radio wave transmission". Similarly, the heartbeat interval may be replaced with another description (e.g., transmission interval) indicating the transmission interval of the frequency utilization notification.

FIG. 20 is a sequence diagram for explaining the frequency utilization notification procedure. The base station apparatus 20 or one or more communication systems including a plurality of base station apparatuses 20 generates a notification message including information that allows identification of the base station apparatus 20 (step S41), and notifies the communication control apparatus 40 (step S42). The message generation and/or notification may be performed by the proxy apparatus 50.

After receiving the frequency utilization notification, the communication control apparatus 40 may determine whether the start/continuation of radio wave transmission is allowed (step S43). Examples of a determination method include checking the frequency utilization information of the primary system. Specifically, it is possible to determine whether to permit or reject start/continuation of radio wave transmission on the basis of a change in the frequency used by the primary system, a change in the frequency utilization situation of the primary system (e.g., ship-based radar) whose radio wave utilization is not stationary, or the like.

Upon completion of the determination process, the communication control apparatus 40 notifies the base station apparatus 20 (or the proxy apparatus 50) of the determination result (step S44).

In this procedure, a command for communication parameter reconfiguration (Reconfiguration) may be issued to the base station apparatus 20 (or the proxy apparatus 50) from the communication control apparatus 40. Typically, it may be performed in a response to the frequency utilization notification. For example, recommended communication parameter information may be provided.

<5-5. Supplement to Procedures>

Here, the procedures may not necessarily be individually implemented, as described below. For example, two different procedures may be implemented by being substituted by a third procedure with the roles of the two different procedures. Specifically, for example, the registration request and the available-frequency information query request may be reported integrally. Further, for example, the frequency utilization permission procedure and the frequency utilization notification may be performed integrally. Needless to say, it is not limited to these combinations, and may be a combination of three or more. Further, the above procedure may be separated and performed.

In addition, the expression "acquire information" or a similar expression in this specification does not necessarily mean acquiring the information according to the above procedure. For example, it is described that the position information of the base station apparatus 20 is used in the available frequency evaluation process, but it means that information acquired in the registration procedure may not necessarily be used and, in a case where the available frequency query procedure request includes position information, the position information may be used. In other words, it means that the described parameters may be included in other procedures within the scope described in this specification and within the scope of technical feasibility.

Further, information that may be included in the response from the communication control apparatus 40 to the base station apparatus 20 (or the proxy apparatus 50) described in the above procedure may be reported as a push notification. As a specific example, the available-frequency information, recommended communication parameter information, radio wave transmission continuation rejection notification, etc. may be reported as a push notification.

<5-6. Procedures Related to Terminal Apparatus>

Basically, it is possible to use the procedures described in <5-1> to <5-4> for the terminal apparatus 30. However, the terminal apparatus 30 has mobility, unlike the base station apparatus 20. That is, the position information is dynamically updated. Some legal systems may make re-registration in the communication control apparatus 40 compulsory in a case where the position information changes more than a certain amount. Hence, in an operation form (see NPTL 4) defined by the Office of Communications (Ofcom: Office of Communication), the following two types of communication parameters are specified.

Individual parameters (Specific Operational Parameters)
General parameters (Generic Operational Parameters)

The individual parameters (Specific Operational Parameters) are defined in the NPTL as "operation parameters unique to a specific slave-WSD (White Space Device)". In other words, they refer to communication parameters calculated using the device parameters of the slave-WSD corresponding to the terminal apparatus 30. A feature is that they are calculated by a WSDB (White Space Database) by using position information of the slave-WSD.

Due to such a feature, the individual parameters are assumed to be suitable for the terminal apparatus 30 having low mobility or fixedly installed.

The general parameters (Generic Operational Parameters) are defined in the NPTL as "operation parameters available for any slave WSD located within the coverage area of a predetermined master WSD (corresponding to the base station apparatus 20)". A feature is that they are calculated by the WSDB without using position information of the slave-WSD.

Due to such a feature, the general parameters are assumed to be suitable for the terminal apparatus 30 with high mobility.

These pieces of information for the terminal apparatus 30 may be provided by unicast/broadcast from the base station apparatus 20. For example, broadcast signals typified by a CVS (Contact Verification Signal) specified by the FCC rules Part 15 Subpart H may be used. Alternatively, it may be provided by wireless-interface-unique broadcast signals. Specifically, for example, it may be provided by a PBCH (Physical Broadcast Channel), a NR-PBCH, or the like used in LTE or 5G NR.

<5-7. Procedure Occurring Between Communication Control Apparatuses>

(Information Exchange)

The communication control apparatus 40 is able to exchange the management information with another communication control apparatus 40. FIG. 21 is a sequence diagram for explaining the management information exchange procedure. In the example of FIG. 21, information is exchanged between the communication control apparatus $40_1$ and the communication control apparatus $40_2$. Needless to say, the communication control apparatuses that exchange information are not limited to the two: the communication control apparatus $40_1$ and the communication control apparatus $40_2$.

It is desired that at least the following information be exchanged in the management information exchange procedure:

Communication apparatus registered information
Communication apparatus communication parameter information
Area information The communication apparatus registered information typically refers to the device parameters of the base station apparatus 20 registered in the communication control apparatus 40 in the above registration procedure. Not all registered information has to be exchanged. For example, information that can fall under personal information may not be exchanged. In addition, when exchanging the communication apparatus registered information, encrypted and ambiguous information may be exchanged. For example, information converted to binary values or information signed using a digital signature mechanism may be exchanged.

The communication apparatus communication parameter information typically refers to information related to communication parameters currently used by the base station apparatus 20. It is desirable to include at least information indicating the used frequency and the transmission power. Other communication parameters may be included.

The area information typically refers to information that indicates a predetermined geographic region. This information may include region information of various attributes in a variety of forms.

For example, protection region information of the base station apparatus 20 to be a high priority secondary system may be included, like a PPA (PAL Protection Area) disclosed in NPTL 5. The area information in this case may be expressed, for example, by a set of three or more geolocation coordinates. Further, for example, in a case where a plurality of communication control apparatuses 40 is able to refer to a common external database, it may be expressed by an ID indicating the information.

Further, for example, information indicating the coverage of the base station apparatus 20 may be included. The area information in this case may also be expressed, for example, by a set of three or more geolocation coordinates. In addition, for example, it may be expressed by information indicating a radial size, assuming a circle with the geographical position of the base station apparatus 20 as the origin. Further, for example, in a case where a plurality of communication control apparatuses 40 is able to refer to a common external database, it may be expressed by an ID indicating the information.

As another form, information related to area-division predefined by the administration, etc. may be included. Specifically, it is possible to indicate a certain region by, for example, indicating the address. Further, for example, a licensed area or the like may be expressed in a similar manner.

As still another form, the area information may not necessarily express a planar area, but may express a three-dimensional space. For example, it may be expressed using a spatial coordinate system. Further, for example, information indicating a predetermined closed space, such as the number of stories, the floor, or a room number of the building, may be used.

These pieces of information may be exchanged by a variety of schemes. Examples are described below.

ID designation scheme
Period designation scheme
Region designation scheme
Dump scheme The ID designation scheme is a scheme that uses an ID assigned in advance for identification of information managed by the communication control apparatus 40, to acquire the information corresponding to the above ID. For example, assume that the communication control apparatus 40$_1$ manages the base station apparatus 20 with an ID: AAA. In this case, the communication control apparatus 40$_2$ issues an information acquisition request designating the ID: AAA to the communication control apparatus 401. After receiving the request, the communication control apparatus 40$_1$ searches for information related to the ID: AAA, and reports the registered information and the communication parameter information of the corresponding base station apparatus 20 in a response.

The period designation scheme designates a specific time period, and information that satisfies predetermined conditions in the time period may be exchanged.

The predetermined conditions include, for example, whether or not information is updated. For example, in a case where a request designates acquisition of communication apparatus information in a specific time period, the registered information of the base station apparatus 20 newly registered during the time period, or the registered information and the communication parameter information of the base station apparatus 20 whose communication parameters have been changed may be reported in a response.

The predetermined conditions include, for example, whether it is recorded in the communication control apparatus 40. For example, in a case where a request designates acquisition of communication apparatus information in a specific time period, the registered information and the communication parameter information of the base station apparatus 20 recorded by the communication control apparatus 40 during the time period may be reported in a response. In addition, latest information during the time period may be reported. Alternatively, an update history may be reported for each information.

The region designation scheme designates a specific region, and information belonging to the region is exchanged. For example, in a case where a request designates acquisition of communication apparatus information in a specific region, the registered information and the communication parameter information of the base station apparatus 20 installed in the region may be reported in a response.

The dump scheme is a scheme that provides all information recorded by the communication control apparatus 40. It is desirable that at least information related to the base station apparatus 20 and area information be provided by the dump scheme.

The descriptions of the information exchange between the communication control apparatuses 40 up to this point are all based on a pull scheme. That is, it is a form in which information corresponding to parameters designated in the request is reported in a response, and may be implemented by a HTTP GET method, as an example. However, it may not be limited to the pull scheme, and information may be actively provided to another communication control apparatus 40 by a push scheme. The push scheme may be implemented, as an example, by a HTTP POST method.

(Command and Request Procedures)

The communication control apparatuses 40 may issue commands and/or requests to each other. Specifically, an example is communication parameter reconfiguration (Reconfiguration) of the base station apparatus 20. For example, the communication control apparatus 40$_1$ may request the communication control apparatus 40$_2$ to change the communication parameters of the base station apparatus 20$_4$ in a case where it is determined that the base station apparatus 20$_1$ managed by the communication control apparatus 40$_1$ is heavily interfered with by the base station apparatus 20$_4$ managed by the communication control apparatus 40$_2$.

Another example is area information reconfiguration (Reconfiguration). For example, in a case where there is a deficiency in the calculation of the coverage information and the protection region information related to the base station apparatus 20$_4$ managed by the communication control apparatus 40$_2$, the communication control apparatus 40$_1$ may request the communication control apparatus 40$_2$ to reconfigure the area information. Other than this, requests for area information reconfiguration may be made for a variety of reasons.

6. HEARTBEAT-RELATED OPERATION

Next, heartbeat-related operation of the communication system 2 will be described.

<6-1. Typical Operation Flow>

First, a typical operation flow related to the heartbeat will be described. FIG. 22 is a sequence diagram illustrating an example of the heartbeat-related operation. Specifically, FIG. 22 is a sequence diagram illustrating the operation of the communication system 2 corresponding to the procedures of <5-3. Frequency Utilization Permission Procedure> and <5-4. Frequency Utilization Notification>. It is to be noted that the operation flow illustrated in FIG. 22 is merely an example, and changes variously depending on the state, etc. in which the base station apparatus 20, the communication control apparatus 40, and the proxy apparatus 50 are placed.

First, the communication control apparatus 40$_1$ executes periodic processing when periodic processing execution timing arrives (step S61). The periodic processing is processing of executing information synchronization between the communication control apparatuses 40 and calculation related to primary system protection. The periodic processing is, for example, CPAS (Coordinated Periodic Activities among SASs) described in NPTL 7 and NPTL 9. In the following description, the periodic processing is sometimes referred to as periodic protection calculation. For example, the periodic processing execution timing is 24 hours after the execution of the previous periodic processing. Needless to say, the execution interval of the periodic processing is not limited to 24 hours.

FIG. 23 is a diagram illustrating specific processing contents of the periodic processing. In the example of FIG. 23, the communication control apparatus $40_1$ and the communication control apparatus $40_2$ performed the information synchronization and the primary system protection calculation. Needless to say, the communication control apparatuses 40 that perform the periodic processing (information synchronization, etc.) may be more than two.

As illustrated in FIG. 23, each of the plurality of communication control apparatuses 40 executes the periodic processing (step S61). First, each of the plurality of communication control apparatuses 40 synchronizes information with the other communication control apparatus 40 (step S61a). Then, each of the plurality of communication control apparatuses 40 performs the primary system protection calculation (step S61b, step S61c). At this time, the communication control apparatus 40 may calculate estimated amounts of interference that individual communication nodes (e.g., the base station apparatuses 20) can individually cause to the primary system, a leftover interference margin, etc.

Returning to FIG. 22, the base station apparatus 20 or the proxy apparatus 50 transmits a grant request (Grant Request) to the communication control apparatus $40_1$ (step S62). This grant request may be transmitted by the transmitter 243 of the base station apparatus 20 or the transmitter 543 of the proxy apparatus 50. Then, the acquiring section 441 of the communication control apparatus $40_1$ acquires the transmitted grant request. The communication control apparatus $40_1$ allocates an available frequency to the base station apparatus 20 in response to the request. After allocating the frequency, the communication control apparatus $40_1$ transmits a grant response (Grant Response) to the base station apparatus 20 or the proxy apparatus 50. In the example of FIG. 22, the communication control apparatus $40_1$ reports a successful grant request (Approve illustrated in FIG. 22) as the grant response (step S63). This may be reported by the notifying section 444 of the communication control apparatus $40_1$. Due to the successful grant request, the state of the grant of the base station apparatus 20 shifts from Idole to Granted as illustrated in FIG. 2.

It is to be noted that the communication control apparatus $40_1$ may notify the base station apparatus 20 or the proxy apparatus 50 of a heartbeat interval (Heartbeat Interval) by using the grant response. The heartbeat interval reported to the base station apparatus 20 or the proxy apparatus 50 may be "240 seconds or less" as described above. Further, the heartbeat interval may not be a fixed value such as "240 seconds or less", but may be determined by the determining section 443 of the communication control apparatus $40_1$ each time on the basis of information related to the interference margin distributed to the base station apparatus 20, for example. In this case, a heartbeat interval determination method may be one selected from among a plurality of determination methods. The heartbeat interval determination method is described in detail later.

Subsequently, the base station apparatus 20 or the proxy apparatus 50 transmits a heartbeat request (Heartbeat Request) to the communication control apparatus $40_1$ (step S64). This heartbeat request may be transmitted by the transmitter 243 of the base station apparatus 20 or by the transmitter 543 of the proxy apparatus 50. Then, the acquiring section 441 of the communication control apparatus $40_1$ acquires the transmitted heartbeat request. Then, the communication control apparatus $40_1$ transmits a heartbeat response (Heartbeat Response). It is to be noted that, in the example of FIG. 22, the grant allocated to the base station apparatus 20 has not yet passed through the periodic processing (e.g., CPAS). Therefore, in the example of FIG. 22, the communication control apparatus $40_1$ is unable to approve the start of radio wave transmission. Hence, the communication control apparatus $40_1$ transmits, as the heartbeat response, a radio wave transmission suspension instruction (Suspension instruction) (step S65).

Subsequently, the base station apparatus 20 or the proxy apparatus 50 continues to transmit the heartbeat request at the heartbeat interval reported by the communication control apparatus $40_1$. In response to this heartbeat request, the communication control apparatus $40_1$ continues to transmit, as the heartbeat response, the radio wave transmission suspension instruction until the next periodic processing is completed.

It is to be noted that the communication control apparatus $40_1$ may notify the base station apparatus 20 or the proxy apparatus 50 of the heartbeat interval by using the heartbeat response. This notification may be provided by the notifying section 444 of the communication control apparatus $40_1$. The heartbeat interval reported to the base station apparatus 20 or the proxy apparatus 50 may be "240 seconds or less" as described above, or may be other values. The heartbeat interval determination method is described in detail later.

Then, when the periodic processing execution timing arrives, each of the plurality of communication control apparatuses 40 including the communication control apparatus $40_1$ executes the periodic processing (Step S66). For example, as illustrated in FIG. 23, each of the plurality of communication control apparatuses 40 synchronizes information with the other communication control apparatus 40 (step S66a). Then, each of the plurality of communication control apparatuses 40 performs the primary system protection calculation (step S66b, step S66c).

Subsequently, the base station apparatus 20 or the proxy apparatus 50 transmits a heartbeat request to the communication control apparatus $40_1$ (step S67). This heartbeat request may be transmitted by the transmitter 243 of the base station apparatus 20 or by the transmitter 543 of the proxy apparatus 50. Then, the acquiring section 441 of the communication control apparatus $40_1$ acquires the transmitted heartbeat request. Then, the communication control apparatus $40_1$ transmits a heartbeat response. At this time, the grant allocated to the base station apparatus 20 has passed through the periodic processing, and therefore the communication control apparatus $40_1$ is able to approve the start of radio wave transmission for the base station apparatus 20 that has transmitted the heartbeat request. Hence, the communication control apparatus $40_1$ transmits a successful heartbeat response (Authorize illustrated in FIG. 22) as the heartbeat response (step S68). This may be reported by the notifying section 444 of the communication control apparatus $40_1$. Due to the successful heartbeat request, the state of the grant of the base station apparatus 20 shifts from Granted to Authorized as illustrated in FIG. 2.

It is to be noted that the communication control apparatus $40_1$ may notify the base station apparatus 20 or the proxy apparatus 50 of the heartbeat interval by using the heartbeat response. This notification may be provided by the notifying section 444 of the communication control apparatus $40_1$. The heartbeat interval reported to the base station apparatus 20 or the proxy apparatus 50 may be "240 seconds or less" as described above, or may be other values. The heartbeat interval determination method is described in detail later. Subsequently, the base station apparatus 20 or the proxy apparatus 50 continues to transmit the heartbeat request at the heartbeat interval reported by the communication control apparatus $40_1$.

It is to be noted that the present embodiment proposes a plurality of determination methods as the heartbeat interval determination method. It is to be noted that the following determination methods are mere examples. The heartbeat interval determination method is not limited to the following methods. It is to be noted that the first heartbeat immediately after the grant response (Approve) is to be performed immediately according to the standard. Therefore, for convenience, a time interval between them is assumed to be zero. As a matter of course, in a case where this time interval is to be taken into consideration, it may be considered within an appropriate range. It is to be noted that the "heartbeat interval" used in the following description corresponds to the maximum interval of the second and subsequent heartbeats.

<6-2. Heartbeat Interval Determination Method (First Determination Method)>

First, a first determination method is described. As described above, the communication control apparatus 40 continues to transmit the radio wave transmission suspension instruction (Suspension instruction) for a grant that has not passed through the periodic processing even if it receives a heartbeat request, until the next periodic processing. This is very wasteful. Hence, in the first determination method, the communication control apparatus 40 sets the heartbeat interval for the base station apparatus 20 or the proxy apparatus 50 to issue a heartbeat after the next periodic processing (e.g., CPAS) is completed.

The heartbeat interval is determined by, for example, the determining section 443 of the communication control apparatus 40. It is possible to determine the heartbeat interval as in the following expression (3), for example, where $t_{res}$ is a time at which a grant response (Approve) or a heartbeat (Suspension instruction) is to be sent.

$$\Delta_{Heartbeat,Interval} [\text{sec}] > \Delta_{CPAS,Processing} [\text{sec}] + \Delta_{CPAS,Interval} [\text{sec}] - (t_{res} - t_{Prev,CPAS}) [\text{sec}] \quad (3)$$

Here, $\Delta_{Heartbeat,Interval}$ is the heartbeat interval, $\Delta_{CPAS,Processing}$ is a time interval related to the periodic processing (e.g., CPAS processing), $\Delta_{CPAS,Interval}$ is a time interval between pieces of the periodic processing, and $t_{Prev,CPAS}$ is a time at which the previous periodic processing is started. It is to be noted that, although the unit of time intervals is "second" in the expression (1), it may be replaced with other units such as "minute" as necessary.

Determination in this way reduces unwanted heartbeats that occur until the next periodic processing. It is to be noted that, in a case where the grant is authorized in the next periodic processing (e.g., Authorize in step S68 illustrated in FIG. 22), it is desirable that the next heartbeat interval be set to "240 seconds or less".

<6-3. Heartbeat Interval Determination Method (Second Determination Method)>

Next, a second determination method will be described. The first determination method described above may be applied in a case where it is determined that there is no leftover interference margin (Leftover interference margin) distributable to the base station apparatus 20 as a result of the previous periodic processing. However, in a case where there is a distributable multiplying/dividing interference margin in the previous periodic processing, it is possible to cause the grant state of the base station apparatus 20 to transition to Authorized within its range, without waiting for the next periodic processing.

Hence, in the second determination method, in order to distribute the leftover interference margin to the base station apparatus 20, the communication control apparatus 40 performs primary system protection calculation immediately after acquiring the request, and sets the heartbeat interval for the base station apparatus 20 or the proxy apparatus 50 to issue a heartbeat after completion of the primary system protection calculation.

Here, time taken for the primary system protection calculation is assumed to be $\Delta_{calc}$ [sec]. In this case, it is possible to set the heartbeat interval $\Delta_{Heartbeat,Interval}$ as in the following expression (4).

$$\Delta_{Heartbeat,Interval} [\text{sec}] > \Delta_{calc} [\text{sec}] \quad (4)$$

Setting in this way allows the base station apparatus 20 to perform radio wave transmission without waiting for the next periodic processing to be completed. Moreover, no waste occurs that the base station apparatus 20 or the proxy apparatus 50 continues to transmit heartbeats during the primary system protection calculation.

<6-4. Processing Flow Related to Heartbeat Interval>

It is to be noted that the heartbeat interval determination method used by the communication control apparatus 40 may not necessarily be one. The communication control apparatus 40 may determine the heartbeat interval using a predetermined determination method selected from among a plurality of determination methods. For example, the communication control apparatus 40 may determine the heartbeat interval using either of the first determination method and the second determination method in accordance with a predetermined criterion. In this case, the communication control apparatus 40 may select the determination method on the basis of information related to the interference margin to be distributed to the base station apparatus 20 (e.g., the leftover amount of the interference margin distributable to the base station apparatus 20).

(Communication Control Process)

FIG. 24 is a flow chart illustrating a communication control process related to determination of the heartbeat interval. The process illustrated in FIG. 24 is executed, for example, in a case where the communication control apparatus 40 receives a grant request or the first heartbeat request after a successful grant request from the base station apparatus 20 or the proxy apparatus 50.

First, the acquiring section 441 of the communication control apparatus 40 acquires a grant request or the first heartbeat request after a successful grant request from one or more predetermined base station apparatuses 20 or a predetermined proxy apparatus 50 representing the one or more predetermined base station apparatuses 20 (step S71). Then, the assessing section 442 of the communication control apparatus 40 determines whether there is a leftover of interference margin (leftover interference margin) enough to distribute to the one or more predetermined base station apparatuses 20 (step S72).

In a case where there is no leftover interference margin enough to distribute to the one or more predetermined base station apparatuses 20 (step S72: No), the determining section 443 of the communication control apparatus 40 determines the heartbeat interval of each of the one or more predetermined base station apparatuses 20 using the first determination method described above (step S73). That is, the determining section 443 determines the heartbeat interval so that a heartbeat request is transmitted after the next periodic processing is completed.

On the other hand, in a case where there is a leftover interference margin enough to distribute to the one or more predetermined base station apparatuses 20 (step S72: Yes), the determining section 443 determines the heartbeat interval of each of the one or more predetermined base station apparatuses 20 using the second determination method described above (step S74). That is, the determining section 443 determines the heartbeat interval so that a heartbeat is transmitted after the primary system protection calculation is completed.

Upon determination of the heartbeat interval, the notifying section 444 of the communication control apparatus 40 notifies the one or more predetermined base station apparatuses 20 or the predetermined proxy apparatus 50 representing the one or more predetermined base station apparatuses 20 of the heartbeat interval (step S75). The notification of the heartbeat interval may be provided using a grant response or a heartbeat response. In this manner, the heartbeat interval is set for the one or more predetermined base station apparatuses 20.

Setting the heartbeat interval in this way enables the base station apparatus 20 or the proxy apparatus 50 to perform the next heartbeat at an appropriate timing. This results in higher signaling (Signaling) efficiency of the communication system 2.

(Request Transmission Process)

Next, a heartbeat request transmission process is described. The following description assumes that the base station apparatus 20 executes the following process, but the proxy apparatus 50 may perform it. In this case, the description of the base station apparatus 20 appearing in the following description may be replaced with the proxy apparatus 50. Further, the description of the acquiring section 241, the setting section 242, and the transmitter 243 appearing in the following description may, respectively, be replaced with the acquiring section 541, the setting section 542, and the transmitter 543.

FIG. 25 is a flowchart illustrating the request transmission process related to transmission of a heartbeat request. The process illustrated in FIG. 25 is executed, for example, in a case where a grant response or a heartbeat response from the communication control apparatus 40 includes information about the heartbeat interval determined by the communication control apparatus 40.

First, the acquiring section 241 of the base station apparatus 20 acquires the information about the heartbeat interval determined by the communication control apparatus 40 (step S81). Then, the setting section 242 of the base station apparatus 20 sets the acquired heartbeat interval (step S82). For example, the setting section 242 records a value of the heartbeat interval in a predetermined semiconductor register that controls the transmission of heartbeat requests. Then, the transmitter 243 of the base station apparatus 20 transmits a heartbeat request to the communication control apparatus 40 in accordance with the set heartbeat interval (step S83).

This enables the base station apparatus 20 to perform heartbeat at an appropriate timing, which enhances the signaling (Signaling) efficiency of the communication system 2.

<6-5. Heartbeat Interval Determination Method (Third Determination Method)>

In a case where the communication control apparatus 40 controls a plurality of communication apparatuses (e.g., base station apparatuses 20 and/or proxy apparatuses 50), it is assumed that a large number of communication apparatuses access the communication control apparatus 40 at the same time. For example, assume a case where the value of the heartbeat interval is not set to a fixed value (e.g., "240 seconds or less") but a value that the communication control apparatus 40 determines in accordance with a predetermined criterion. In this case, depending on the criterion, it is assumed that a large number of heartbeat requests will be transmitted to the communication control apparatus 40 at the same time without being temporally distributed.

For example, consider a case where the heartbeat interval is determined by the first determination method. The first determination method is to set the heartbeat interval to transmit a heartbeat request after the next periodic processing. In this case, though with some errors, it is assumed that a large number of base station apparatuses 20 (or a large number of proxy apparatuses 50) will transmit heartbeat requests at the timing when the next periodic processing is completed. In this case, the communication control apparatus 40 can be degraded in performance due to a sudden increase in loads. This can cause the communication control apparatus 40 to fail to handle the heartbeat requests, preventing efficient frequency management.

Hence, the communication control apparatus 40 determines the value of the heartbeat interval so that heartbeat requests are transmitted in a distributed manner. As an example, in a case of determining the heartbeat interval so that a heartbeat request is transmitted after the next periodic processing, the determining section 443 of the communication control apparatus 40 may add a margin time that differs from a margin time that is added to the heartbeat interval of another one second wireless system (the base station apparatus 20 or the proxy apparatus 50) that transmits a heartbeat request after the next periodic processing. Needless to say, the case of adding a margin time is not limited to this case.

The determining section 443 of the communication control apparatus 40 may determine a different margin time ($\Delta_{margin,i}$) for each communication apparatus that transmits a heartbeat request (e.g., for each base station apparatus 20 and/or for each proxy apparatus 50). Then, the determining section 443 may add margin time ($\Delta_{margin,i}$) to the heartbeat interval ($\Delta_{Heartbeat,Interval}$) determined by a predetermined determination method (e.g., the first determination method or second determination method described above). The determining section 443 may determine the heartbeat interval ($\Delta'_{Heartbeat,Interval,i}$) including the added margin time $\Delta_{margin,i}$ as the heartbeat interval to be set for the base station apparatus 20 or the proxy apparatus 50.

In the form of an expression, this is expressed as in the following expression (5). In the expression (5), i indicates an index of a communication apparatus (e.g., for each base station apparatus 20 and/or the proxy apparatus 50) that transmits a heartbeat request.

$$\Delta'_{Heartbeat,Interval,i} = \Delta_{Heartbeat,Interval} + \Delta{margin,i} \quad (5)$$

The following random setting and common setting may be assumed as the method of setting the margin time $\Delta_{margin,i}$.

(Random Setting)

For example, the determining section 443 randomly selects a value to be the margin time $\Delta_{margin,i}$ from a range of 0 to $\Delta_{margin,max}$ [sec]. In this case, $\Delta_{margin,max}$ is the maximum value of values to be the margin time $\Delta_{margin,i}$. It is to be noted that the determining section 443 may previously discretely divide the range of 0 to $\Delta_{margin,max}$ [sec], and randomly select a value from the discrete values. In this case, discrete intervals may be changed dynamically. In this manner, heartbeat request transmission timings are distributed. As a result, processing loads on the communication control apparatus 40 are also distributed, which enables efficient frequency management.

(Common Setting)

The determining section 443 may set a common margin time between specific base station apparatuses 20 (or between specific proxy apparatuses 50). For example, the determining section 443 groups the base station apparatus 20 and/or the proxy apparatus 50 in accordance with a predetermined criterion, and sets a common margin time for each group. The following four methods are assumed as setting methods.

(Setting Method 1)

In a case where the proxy apparatus 50 accesses the communication control apparatus 40 on behalf of one or more base station apparatuses 20, the determining section 443 sets a common margin time for the one or more base station apparatuses 20 subordinate to the proxy apparatus 50. In this case, the proxy apparatus 50 acquires the heartbeat interval to be commonly used by the plurality of subordinate base station apparatuses 20 from the communication control apparatus 40, and collectively transmits heartbeat requests of the plurality of subordinate base station apparatuses 20 to the communication control apparatus 40. Setting the common heartbeat interval allows the proxy apparatus 50 to collectively transmit heartbeat requests of the subordinate base station apparatuses 20 to the communication control apparatus 40, which further enhances the signaling efficiency of the communication system 2.

(Setting Method 2)

There may be an allowable number of simultaneous accesses for the communication control apparatus 40 in some cases. In this case, the determining section 443 of the communication control apparatus 40 groups a plurality of base station apparatuses 20 on the basis of the allowable number of simultaneous accesses for the communication control apparatus 40. Then, the determining section 443 sets a common margin time within each group. It is possible to enhance processing efficiency of the communication control apparatus 40, while enhancing the signaling efficiency, because an optimal number of requests matching the throughput of the communication control apparatus 40 are transmitted at the same time.

It is to be noted that the determining section 443 may group a plurality of base station apparatuses 20 subordinate to one proxy apparatus 50 into a plurality of groups. For example, in a case where the total number of the base station apparatuses 20 bundled by one proxy apparatus 50 exceeds the allowable number of simultaneous accesses for the communication control apparatus 40, the determining section 443 may group the plurality of base station apparatuses 20 subordinate to the proxy apparatus 50, and perform heartbeat on a group-by-group basis.

In this case, it is desirable that the total number of the base station apparatuses 20 bundled by the proxy apparatus 50 be reported to the communication control apparatus 40. This may be reported by the proxy apparatus 50 itself or by another apparatus that manages the proxy apparatus 50. It is to be noted that, in a case where the total number of the base station apparatuses 20 bundled by the proxy apparatus 50 is not reported to the communication control apparatus 40, the communication control apparatus 40 may infer the total number of the base station apparatuses 20 bundled by the proxy apparatus 50 on the basis of the access records or the like.

It is to be noted that it is desirable that information about the grouping performed by the communication control apparatus 40 be reported from the communication control apparatus 40 to the proxy apparatus 50. This allows the proxy apparatus 50 to bundle requests of the base station apparatuses 20 on the basis of the grouping designated by the communication control apparatus 40. This results in higher signaling efficiency of the communication system 2.

(Setting Method 3)

The determining section 443 of the communication control apparatus 40 may group, into one group, the base station apparatuses 20 that serve as "contributors" to the aggregated interference power in the primary system protection calculation. Then, the determining section 443 may set a common margin time within the group.

In this case, the determining section 443 may consider the base station apparatuses 20 located in an interference calculation consideration area as the "contributors" to the aggregated interference power, and group them. The interference calculation consideration area may be defined, for example, on the basis of the reference position (Reference Point) information for calculation of the interference power level received by the primary system.

Heartbeat requests of the base station apparatuses 20 that are likely to have the same result for the requests are transmitted at the same time, which facilitates the processing of the communication control apparatus 40.

(Setting Method 4)

The determining section 443 of the communication control apparatus 40 groups the base station apparatus 20, taking into consideration a mutual interference group (Mutual Interference Group). Here, the mutual interference group is a group of the base station apparatuses 20 that interfere with each other. That is, the determining section 443 groups the base station apparatuses 20 that can interfere with and affect each other into one group. For example, the determining section 443 groups, into one group, the base station apparatuses 20 in a positional relationship with overlapping ranges covering communication (coverages). Heartbeat requests of the base station apparatuses 20 that are likely to have the same result for the requests are transmitted at the same time, which facilitates the processing of the communication control apparatus 40.

<6-6. Case Where Base Station Apparatus Possesses Plurality of Grants>

In the embodiment described above, a case where one base station apparatus 20 possesses a plurality of grants (frequency allocations) has not been explicitly described. However, as a matter of course, even in a case where one base station apparatus 20 possesses a plurality of grants, the above-described embodiment is applicable by regarding one grant as one wireless communication apparatus. In a case where one base station apparatus 20 possesses a plurality of grants, it is also possible to adopt the following heartbeat interval setting examples, for example, in addition to the above-described embodiment.

(Setting Example 1)

The determining section 443 of the communication control apparatus 40 determines the heartbeat interval on the basis of information about a state of the grant. For example, the determining section 443 determines a common heartbeat interval for grants in the same state (e.g., Granted/Authorized).

For example, the determining section 443 determines the heartbeat interval using the first determination method or the second determination method for grants in the Granted state. It is to be noted that, in a case where a plurality of base station apparatuses 20 is present in the communication system 2, the determining section 443 may determine the heartbeat interval further considering the third determination method.

Further, the determining section 443 sets an ordinarily used heartbeat interval for grants in the Authorized state. The ordinarily used heartbeat interval may be "240 seconds or less". It is to be noted that, in a case where a plurality of base station apparatuses 20 is present in the communication system 2, the determining section 443 may determine the heartbeat interval further considering the third determination method.

FIG. 26 is a diagram illustrating how a common heartbeat interval is set for grants in the same state (state). In the example of FIG. 26, one base station apparatus 20 has four grants of Grant1 to Grant4. Grant1 and Grant3 are grants in the Authorized state, and Grant2 and Grant4 are grants in the Granted state. In the example of FIG. 26, the heartbeat interval is different between the grants in the Granted state and the grants in the Authorized state. As is apparent from FIG. 26, the base station apparatus 20 does not execute a heartbeat request related to the grants in the Granted state (Grant2 and Grant4) until the periodic processing is completed. This allows the communication system 2 to enhance signaling efficiency. This consequently makes it possible to use radio wave resources efficiently.

It is to be noted that, in a case where another state of a grant is present, the determining section 443 of the communication control apparatus 40 may similarly determine a common heartbeat interval for grants in the state.

It is to be noted that this setting example 1 has been described assuming a case where one base station apparatus 20 has a plurality of grants, but the setting example 1 is applicable also in a case where one base station apparatus 20 has one grant. For example, the determining section 443 sets a common heartbeat interval for the base station apparatuses 20 with grants in the same state. More specifically, the determining section 443 determines the heartbeat interval using the first determination method or the second determination method for the base station apparatus 20 having a grant in the Granted state. For the base station apparatus 20 having a grant in the Authorized state, the determining section 443 sets the ordinarily used heartbeat interval. In either case, the heartbeat interval may be determined by considering the third determination method. Also in this case, it is possible for the communication system 2 to enhance signaling efficiency.

(Setting Example 2)

The determining section 443 of the communication control apparatus 40 determines the heartbeat interval on the basis of information about whether the grant has passed through the periodic processing (periodic protection calculation for the primary system). For example, the determining section 443 determines a common heartbeat interval depending on whether the grant is a new entrant grant (New Entrant Grant) or an existing grant (Existing Grant). Here, the new entrant grant is a grant that has not passed through the periodic processing (e.g., CPAS) even once, and the existing grant is a grant that has passed through the periodic processing.

The new entrant grant does not permit emission of radio waves until it passes through the periodic processing. Therefore, the determining section 443 determines the heartbeat interval using the first determination method or the second determination method for the new entrant grant. It is to be noted that, in a case where a plurality of base station apparatuses 20 is present in the communication system 2, the determining section 443 may determine the heartbeat interval further considering the third determination method.

In addition, the determining section 443 sets an ordinarily used heartbeat interval for the existing grant. The ordinarily used heartbeat interval may be "240 seconds or less". It is to be noted that, in a case where a plurality of base station apparatuses 20 is present in the communication system 2, the determining section 443 may determine the heartbeat interval further considering the third determination method.

It is to be noted that, although the existing grant permits emission of radio waves, it may be necessary to suspend radio waves due to the positional relationship, etc. for some base station apparatuses 20. Therefore, the determining section 443 does not necessarily have to set a common heartbeat interval for all the existing grants.

The setting example 2 also allows the communication system 2 to enhance signaling efficiency. This consequently makes it possible to use radio wave resources efficiently.

It is to be noted that this setting example 2 has been described assuming a case where one base station apparatus 20 has a plurality of grants, but the setting example 2 is applicable also in a case where one base station apparatus 20 has one grant. For example, the determining section 443 sets a common heartbeat interval depending on whether the base station apparatus 20 is the base station apparatus 20 having a new entrant grant or the base station apparatus 20 having an existing grant. More specifically, the determining section 443 determines the heartbeat interval using the first determination method or the second determination method for the base station apparatus 20 having the new entrant grant. For the base station apparatus 20 having the existing grant, the determining section 443 sets the ordinarily used heartbeat interval. In either case, the heartbeat interval may be determined by considering the third determination method. Also in this case, it is possible for the communication system 2 to enhance signaling efficiency.

7. MODIFICATION EXAMPLES

The embodiments described above illustrate examples, and various changes and applications are possible.

<7-1. Modification Examples Related to System Configuration>

The communication control apparatus 40 of the present embodiment is not limited to the apparatus described in the above embodiment. For example, the communication control apparatus 40 may be an apparatus having a function other than controlling the base station apparatus 20 that makes secondary use of the frequency band where frequency sharing is performed. For example, the function of the communication control apparatus 40 of the present embodiment may be provided for a network manager. In this case, the network manager may be, for example, a C-BBU (Centralized Base Band Unit) of a network configuration called a C-RAN (Centralized Radio Access Network) or an apparatus including the same. The function of the network manager may also be provided for a base station (including an access point). These apparatuses (e.g., network managers) may also be regarded as communication control apparatuses.

In the above embodiment, the communication system 1 is the first wireless system, and the base station apparatus 20 is the second wireless system. However, the first wireless system and the second wireless system are not limited to this example. For example, the first wireless system may be a communication apparatus (e.g., the wireless communication apparatus 10), or the second wireless system may be a communication system (the communication system 2). It is to be noted that the wireless system appearing in the present embodiment is not limited to a system including a plurality of apparatuses, and may be replaced with an "apparatus", a "terminal", or the like as appropriate.

Further, in the above-described embodiment, the communication control apparatus 40 is assumed to be an apparatus belonging to the communication system 2, but it may not necessarily be an apparatus belonging to the communication system 2. The communication control apparatus 40 may be an apparatus outside the communication system 2. The communication control apparatus 40 may indirectly control the base station apparatus 20 via an apparatus constituting the communication system 2, without directly controlling the base station apparatus 20. Further, a plurality of secondary systems (communication systems 2) may be present. In this case, the communication control apparatus 40 may manage the plurality of secondary systems. In this case, each secondary system may be regarded as the second wireless system.

It is to be noted that, generally in frequency sharing, the existing system using the target band is referred to as a primary system, and the secondary user is referred to as a secondary system, but the primary system and the secondary system may be replaced with other terms. A macrocell in a HetNET (Heterogeneous Network) may be used as the primary system, and a small cell or a relay station may be used as the secondary system. In addition, a base station may be used as the primary system, and a Relay UE or Vehicle UE present in its coverage and implementing D2D or V2X (Vehicle-to-Everything) may be used as the secondary system. The base station is not limited to a fixed type, and may be a portable/mobile type.

In addition, the interfaces between entities may be either wired or wireless. For example, the interface between the entities (communication apparatus, communication control apparatus, or terminal apparatus) appearing in the present embodiment may be a wireless interface independent of frequency sharing. Examples of the wireless interface independent of frequency sharing include a wireless interface provided by a mobile network operator via a Licensed band, and wireless LAN communication using an existing unlicensed band.

<7-2. Other Modification Examples>

A control apparatus that controls the wireless communication apparatus 10, the base station apparatus 20, the terminal apparatus 30, or the communication control apparatus 40 of the present embodiment may be implemented by a dedicated computer system or may be implemented by a general-purpose computer system.

For example, a communication program for execution of the above-described operations (e.g., communication control process, adjustment process, distribution process, or the like) is stored in a computer-readable recording medium such as an optical disk, a semiconductor memory, a magnetic tape, or a flexible disk, and distributed. Then, for example, the control apparatus is configured by installing the program in a computer and executing the above-described process. In this case, the control apparatus may be an apparatus (e.g., a personal computer) outside the wireless communication apparatus 10, the base station apparatus 20, the terminal apparatus 30, the communication control apparatus 40, or the proxy apparatus 50. The control apparatus may also be an apparatus (e.g., the control unit 24, the control unit 34, the control unit 44, or the control unit 54) inside the wireless communication apparatus 10, the base station apparatus 20, the terminal apparatus 30, the communication control apparatus 40, or the proxy apparatus 50.

In addition, the communication program may be stored in a disk apparatus provided in a server apparatus on a network such as the Internet to be able to be downloaded to a computer, for example. Further, the above-described functions may be implemented by collaboration between an operating system (Operating System) and application software. In this case, a portion other than the OS may be stored in a medium and distributed, or a portion other than the OS may be stored in a server apparatus to be able to be downloaded to a computer, for example.

Further, among the processes described in the above embodiment, all or part of the process described as being performed automatically may also be manually performed, or all or part of the process described as being performed manually may also be performed automatically by a known method. In addition to this, the processing steps, specific names, and information including various data and parameters illustrated in the above specification and in the drawings may be freely changed, unless otherwise noted. For example, various information illustrated in the drawings is not limited to the illustrated information.

Further, the illustrated components of each apparatus are functional concepts and do not necessarily have to be physically configured as illustrated. That is, a specific form of the distribution and integration of each apparatus is not limited to the illustrated one, and all or part thereof may be functionally or physically distributed and integrated in any unit depending on various loads, use situations, etc.

Further, it is possible to appropriately combine the above-described embodiments within a scope that does not cause contradiction in the processing contents. Further, it is possible to appropriately change the order of the steps illustrated in the sequence diagrams or flow charts of the present embodiment.

8. CONCLUSION

As described above, according to one embodiment of the present disclosure, the communication control apparatus 40 acquires, from the base station apparatus 20 that performs wireless communication by using radio waves of a frequency band used by the communication system 1 or from the proxy apparatus 50 that acts on behalf of the base station apparatus 20, a request (e.g., heartbeat request) for the base station apparatus 20 to start or continue radio wave transmission. Then, the communication control apparatus 40 determines a transmission interval (e.g., heartbeat interval) of the request (e.g., heartbeat request) to be transmitted from a predetermined base station apparatus 20 out of the plurality of base station apparatuses 20 or a predetermined proxy apparatus 50 out of the plurality of proxy apparatuses 50. Then, the communication control apparatus 40 notifies the predetermined base station apparatus 20 or the predetermined proxy apparatus 50 of the determined transmission interval.

Further, the predetermined base station apparatus 20 or the predetermined proxy apparatus 50, acquires information about the transmission interval determined by the communication control apparatus 40, from the communication control apparatus 40, and transmits the request (e.g., heartbeat request) at the acquired transmission interval.

This causes the base station apparatus 20 and/or the proxy apparatus 50 to transmit requests at intervals determined as appropriate by the communication control apparatus 40 rather than at a fixed interval, which enhances signaling efficiency of the system including the base station apparatus 20 and/or the proxy apparatus 50 as a whole. As a result, the communication volume of the whole system and the processing loads on the communication control apparatus 40 are reduced, which enables the communication control apparatus 40 to respond quickly to various situations. This results in achievement of efficient use of radio wave resources.

Although the embodiments of the present disclosure have been described above, the technical scope of the present disclosure is not limited to the above-described embodiments as they are, and various modifications may be made without departing from the scope of the present disclosure. Further, the components may be appropriately combined over different embodiments and modification examples.

In addition, the effects in the embodiments described herein are merely illustrative and not limitative, and other effects may be achieved.

It is to be noted that the present technology may also have the following configurations.

(1)

A communication control apparatus including:

an acquiring section that acquires, from a second wireless system that performs wireless communication by using a radio wave of a frequency band used by a first wireless system or from a proxy system that acts on behalf of the second wireless system, a request for the second wireless system to start or continue radio wave transmission;

a determining section that determines a transmission interval of the request to be transmitted from a predetermined second wireless system out of a plurality of the second wireless systems or a predetermined proxy system out of a plurality of the proxy systems; and a notifying section that notifies the predetermined second wireless system or the predetermined proxy system of the determined transmission interval.

(2)

The communication control apparatus according to (1), in which the determining section determines the transmission interval by using a predetermined determination method selected from among a plurality of determination methods.

(3)

The communication control apparatus according to (1) or (2), in which the determining section determines the transmission interval by using a predetermined determination method selected from among a plurality of determination methods on the basis of information related to an interference margin to be distributed to the second wireless system.

(4)

The communication control apparatus according to any one of (1) to (3), in which the determining section determines the transmission interval by using different determination methods between a case where a leftover interference margin distributable to the second wireless system is present and a case where the leftover interference margin distributable to the second wireless system is absent.

(5)

The communication control apparatus according to (4), in which, in the case where the leftover interference margin distributable to the second wireless system is absent, the determining section determines the transmission interval to cause the request to be transmitted after next periodic protection calculation for the first wireless system.

(6)

The communication control apparatus according to (4) or (5), in which, in the case where the leftover interference margin distributable to the second wireless system is present, the determining section determines the transmission interval to cause the request to be transmitted after protection calculation for the first wireless system, the protection calculation being performed for the predetermined second wireless system to perform radio wave transmission using the leftover interference margin.

(7)

The communication control apparatus according to any one of (1) to (6), in which the determining section adds, to the determined transmission interval, a margin time determined in accordance with a predetermined criterion.

(8)

The communication control apparatus according to any one of (1) to (7), in which in a case of determining the transmission interval to cause the request to be transmitted after the next periodic protection calculation for the first wireless system, the determining section adds a margin time different from a margin time to be added to the transmission interval of another one of the second wireless systems that transmits the request after the next periodic protection calculation.

(9)

The communication control apparatus according to any one of (1) to (8), in which the determining section classifies a plurality of the second wireless systems into a plurality of groups, and adds a common margin time to the determined transmission interval for the second wireless systems belonging to the same group.

(10)

The communication control apparatus according to any one of (1) to (8), in which the determining section determines a time randomly selected for each of the second wireless systems, as the margin time to be added to the transmission interval.

(11)

The communication control apparatus according to any one of (1) to (8), in which the determining section adds a common margin time to the determined transmission interval for a plurality of the second wireless systems subordinate to the same proxy system.

(12)

The communication control apparatus according to any one of (1) to (8), in which the determining section classifies a plurality of the second wireless systems subordinate to the same proxy system into a plurality of groups, and adds a common margin time to the determined transmission interval for the second wireless systems belonging to the same group.

(13)

The communication control apparatus according to any one of (1) to (8), in which the determining section classifies a plurality of the second wireless systems into a plurality of groups depending on whether or not the second wireless systems interfere with each other, and adds a common margin time to the determined transmission interval for the second wireless systems belonging to the same group.

(14)

The communication control apparatus according to any one of (1) to (13), in which, in a case where the predetermined second wireless system possesses a plurality of grants for radio wave transmission, the determining section determines the transmission interval for each grant.

(15)

The communication control apparatus according to any one of (1) to (14), in which the determining section determines the transmission interval on the basis of information related to a grant for radio wave transmission given to the second wireless system.

(16)

The communication control apparatus according to (15), in which the determining section determines the transmission interval on the basis of information about a state of the grant.

(17)

The communication control apparatus according to (15), in which the determining section determines the transmission interval on the basis of information about whether or not the grant is a grant that has passed through periodic protection calculation for the first wireless system.

(18)

A communication apparatus including:

an acquiring section that acquires information about a transmission interval from a communication control apparatus that acquires, from a second wireless system that performs wireless communication by using a radio wave of a frequency band used by a first wireless system or from a proxy system that acts on behalf of the second wireless system, a request for the second wireless system to start or continue radio wave transmission, determines the transmission interval of the request to be transmitted from a predetermined second wireless system out of a plurality of the second wireless systems or a predetermined proxy system out of a plurality of the proxy systems, and notifies the predetermined second wireless system or the predetermined proxy system of the determined transmission interval; and a transmitter that transmits the request at the acquired transmission interval.

(19)

The communication apparatus according to (18), in which the communication apparatus is the proxy system, the acquiring section acquires the transmission interval commonly used by a subordinate plurality of the second wireless systems, and the transmitter collectively transmits the requests of the subordinate plurality of second wireless systems at the transmission interval.

(20)

A communication control method including:

acquiring, from a second wireless system that performs wireless communication by using a radio wave of a frequency band used by a first wireless system or from a proxy system that acts on behalf of the second wireless system, a request for the second wireless system to start or continue radio wave transmission;

determining a transmission interval of the request to be transmitted from a predetermined second wireless system out of a plurality of the second wireless systems or a predetermined proxy system out of a plurality of the proxy systems; and notifying the predetermined second wireless system or the predetermined proxy system of the determined transmission interval.

(21)

A communication method including:

acquiring information about a transmission interval from a communication control apparatus that acquires, from a second wireless system that performs wireless communication by using a radio wave of a frequency band used by a first wireless system or from a proxy system that acts on behalf of the second wireless system, a request for the second wireless system to start or continue radio wave transmission, determines the transmission interval of the request to be transmitted from a predetermined second wireless system out of a plurality of the second wireless systems or a predetermined proxy system out of a plurality of the proxy systems, and notifies the predetermined second wireless system or the predetermined proxy system of the determined transmission interval; and transmitting the request at the acquired transmission interval.

(22)

A communication control program that causes a computer to function as:

an acquiring section that acquires, from a second wireless system that performs wireless communication by using a radio wave of a frequency band used by a first wireless system or from a proxy system that acts on behalf of the second wireless system, a request for the second wireless system to start or continue radio wave transmission;

a determining section that determines a transmission interval of the request to be transmitted from a predetermined second wireless system out of a plurality of the second wireless systems or a predetermined proxy system out of a plurality of the proxy systems; and a notifying section that notifies the predetermined second wireless system or the predetermined proxy system of the determined transmission interval.

(23)

A communication program that causes a computer to function as:

an acquiring section that acquires information about a transmission interval from a communication control apparatus that acquires, from a second wireless system that performs wireless communication by using a radio wave of a frequency band used by a first wireless system or from a proxy system that acts on behalf of the second wireless system, a request for the second wireless system to start or continue radio wave transmission, determines the transmission interval of the request to be transmitted from a predetermined second wireless system out of a plurality of the second wireless systems or a predetermined proxy system out of a plurality of the proxy systems, and notifies the predetermined second wireless system or the predetermined proxy system of the determined transmission interval; and a transmitter that transmits the request at the acquired transmission interval.

(24)

A communication system including a communication control apparatus and a communication apparatus, in which the communication control apparatus includes an acquiring section that acquires, from the communication apparatus that performs wireless communication by using a radio wave of a frequency band used by a first wireless system or from a proxy system that acts on behalf of the communication apparatus, a request for the communication apparatus to start or continue radio wave transmission, a determining section that determines a transmission interval of the request to be transmitted from a predetermined communication apparatus out of a plurality of the communication apparatuses or a predetermined proxy system out of a plurality of the proxy systems, and a notifying section that notifies the predetermined communication apparatus or the predetermined proxy system of the determined transmission interval, and the communication apparatus acquires the transmission interval determined by the communication control apparatus from the communication control apparatus or from the proxy system, and transmits the request at the acquired transmission interval.

REFERENCE SIGNS LIST 1, 2 communication system
10 wireless communication apparatus
20 base station apparatus
30 terminal apparatus
40 communication control apparatus
50 proxy apparatus
21, 31, 41, 51 wireless communication unit
22, 32, 42, 52 storage unit
23, 43, 53 network communication unit
33 input-output unit
24, 34, 44, 54 control unit
211, 311 receiving processor
212, 312 transmitting processor
241, 441, 541 acquiring section
242, 542 setting section
243, 543 transmitter
442 assessing section
443 determining section
444 notifying section

The invention claimed is:

1. A communication control apparatus, comprising:
an acquiring section configured to acquire, from a second wireless system that performs wireless communication using a radio wave of a frequency band used by a first wireless system or from a proxy system that acts on behalf of the second wireless system, a request for the second wireless system to start or continue radio wave transmission;
a determining section configured to determine a transmission interval of the request to be transmitted from a specific second wireless system out of a plurality of second wireless systems or a specific proxy system out of a plurality of proxy systems, wherein the transmission interval is determined by use of a specific determination method among a plurality of determination methods based on information related to an interference margin to be distributed to the second wireless system; and
a notifying section configured to notify the specific second wireless system or the specific proxy system of the determined transmission interval.

2. The communication control apparatus according to claim 1, wherein the determining section is further configured to determine the transmission interval by use of different determination methods between a case where a leftover interference margin distributable to the second wireless system is present and a case where the leftover interference margin distributable to the second wireless system is absent.

3. The communication control apparatus according to claim 2, wherein based on the leftover interference margin distributable to the second wireless system is absent, the determining section is further configured to determine the transmission interval to cause the request to be transmitted after next periodic protection calculation for the first wireless system.

4. The communication control apparatus according to claim 3, wherein
based on the leftover interference margin distributable to the second wireless system is present, the determining section is further configured to determine the transmission interval to cause the request to be transmitted after protection calculation for the first wireless system, and the protection calculation is for the second wireless system to perform radio wave transmission using the leftover interference margin.

5. The communication control apparatus according to claim 3, wherein
the determining section is further configured to add, to the determined transmission interval, a margin time, and the margin time is based on a specific criterion.

6. The communication control apparatus according to claim 5, wherein based on the determination of the transmission interval to cause the request to be transmitted after the next periodic protection calculation for the first wireless system, the determining section is further configured to add a first margin time different from a second margin time to be added to the transmission interval a different second wireless system of the plurality of second wireless systems that transmits the request after the next periodic protection calculation.

7. The communication control apparatus according to claim 6, wherein the determining section is further configured to:
classify the plurality of the second wireless systems into a plurality of groups; and
add a common margin time to the determined transmission interval for a set of second wireless systems of the plurality of second wireless systems that belongs to a same group of the plurality of groups.

8. The communication control apparatus according to claim 6, wherein the determining section is further configured to determine a time randomly selected for each of the plurality of second wireless systems, as the first margin time to be added to the transmission interval.

9. The communication control apparatus according to claim 6, wherein the determining section is further configured to add a common margin time to the determined transmission interval for a set of second wireless systems of the plurality of second wireless systems subordinate to a same proxy system of the plurality of proxy systems.

10. The communication control apparatus according to claim 6, wherein the determining section is further configured to:
classify a set of second wireless systems of the plurality of second wireless systems subordinate to a same proxy system of the plurality of proxy systems into a plurality of groups; and
add a common margin time to the determined transmission interval for the set of second wireless systems belonging to the same group.

11. The communication control apparatus according to claim 6, wherein the determining section is further configured to:
classify the plurality of the second wireless systems into a plurality of groups based on interference of the second wireless systems with each other; and
add a common margin time to the determined transmission interval for a set of second wireless systems belonging to a same group.

12. The communication control apparatus according to claim 1, wherein based on the specific second wireless system that possesses a plurality of grants for radio wave transmission, the determining section is further configured to determine the transmission interval for each grant of the plurality of grants.

13. The communication control apparatus according to claim 1, wherein the determining section is further configured to determine the transmission interval based on information related to a grant for radio wave transmission given to the second wireless system.

14. The communication control apparatus according to claim 13, wherein the determining section is further configured to determine the transmission interval based on information about a state of the grant.

15. The communication control apparatus according to claim 13, wherein the determining section is further configured to determine the transmission interval based on information about whether or not the grant is a grant that has passed through periodic protection calculation for the first wireless system.

16. A communication apparatus, comprising:
an acquiring section configured to acquire information about a transmission interval from a communication control apparatus that
  acquires, from a second wireless system that performs wireless communication by use of a radio wave of a frequency band used by a first wireless system or from a proxy system that acts on behalf of the second wireless system, a request for the second wireless system to start or continue radio wave transmission,
  determines the transmission interval of the request to be transmitted from a specific second wireless system out of a plurality of second wireless systems or a specific proxy system out of a plurality of proxy systems, and
  notifies the specific second wireless system or the specific proxy system of the determined transmission interval, wherein the transmission interval is determined by use of a specific determination method among a plurality of determination methods based on information related to an interference margin to be distributed to the second wireless system; and
a transmitter configured to transmit the request at the acquired transmission interval.

17. The communication apparatus according to claim 16, wherein
the communication apparatus is the proxy system,
the acquiring section further acquires the transmission interval commonly used by a subordinate plurality of second wireless systems, and
the transmitter collectively transmits the requests of the subordinate plurality of second wireless systems at the transmission interval.

18. A communication control method, comprising:
acquiring, from a second wireless system that performs wireless communication by use of a radio wave of a frequency band used by a first wireless system or from a proxy system that acts on behalf of the second wireless system, a request for the second wireless system to start or continue radio wave transmission;
determining a transmission interval of the request to be transmitted from a specific second wireless system out of a plurality of second wireless systems or a specific proxy system out of a plurality of proxy systems, wherein the transmission interval is determined by use of a specific determination method among a plurality of determination methods based on information related to an interference margin to be distributed to the second wireless system; and
notifying the specific second wireless system or the specific proxy system of the determined transmission interval.

\* \* \* \* \*